US007472686B2

(12) United States Patent
Yasui et al.

(10) Patent No.: US 7,472,686 B2

(45) Date of Patent: Jan. 6, 2009

(54) CONTROL APPARATUS AND METHOD AND ENGINE CONTROL UNIT FOR INTERNAL COMBUSTION ENGINE

(75) Inventors: Yuji Yasui, Saitama-ken (JP); Ikue Kawasumi, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 11/717,043

(22) Filed: Mar. 13, 2007

(65) Prior Publication Data

US 2007/0250247 A1 Oct. 25, 2007

(30) Foreign Application Priority Data

Mar. 14, 2006 (JP) ............................ 2006-070012

(51) Int. Cl.
*F02P 5/00* (2006.01)
*B60T 7/12* (2006.01)

(52) U.S. Cl. ............................ 123/406.26; 123/406.23; 123/406.33; 123/695; 701/103; 701/105

(58) Field of Classification Search ................. 123/295, 123/305, 406.11, 406.23, 406.24, 406.26, 123/406.33, 434, 681, 687, 694, 695; 701/101, 701/103, 105
See application file for complete search history.

(56) References Cited

U.S. PATENT DOCUMENTS 6,553,297 B2 * 4/2003 Tashiro et al. ................. 701/48
2001/0013329 A1 * 8/2001 Matsumoto et al. ......... 123/295
2004/0182068 A1 * 9/2004 Sun et al. ...................... 60/274
2004/0193358 A1 * 9/2004 Yasui ......................... 701/109
2005/0205064 A1 * 9/2005 Lewis et al. ................. 123/437
2006/0005814 A1 * 1/2006 Michelini et al. ........... 123/432
2006/0118087 A1 * 6/2006 Lewis et al. ................. 123/437
2006/0162320 A1 * 7/2006 Surnilla et al. ................ 60/285

* cited by examiner

*Primary Examiner*—John T Kwon
(74) *Attorney, Agent, or Firm*—Squire, Sanders & Dempsey L.L.P.

(57) ABSTRACT

A control apparatus and method, and an engine control unit for an internal combustion engine are provided for restraining a torque step and sudden fluctuations in rotation when an air/fuel mixture combustion mode is switched among a plurality of combustion modes, and for improving the fuel economy. A control apparatus of an internal combustion engine operated with a combustion mode switched between a stratified combustion mode and a uniform combustion mode comprises an ECU. The ECU calculates an ignition manipulated variable to cancel out a change in the engine rotational speed associated with the switching of the combustion mode when a first-time injection ratio changes during idle rotational speed control, and calculates an intake manipulated variable to cancel a change in the engine rotational speed caused by the ignition manipulated variable when the first-time injection ratio changes.

30 Claims, 28 Drawing Sheets

CONTROL APPARATUS AND METHOD AND ENGINE CONTROL UNIT FOR INTERNAL COMBUSTION ENGINE

BACKGROUND OF THE INVENTION

1. Field of the Invention

The present invention relates to a control apparatus and method, and an engine control unit for an internal combustion engine which is operated with a combustion mode of an air/fuel mixture switched among a plurality of combustion modes.

2. Description of the Prior Art

Conventionally, as a control apparatus for an internal combustion engine, one described in Laid-open Japanese Patent Application No. 10-227239 is known by way of example. This internal combustion engine is of a so-called direct injection type, where a fuel is directly injected into cylinders by fuel injection valves. This control apparatus selectively switches a fuel combustion mode in accordance with a load on the internal combustion engine, i.e., the opening of an accelerator pedal among a first mode for a low load application in which a fuel is injected once in a compression stroke, a second mode for a middle load in which a fuel is injected in each of an intake stroke and a compression stroke in parts, and a third mode for a high load in which a fuel is injected once in an intake stroke. In this way, the internal combustion engine is operated such that an air/fuel mixture is stratified in a low load range, such that part of the air/fuel mixture is stratified while the rest is uniformly burnt in a middle load range, and such that the air/fuel mixture is uniformly burned in a high load range.

Also, this control apparatus executes ignition timing control in the following way. First, one of three ignition timing maps for the first to third modes is selected based on the fuel injection mode. In the ignition timing map for the first mode, a map value is constantly set substantially irrespective of a load, whereas in the ignition timing maps for the second and third modes, a map value is set to a more retarded value as a load is larger. In addition, in two ignition timing maps for load ranges adjacent to each other, map values are set to be discontinuous to each other for a load and to have a relatively large crank angle difference near the boundary of the load regions.

Next, the ignition timing control calculates an ignition timing by searching a selected ignition timing map in accordance with a load. In this event, the ignition timing is calculated through an interpolation of two map search values when the load is in one of the three mode ranges, and when the load is near the boundary of two mode ranges, the interpolation of two map search values is prohibited, and the ignition timing is calculated based only on a single map search value.

The ignition timing is calculated by the foregoing control approach for the following reason. Generally, when a single injection mode such as the first or third mode which involves injecting a fuel only once during one combustion cycle is compared with a split injection mode such as the second mode which involves injecting a fuel twice in parts, the two modes differ in the air/fuel mixture combustion state from each other, as described above, and in thermal efficiency (i.e., combustion efficiency) from each other, thereby causing a large difference in generated torques. As a result, when the fuel injection mode changes between the two modes due to a change in load, this causes a torque step or sudden fluctuations in rotation, possibly leading to a degraded operability. Accordingly, when a load presents a value near the boundary of the two mode ranges, the interpolation of two map search values is prohibited, and the ignition timing is calculated based only on a single map search value to rapidly change the ignition timing, thereby restraining the torque step and sudden fluctuations in rotation to improve the operability.

The control apparatus of Laid-open Japanese Patent Application No. 10-227239 restrains a torque step and sudden fluctuations in rotation when the fuel injection mode changes between two modes by prohibiting the interpolation of two map search values, and employing ignition timing maps which provide map values that are discontinuous to each other for a load and have a relatively large crank angle difference near the boundary of load ranges. However, an increase in torque resulting from an advancing ignition timing is very small as compared with a difference between generated torques in the two modes, and is insufficient for restraining a torque step and sudden fluctuations in rotation. As a result, the operability is still susceptible to degradation due to the torque step and sudden fluctuations in rotation. In addition, since two map values near the boundary must be set to be discontinuous and have a relatively large crank angle difference in order to restrain the torque difference and sudden fluctuations in rotation, one map value must be set to a fairly retarded value, possibly resulting in a lower thermal efficiency and an exacerbated fuel economy.

SUMMARY OF THE INVENTION

The present invention has been made to solve the problem mentioned above, and it is an object of the invention to provide a control method and apparatus and an engine control unit for an internal combustion engine, which are capable of restraining a torque step and sudden fluctuations in rotation when an air/fuel mixture combustion mode is switched among a plurality of combustion modes, and is also caple of inoproving the fuel economy.

To achieve the above object, according to a first aspect of the present invention, there is provided a control apparatus for an internal combustion engine having a plurality of combustion modes which differ from one another in a controlled variable indicative of a generated torque under the same operating condition and operated with the combustion mode being switched amoung the plurality of combustion modes when a predetermined switching condition is satisfied. The control apparatus is characterized by comprising first manipulated variable calculating means for calculating a first manipulted variable for controlling the controlled variable to cancel out a change in the controlled variable associated with the switching of the combustion mode when the predetermined switching condition is satisfied; and second manipulated variable calculating means for calculating a second manipulated variable for changing the controlled variable, where the second manipulated variable has a smaller width available for a change in the controlled variable in one combustion cycle than the first manipulated variable, to cancel out a change in the controlled variable due to the first manipulated variable when the predetermined switching condition is satisfied.

According to this control apparatus for an internal combustion engine, when the combustion mode switching condition is satisfied, the first manipulated variable is calculated to cancel out a change in the controlled variable associated with the switching of the combustion mode, and the second manipulated variable is calculated to cancel out a change in the controlled variable due to the first manipulated variable. Here, the second manipulated variable has a smaller width available for a change in the controlled variable in one combustion cycle than the first manipulated variable. In other words, the first manipulated variable can change the controlled variable over a wider width than the second manipulated variable in one combustion cycle, so that with such the first manipulated variable, a change in the controlled variable can be rapidly canceled out, and a change in the controlled variable due to the first manipulated variable can be slowly canceled out by the second manipulated variable after the switching of the combustion mode. As a result, when the combustion mode is switched, the controlled variable, i.e., generated torque can be prevented from suddenly changing to restrain a torque step and sudden fluctuations in rotation. In addition, the combustion state after the switching can be rapidly returned to a state which can ensure an essential thermal efficiency irrespective of the torque step and sudden fluctuations in rotations, thereby improving the fuel economy.

To achieve the above object, according to a second aspect of the present invention, there is provided a control method for an internal combustion engine having a plurality of combustion modes which differ from one another in a controlled variable indicative of a generated torque under the same operating condition and operated with the combustion mode being switched among the plurality of combustion modes when a predetermined switching condition is satisfied. The control method is characterized by comprising the steps of calculating a first manipulated variable for controlling the controlled variable to cancel out a change in the controlled variable associated with the switching of the combustion mode when the predetermined switching condition is satisfied; and calculating a second manipulated variable for changing the controlled variable, where the second manipulated variable has a smaller width available for a change in the controlled variable in one combustion cycle than the first manipulated variable, to cancel out a change in the controlled variable due to the first manipulated variable when the predetermined switching condition is satisfied.

This control method for an internal combustion engine provides the same advantageous effects as described above concerning the control apparatus for an internal combustion engine according to the first aspect of the invention.

To achieve the above object, according to a third aspect of the present invention, there is provided an engine control unit including a control program for an internal combustion engine having a plurality of combustion modes which differ from one another in a controlled variable indicative of a generated torque under the same operating condition and operated with the combustion mode being switched among the plurality of combustion modes when a predetermined switching condition is satisfied. The engine control unit is characterized in that the control program causes a computer to calculate a first manipulated variable for controlling the controlled variable to cancel out a change in the controlled variable associated with the switching of the combustion mode when the predetermined switching condition is satisfied; and calculate a second manipulated variable for changing the controlled variable, where the second manipulated variable has a smaller width available for a change in the controlled variable in one combustion cycle than the first manipulated variable, to cancel out a change in the controlled variable due to the first manipulated variable when the predetermined switching condition is satisfied.

This engine control unit provides the same advantageous effects as described above concerning the control apparatus for an internal combustion engine according to the first aspect of the invention.

Preferably, in the control apparatus for an internal combustion engine described above, the first manipulated variable calculating means comprises first basic manipulated variable calculating means for calculating a first basic manipulated variable in accordance with a predetermined control algorithm; and correction value calculating means for calculating a correction value for canceling out a change in the controlled variable associated with the switching of the combustion mode while applying predetermined forgetting processing, wherein the first manipulated variable calculating means calculates the first manipulated variable by correcting the first basic manipulated variable by the correction value.

According to this preferred embodiment of the control apparatus for an internal combustion engine, the first basic manipulated variable is calculated in accordance with the predetermined control algorithm, the correction value for canceling out a change in the controlled variable associated with the switching of the combustion mode is calculated while the predetermined forgetting processing is applied, and the first basic manipulated variable is corrected by the correction value to calculate the first manipulated variable. Therefore, as the processing is advanced, a correction effect on the first basic manipulated variable by the correction value gradually disappears to eliminate the effect of canceling out a change in the controlled variable due to the first manipulated variable, so that the second manipulated variable need not either cancel out the change in the controlled variable due to the first manipulated variable. As a result, the first manipulated variable and second manipulated variable can be calculated as essential values in accordance with the combustion mode, so that the combustion mode of the internal combustion engine can be returned, without fail, to a state which can ensure the essential thermal efficiency, thereby making it possible to ensure that the fuel economy is improved.

Preferably, in a control method for an internal combustion engine described above, the step of calculating a first manipulated variable comprises the steps of calculating a first basic manipulated variable in accordance with a predetermined control algorithm; calculating a correction value for canceling out a change in the controlled variable associated with the switching of the combustion mode while applying predetermined forgetting processing; calculating the first manipulated variable by correcting the first basic manipulated variable by the correction value.

This preferred embodiment of the control method for an internal combustion engine provides the same advantageous effects as described above concerning the control apparatus for an internal combustion engine according to the first aspect of the invention.

Preferably, in an engine control unit described above, the control program further causes the computer to calculate a first basic manipulated variable in accordance with a predetermined control algorithm; calculate a correction value for canceling out a change in the controlled variable associated with the switching of the combustion mode while applying predetermined forgetting processing; and calculate the first manipulated variable by correcting the first basic manipulated variable by the correction value.

This preferred embodiment of the engine control unit provides the same advantageous effects as described above concerning the control apparatus for an internal combustion engine according to the first aspect of the invention.

To achieve the above object, according to a fourth aspect of the present invention, there is provided a control apparatus for an internal combustion engine having a plurality of combustion modes which differ from one another in a controlled variable indicative of a generated torque under the same operating condition and operated with the combustion mode being switched among the plurality of combustion modes when a predetermined switching condition is satisfied. The control apparatus is characterized by comprising delaying means for delaying the switching of the combustion mode when a predetermined delay condition is satisfied after the predetermined switching condition has been satisfied; first manipulated variable calculating means for calculating a first manipulated variable for controlling the controlled variable to change in a direction opposite to a direction in which the first manipulated variable cancels out a change in the controlled variable associated with the switching of the combustion mode during a delay of the switching of the combustion mode, and for calculating the first manipulated variable to change in a direction in which the first manipulated variable cancels out in the controlled variable associated with the switching of the combustion mode when the delay of the switching of the combustion mode is terminated; and second manipulated variable calculating means for calculating a second manipulated variable for changing the controlled variable, the second manipulated variable having a smaller width available for a change in the controlled variable in one combustion cycle than the first manipulated variable, to cancel out a change in the controlled variable due to the first manipulated variable during the delay of the switching of the combustion mode by the delaying means.

According to this control apparatus for an internal combustion engine, even when the combustion mode switching condition is satisfied, the switching of the combustion mode is delayed by the delaying means when the predetermined delay condition is satisfied. During the delay, the first manipulated variable is calculated to change in a direction opposite to a direction in which the first manipulated variable cancels out a change in the controlled variable associated with the switching of the combustion mode during a delay of the switching of the combustion mode, and calculated to change in the direction in which the first manipulated variable cancels out the change in the controlled variable associated with the switching of the combustion mode when the delay of the switching of the combustion mode is terminated. Therefore, by changing the first manipulated variable during the combustion mode switching delay up to an amount by which a change in the controlled variable associated with the switching of the combustion mode can be canceled out when it changes in an essential canceling direction in the direction opposite to the canceling direction, such a change in the controlled variable can be rapidly canceled out by the first manipulated variable at a timing at which the controlled variable actually changes in association with the switching of the combustion mode. In addition, during the combustion mode switching delay, the change in the controlled variable due to the first manipulated variable can be appropriately canceled out by the second manipulated variable. As a result, even during the delay, the controlled variable, i.e., generated torque can be held in a stable state.

To achieve the above object, according to a fifth aspect of the present invention, there is provided a control method for an internal combustion engine having a plurality of combustion modes which differ from one another in a controlled variable indicative of a generated torque under the same operating condition and operated with the combustion mode being switched among the plurality of combustion modes when a predetermined switching condition is satisfied. The control method is characterized by comprising the steps of delaying the switching of the combustion mode when a predetermined delay condition is satisfied after the predetermined switching condition has been satisfied; calculating a first manipulated variable for controlling the controlled variable to change in a direction opposite to a direction in which the first manipulated variable cancels out a change in the controlled variable associated with the switching of the combustion mode during a delay of the switching of the combustion mode, and for calculating the first manipulated variable to change in a direction in which the first manipulated variable cancels out in the controlled variable associated with the switching of the combustion mode when the delay of the switching of the combustion mode is terminated; and calculating a second manipulated variable for changing the controlled variable, the second manipulated variable having a smaller width available for a change in the controlled variable in one combustion cycle than the first manipulated variable, to cancel out a change in the controlled variable due to the first manipulated variable during the delay of the switching of the combustion mode.

This control method for an internal combustion engine provides the same advantageous effects as described above concerning the control apparatus for an internal combustion engine according to the fourth aspect of the invention.

To achieve the above object, according to a sixth aspect of the present invention, there is provided an engine control unit including a control program for an internal combustion engine having a plurality of combustion modes which differ from one another in a controlled variable indicative of a generated torque under the same operating condition and operated with the combustion mode being switched among the plurality of combustion modes when a predetermined switching condition is satisfied. The engine control unit is characterized in that the control program causes a computer to delay the switching of the combustion mode when a predetermined delay condition is satisfied after the predetermined switching condition has been satisfied; calculate a first manipulated variable for controlling the controlled variable to change in a direction opposite to a direction in which the first manipulated variable cancels out a change in the controlled variable associated with the switching of the combustion mode during a delay of the switching of the combustion mode, and for calculating the first manipulated variable to change in a direction in which the first manipulated variable cancels out in the controlled variable associated with the switching of the combustion mode when the delay of the switching of the combustion mode is terminated; and calculate a second manipulated variable for changing the controlled variable, the second manipulated variable having a smaller width available for a change in the controlled variable in one combustion cycle than the first manipulated variable, to cancel out a change in the controlled variable due to the first manipulated variable during the delay of the switching of the combustion mode.

This engine control unit provides the same advantageous effects as described above concerning the control apparatus for an internal combustion engine according to the fourth aspect of the invention.

Preferably, in the control apparatus for an internal combustion engine according to the fourth aspect described above, wherein the first manipulated variable calculating means comprises first basic manipulated variable calculating means for calculating a first basic manipulated variable in accordance with a predetermined control algorithm; and correction value calculating means for calculating a correction value for canceling out a change in the controlled variable associated with the switching of the combustion mode while applying predetermined forgetting processing, wherein the first manipulated variable calculating means calculates the first manipulated variable by correcting the first basic manipulated variable by the correction value, wherein the correction value calculating means calculates the correction value such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and calculates the correction value such that the correcting direction of the first basic manipulated variable by the correction value is the same direction as the direction in which the change in the controlled variable associated with the switching of the combustion mode is canceled out when the delay of the switching of the combustion mode is terminated.

According to this control apparatus for an internal combustion engine, the first manipulated variable is calculated by calculating the first basic manipulated variable in accordance with the predetermined control algorithm, and correcting the first basic manipulated variable with the correction value. This correction value is provided to cancel out the change in the controlled variable associated with the switching of the combustion mode, and is calculated such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and is calculated such that the correcting direction of the first basic manipulated variable by the correction value is the same direction as the direction in which the change in the controlled variable associated with the switching of the combustion mode is canceled out when the delay of the switching of the combustion mode is terminated. As described above, the first manipulated variable can change the controlled variable over a wider width than the second manipulated variable in one combustion cycle, so that if an inappropriate degree of correction to the first basic manipulated variable with the correction value results in an inappropriate value of the first manipulated variable, the degree of the change in the controlled variable due to the first manipulated variable can increase to a value which cannot be canceled out by the second manipulated variable, even though the switching of the combustion mode is delayed, with the result that the controlled variable, i.e., generated torque can inappropriately fluctuate. In contrast, according to this control apparatus, since the correction value is calculated while the predetermined response specifying type filtering processing is applied during the delay of the switching of the combustion mode by the delaying means, a correction degree of the first basic manipulated variable with the correction value can be appropriately set by appropriately setting response specifying characteristics of the filtering processing, with the result that the first manipulated variable can be calculated as a value which permits a change in the controlled variable due to the first manipulated variable to be appropriately canceled out by the second manipulated variable. As a result, the controlled variable, i.e., generated torque can be held in a stable state without fail during the delay of the switching of the combustion mode.

Preferably, in the control method for an internal combustion engine according to the fifth aspect described above, the step of calculating a first manipulated variable comprises the steps of calculating a first basic manipulated variable in accordance with a predetermined control algorithm; calculating a correction value for canceling out a change in the controlled variable associated with the switching of the combustion mode while applying predetermined forgetting processing; and calculating the first manipulated variable by correcting the first basic manipulated variable by the correction value, wherein the step of calculating the correction value includes calculating the correction value such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and calculating the correction value such that the correcting direction of the first basic manipulated variable by the correction value is the same direction as the direction in which the change in the controlled variable associated with the switching of the combustion mode is canceled out when the delay of the switching of the combustion mode is terminated.

This preferred embodiment of the control method for an internal combustion engine provides the same advantageous effects as described above concerning the control apparatus for an internal combustion engine according to the fourth aspect of the invention.

Preferably, in the engine control unit according to the sixth aspect described above, the control program further causes the computer to calculate a first basic manipulated variable in accordance with a predetermined control algorithm; calculate a correction value for canceling out a change in the controlled variable associated with the switching of the combustion mode while applying predetermined forgetting processing; calculate the first manipulated variable by correcting the first basic manipulated variable by the correction value; and calculate the correction value such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and calculate the correction value such that the correcting direction of the first basic manipulated variable by the correction value is the same direction as the direction in which the change in the controlled variable associated with the switching of the combustion mode is canceled out when the delay of the switching of the combustion mode is terminated.

This preferred embodiment of the engine control unit provides the same advantageous effects as described above concerning the control apparatus for an internal combustion engine according to the fourth aspect of the invention.

Preferably, in the control apparatus for an internal combustion engine according to the fourth aspect described above, the first manipulated variable calculating means calculates the first manipulated variable using a model which represents the relationship between the plurality of combustion modes and the controlled variable.

In an internal combustion engine which is operated in one of a plurality of different combustion modes switched from one to another, under an operating condition in which a controlled variable indicative of a generated torque is the same, as in this internal combustion engine, the controlled variable, i.e., generated torque in the plurality of combustion modes further changes in accordance with the operating condition such as a load, rotational speed or the like of the internal combustion engine, so that if an attempt is made to calculate the manipulated variable of the internal combustion engine using a map and a program which have been previously set to correspond to such a changing condition of the controlled variable, the number of operation steps for setting the map, the amount of the program, and a processing load are all immensely increased, thus experiencing substantial difficulties. In contrast, according to this preferred embodiment of the control apparatus for an internal combustion engine, the first manipulated variable is calculated using the model which represents the relationship between the plurality of combustion modes and the controlled variable, and operations for previously setting the model, i.e., identification operations are easy as compared with the operations for setting the map, thus making it possible to dramatically reduce the number of operation steps, and to dramatically reduce the amount of program and processing load as well by making calculations using such a model.

Preferably, in the control method for an internal combustion engine according to the fifth aspect described above, the step of calculating a first manipulated variable includes calculating the first manipulated variable using a model which represents the relationship between the plurality of combustion modes and the controlled variable.

This preferred embodiment of the control method for an internal combustion engine provides the same advantageous effects as described above concerning the control apparatus for an internal combustion engine according to the fourth aspect of the invention.

Preferably, in the engine control unit according to the sixth aspect described above, the control program further causes the computer to calculate the first manipulated variable using a model which represents the relationship between the plurality of combustion modes and the controlled variable.

This preferred embodiment of the engine control unit provides the same advantageous effects as described above concerning the control apparatus for an internal combustion engine according to the fourth aspect of the invention.

Preferably, in the control apparatus for an internal combustion engine according to the fourth aspect described above, the correction value calculating means calculates the correction value based on a dynamic characteristic model which represents the relationship between the correction value and the controlled variable.

Generally, dynamic characteristics such as a response delay, a dead time and the like exist between a controlled variable indicative of a generated torque in an internal combustion engine and a manipulated variable for changing the controlled variable, so that even if the correction value for calculating the first manipulated variable is calculated by a static calculation approach or the like, the correction value cannot be appropriately calculated due to the influence of the dynamic characteristics, and with the first manipulated variable calculated using such a correction value, a transient change in the controlled variable cannot be canceled out with high accuracy. Also, if an attempt is made to set a manipulated variable which has the ability to cancel out such a transient change in the controlled variable through a manual tuning operation in a try and error fashion, this attempt will result in a significant increase in the number of setting steps. In contrast, according to this preferred embodiment of the control apparatus for an internal combustion engine, the correction value is calculated based on the dynamic characteristic model which represents the relationship between the correction value and the controlled variable, and the operation for previously setting the dynamic characteristic model does not relay on a try-and-error approach, but can be executed in accordance with a variety of identification algorithms by measuring data on the controlled variable when a predetermined correction value is applied to a controlled object, and using the correction value and measured data on the controlled variable. Since the operation is easier than the manual tuning operation, the number of operation steps can be largely reduced.

Preferably, in the control method for an internal combustion engine according to the fifth aspect described above, the step of calculating a correction value includes calculating the correction value based on a dynamic characteristic model which represents the relationship between the correction value and the controlled variable.

This preferred embodiment of the control method for an internal combustion engine provides the same advantageous effects as described above concerning the control apparatus for an internal combustion engine according to the fourth aspect of the invention.

Preferably, in the engine control unit according to the sixth aspect described above, the control program further causes the computer to calculate the correction value based on a dynamic characteristic model which represents the relationship between the correction value and the controlled variable.

This preferred embodiment of the engine control unit provides the same advantageous effects as described above concerning the control apparatus for an internal combustion engine according to the fourth aspect of the invention.

Preferably, the control apparatus for an internal combustion engine according to the fourth aspect described above, further comprises target controlled variable calculating means for calculating a target controlled variable which is a target for the controlled variable; and modifying means for modifying the first manipulated variable and the second manipulated variable in accordance with a predetermined feedback control algorithm, such that the controlled variable reaches the target controlled variable.

Generally, when the combustion mode of an internal combustion engine is switched among a plurality of combustion modes, the degree of a change in a generated torque, i.e., the degree of a change in the controlled variable is not uniform due to variations in individual internal combustion engines, aging changes and the like. For this reason, even if an operating condition is previously set for a manipulated variable for changing the controlled variable for purposes of canceling out a change in the controlled variable associated with the switching of the combustion mode, the resulting canceling accuracy, i.e., compensation accuracy can be degraded. In contrast, according to this preferred embodiment of the control apparatus for an internal combustion engine, since the first manipulated variable and second manipulated variable are modified in accordance with the predetermined feedback control algorithm such that the controlled variable reaches the target controlled variable, a change in the controlled variable can be appropriately canceled out with the two manipulated variables even if there are variations among individual internal combustion engines, aging changes and the like, thus making it possible to improve the canceling accuracy, i.e., compensation accuracy.

Preferably, the control method for an internal combustion engine according to the fifth aspect described above further comprises the steps of calculating a target controlled variable which is a target for the controlled variable; and modifying the first manipulated variable and the second manipulated variable in accordance with a predetermined feedback control algorithm, such that the controlled variable reaches the target controlled variable.

This preferred embodiment of the control method for an internal combustion engine provides the same advantageous effects as described above concerning the control apparatus for an internal combustion engine according to the fourth aspect of the invention.

Preferably, in the engine control unit according to the sixth aspect described above, the control program further causes the computer to calculate a target controlled variable which is a target for the controlled variable; and modify the first manipulated variable and the second manipulated variable in accordance with a predetermined feedback control algorithm, such that the controlled variable reaches the target controlled variable.

This preferred embodiment of the engine control unit provides the same advantageous effects as described above concerning the control apparatus for an internal combustion engine according to the fourth aspect of the invention.

DETAILED DESCRIPTION OF THE EMBODIMENTS

In the following, a control apparatus for an internal combustion engine according to a first embodiment of the present invention will be described with reference to the drawings. This control apparatus 1, which controls an internal combustion engine (hereinafter called the "engine") 3 shown in FIG. 1, and comprises an ECU 2. As will be later described, this ECU 2 executes a variety of control processing such as engine rotational speed control processing during idling operation (hereinafter called the "idle rotational speed control"), and the like in accordance with an operating condition of the engine 3.

Figure 1:
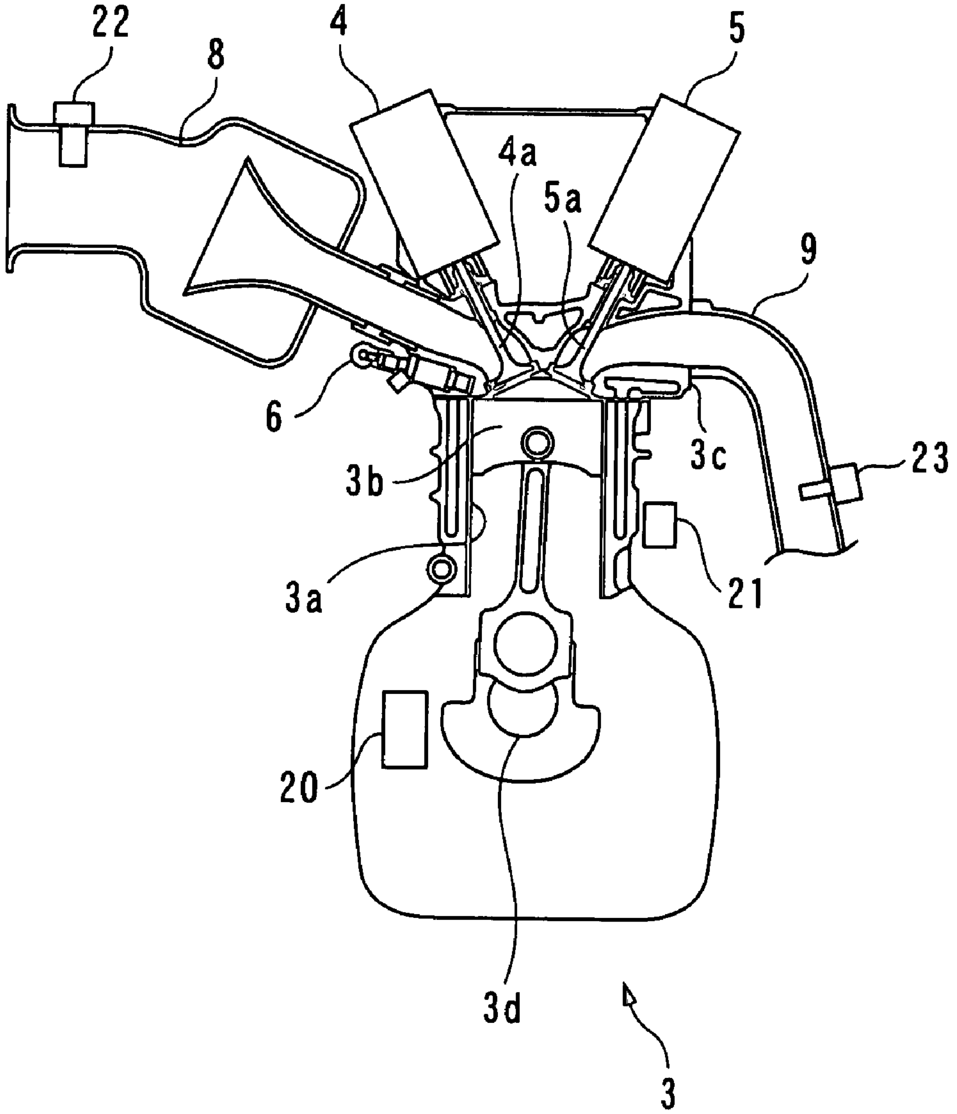
FIG. 1 is a diagram generally showing the configuration of an internal combustion engine to which a control apparatus according to a first embodiment of the present invention is applied.
Figure 2:
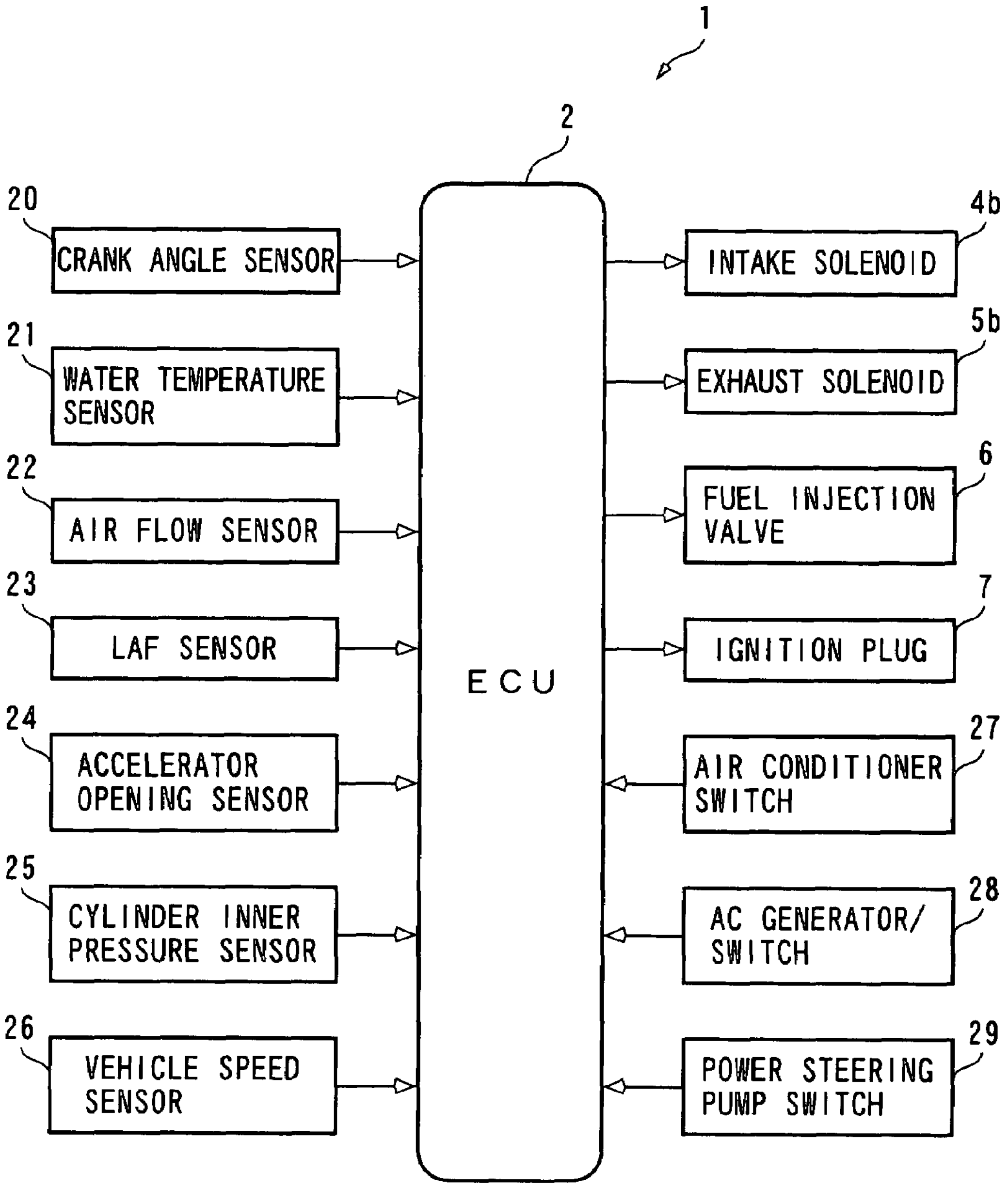
FIG. 2 is a block diagram generally showing the configuration of the control apparatus according to the first embodiment.

As shown in FIG. 1, the engine 3 is an in-line four-cylinder gasoline engine having four sets of cylinders 3*a* and pistons 3*b* (only one set of which is shown), and is equipped in a vehicle (not shown) having an automatic transmission. The engine 3 is provided with a variable intake value driving mechanism 4, a variable exhaust valve driving mechanism 5, a fuel injection valve 6, and an ignition plug 7 (only one is shown in FIG. 2) for each cylinder 3*a*. This variable intake valve driving mechanism 4 is of an electromagnetic type for electromagnetically driving the intake valve 4*a* to open and close, and comprises a coil spring for urging the intake valve 4*a* in a closing direction, an intake solenoid 4*b* (only one is shown in FIG. 2) electrically connected to the ECU 2, and the like.

In this variable intake valve driving mechanism 4, the intake valve 4*a* is held at a valve closing position by an urging force of the coil spring when the intake solenoid 4*b* is in anon-excited state. Also, when the intake solenoid 4*b* is excited by the ECU 2, the intake valve 4*a* is driven in a valve opening direction against the urging force of the coil spring by the electromagnetic force, and held in an opened state. When the intake solenoid 4*b* is returned to the non-excited state, the intake valve 4*a* is returned to the closed state by the urging force of the coil spring.

Figure 3:
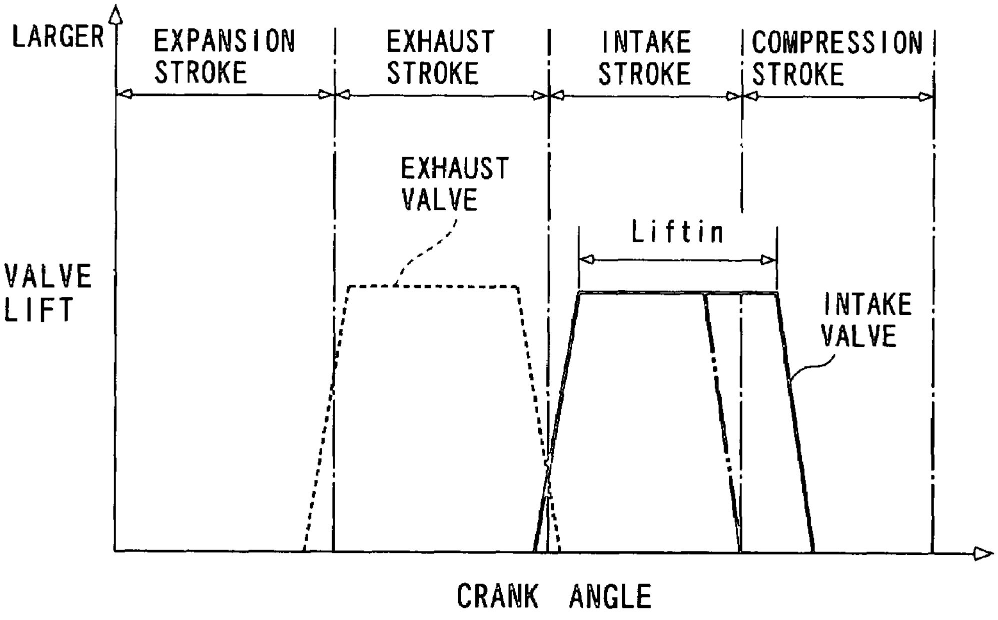
FIG. 3 is a valve lift curve for describing intake valve and exhaust valve opening operations performed by a variable intake valve driving mechanism and a variable exhaust valve driving mechanism, respectively.

With the foregoing configuration, the intake valve 4*a*, the intake valve 4*a* is configured to freely change its valve timings (i.e., a valve opening and a valve closing timing) through the variable intake valve driving mechanism 4, and present a valve lift curve substantially in a trapezoidal shape, as shown in FIG. 3. In this embodiment, the intake valve 4*a* has its valve opening timing held constant by the ECU 2 and freely controlled between a late closing timing on the most retarding side, shown by a solid line, and an early closing timing on the most advancing side, shown by a two-dot chain line in FIG. 3. In the following description, a period of a crank angle at which the intake valve is held maximally lifted during the opening of the intake valve 4*a* is referred to as an "intake valve opening angle Liftin" (see FIG. 3). Specifically, in the variable intake valve driving mechanism 4, an intake air amount Gcyl increases more as the intake valve opening angle Liftin is larger.

The variable exhaust valve driving mechanism 5 is of an electromagnetic type for electromagnetically driving the exhaust valve 5*a* to open and close, like the variable intake valve driving mechanism 4, and comprises a coil spring for urging the exhaust valve 5*a* in a valve closing direction, an exhaust solenoid 5*b* (only one is shown in FIG. 2) electrically connected to the ECU 2, and the like.

In this variable exhaust valve driving mechanism 5, the exhaust valve 5*a* is held at a valve closing position by an urging force of the coil spring when the exhaust solenoid 5*b* is in anon-excited state. Also, when the exhaust solenoid 5*b* is excited by the ECU 2, the exhaust valve 5*a* is driven in a valve opening direction against the urging force of the coil spring by the electromagnetic force, and held in an opened state. When the exhaust solenoid 5*b* is returned to the non-excited state, the exhaust valve 5*a* is returned to the closed state by the urging force of the coil spring.

With the foregoing configuration, the exhaust valve 5*a* is configured to freely change its valve timings (i.e., a valve opening and a valve closing timing) through the variable exhaust valve driving mechanism 5, and present a valve lift curve substantially in a trapezoidal shape, as shown by a broken line in FIG. 3. It should be noted that in this embodiment, during control processing later described, the valve timing of the exhaust valve 5*a* is held constant.

The fuel injection valve 6 in turn is attached to the cylinder head 3*c* so as to directly inject a fuel into a combustion chamber. In other words, the engine 3 is configured as a direct injection engine. This fuel injection valve 6 is electrically connected to the ECU 2, such that the ECU 2 controls a valve opening time and a valve opening timing. That is, fuel injection control is conducted.

As will be later described, in this fuel injection control, a fuel injection mode of the engine 3 is switched to a single injection mode and a split injection mode in accordance with an operating condition thereof. In the single injection mode, the fuel is injected once during an intake stroke and a compression stroke such that an air/fuel mixture is uniformly burnt. On the other hand, in the split injection mode, the fuel is injected twice in parts during an intake stroke and a compression stroke such that the air/fuel mixture is stratified. In other words, the combustion mode of the air/fuel mixture is switched between a uniform combustion mode and a stratified combustion mode by switching the fuel injection mode between the single injection mode and the split injection mode.

The ignition plug 7 is also electrically connected to the ECU 2, such that ECU 2 controls a discharge state to burn the air/fuel mixture within the combustion chamber at a timing in accordance with an ignition timing Ig_log. That is, ignition timing control is executed.

The engine 3 is further provided with a crank angle sensor 20 and a water temperature sensor 21. The crank angle sensor 20 comprises a magnet rotor and an MRE pickup, and outputs a CRK signal and a TDC signal, both of which are pulse signals, in association with rotations of a crank shaft 3*d*, to the ECU 2.

The CRK signal is outputted one pulse every predetermined crank angle (for example, 1°), such that the ECU 2 calculates a rotational speed NE of the engine 3 (hereinafter called the "engine rotational speed") based on the CRK signal. The TDC signal in turn is a signal which indicates that the piston 3*b* of each cylinder 3*a* is at a predetermined crank angle position slightly in front of a TDC position of the intake stroke. In the four-cylinder engine 3 of this embodiment, one pulse is outputted every 180° of the crank angle.

The water temperature sensor 21 detects an engine water temperature TW which is the temperature of cooling water which circulates within a cylinder block of the engine 3, and outputs a detection signal indicative of the engine water temperature TW to the ECU 2.

An air flow sensor 22 is provided in an intake passage 8 of the engine 3. This air flow sensor 22, which comprises a hot wire type air flow meter, detects the flow rate of air (hereinafter called the "air flow rate") flowing through the intake passage 8, and outputs a detection signal indicative of the air flow rate to the ECU 2. The ECU 2 calculates an intake air amount Gcyl per cylinder based on the detection signal of the air flow sensor 22, as will be later described.

On the other hand, a LAF sensor 23 is provided in an exhaust passage 9 of the engine 3. The LAF sensor 23, which is made of zirconium, a platinum electrode and the like, linearly detects an oxygen concentration in exhaust gases which pass through the exhaust passage 9 over a wide range of the air/fuel ratio extending from a rich region, richer than the stoichiometric air/fuel ratio, to an extremely lean region, and outputs a detection signal indicative of the oxygen concentration to the ECU 2. The ECU 2 calculates a detected air/fuel ratio indicative of the air/fuel ratio in exhaust gases based on the value of the detection signal from the LAF sensor 23.

Further, as shown in FIG. 2, ECU 2 is connected to a cylinder inner pressure sensor 24, an accelerator opening sensor 25, a vehicle speed sensor 26, an air conditioner switch 27, an AC generator switch 28, and a power steering pump switch 29, respectively.

The cylinder inner pressure sensor 24, which is of a piezoelectric element type, integrated with the ignition plug 7, is provided for each cylinder 3*a* (only one is shown). The cylinder inner pressure sensor 24 distorts in association with variations in the pressure in each cylinder 3*a*, i.e., a cylinder inner pressure Pcyl to output a detection signal indicative of the cylinder inner pressure Pcyl to the ECU 2. The ECU 2 calculates an indicated mean effective pressure Pmi shown in the drawing based on the detection signal from the cylinder inner pressure sensor 24.

The accelerator opening sensor 25 detects an amount AP by which the driver treads on an accelerating pedal, not shown, of the vehicle (hereinafter called the "accelerator opening"), and outputs a detection signal indicative of the accelerator opening AP to the ECU 2. Further, the vehicle speed sensor 26, which is attached to an axle, not shown, of the vehicle, detects a running speed VP of the vehicle (hereinafter called the "vehicle speed"), and outputs a detection signal indicative of the running speed VP to the ECU 2.

The air conditioner switch 27 outputs an ON signal to the ECU 2 when an air conditioner, not shown, is operating, and outputs an OFF signal when it is in stop. The AC generator switch 28 in turn outputs an ON signal to the ECU 2 when an AC generator, not shown is operating, and outputs an OFF signal when it is in stop. Further, the power steering pump switch 29 outputs an ON signal to the ECU 2 when a power steering pump, not shown, is operating, and outputs an OFF signal when it is in stop. The ECU 2 calculates au accessory load Load based on the ON/OFF signals of these switches 27-29.

The ECU 2, which is based on a microcomputer which comprises a CPU, a RAM, a ROM, an I/O interface (none of which is shown), and the like, determines the operating condition of the engine 3 in accordance with the detection signals of a variety of the aforementioned sensors 20-26, the ON/OFF signals of a variety of the aforementioned sensors 27-29, and the like, and executes a variety of control processing including the idle rotational speed control. In this idle rotational speed control, the ECU 2 controls the intake valve opening Liftin, i.e., intake air amount Gcyl through the variable intake valve driving mechanism 4 during an idle operation, and simultaneously controls the ignition timing Ig_log through the ignition plug 7, as will be later described, thereby controlling the engine rotational speed NE. That is, the ECU 2 executes the idle rotational speed control.

In this event, the ignition timing control is characterized by having a wide variable width of an engine torque TRQ during one combustion cycle, i.e., a larger width in which the engine rotational speed NE can be changed during an idle operation, in addition to a small response delay, as compared with intake air amount control, but suffering from limitations in a control width of the ignition timing Ig_log, from a viewpoint of a combustion state of the engine 3. On the other hand, the intake air amount control is characterized by having a small width in which the engine rotational speed NE can be changed during an idle operation and a large response delay in one combustion cycle, as compared with the ignition timing control, resulting in poor convergence of the engine rotational speed NE to a target rotational speed NE_cmd.

In this embodiment, the ECU 2 implements first manipulated variable calculating means, second manipulated variable calculating means, first basic manipulated variable calculating means, correction value calculating means, delaying means, target controlled variable calculating means, and modifying means.

Next, the concept of an idle rotational speed control approach according to this embodiment will be described. First, as described above, in the engine 3 of this embodiment, the fuel injection mode is switched between the single injection mode and split injection mode in accordance with the engine operating condition, thereby causing an air/fuel mixture combustion mode to be switched between a uniform combustion mode and a stratified combustion mode. Assume in the following description that in an arbitrary cylinder 3*a*, the total amount of the fuel injected from the fuel injection valve 6 in one combustion cycle is defined by a total fuel injection amount Tcyl; the amount of the fuel injected at the first time in the split injection mode by a first-time injection amount Tcyl1; the amount of the fuel injected at the second time by a second-time injection amount Tcyl2 (=Tcyl−Tcyl1); and a first-time injection ratio Rinj by Rinj=Tcyl1/(Tcyl1+Tcyl2). In this event, in the single injection mode, i.e., when Tcyl2=0, Rinj=1, whereas in the split injection mode, Rinj<1.0.

Figure 4:
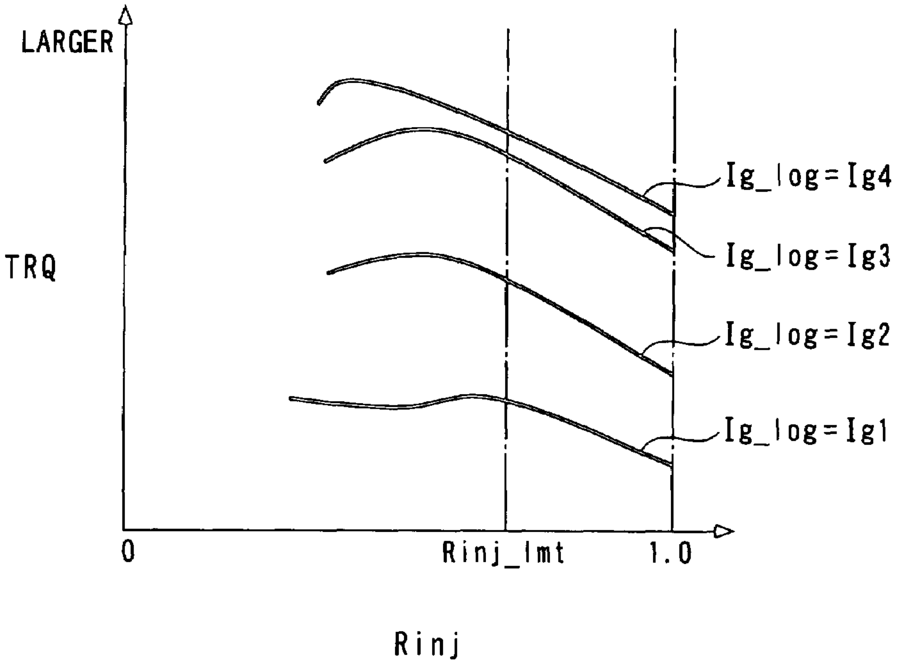
FIG. 4 is a diagram showing the result of measurements of a torque TRQ generated by the internal combustion engine when a first-time injection ratio Rinj and an ignition timing Ig_log.

FIG. 4 shows the result of measuring a torque TRQ generated by the engine 3 (hereinafter called the "engine torque") according to this embodiment when the first-time injection ratio Rinj and ignition timing Ig_log are changed while the intake air amount Gcyl and total fuel injection amount Tcyl are held constant. In FIG. 4, Ig1-Ig4 represent predetermined values of the ignition timing Ig_log, respectively, and are set to establish the relationship of Ig1<Ig2<Ig3<Ig4. In this embodiment, the ignition timing Ig_log is set to the value of zero at a predetermined crank angle position (for example, at the TDC position in a compression stroke), to a positive vale on an advancing side from the predetermined crank angle position, and to a negative value on a retarding side. Accordingly, the value Ig4 is set to the most advancing value among the aforementioned predetermined values Ig1-Ig4.

As shown in FIG. 4, it is understood that in this engine 3, as the first-time injection ratio Rinj is changed from the value of 1.0 to a smaller value while the intake air amount Gcyl, total fuel injection amount Tcyl, and ignition timing Ig_log are held constant, the engine torque TRQ increases. This is attributable to an improved thermal efficiency (i.e., combustion efficiency) resulting from a change of the air/fuel mixture combustion mode from the uniform combustion mode to the stratified combustion mode.

On the other hand, in the fuel injection valve 6, a minimum value Tmin for the amount of fuel available for injection cannot be set to an extremely small value for a design-related reason that a maximum value for the amount of fuel available for injection must be set to a large value to some degree in order to ensure the engine torque TRQ required in a high load condition. Thus, in the relationship between the minimum value Tmin and the first-time injection amount Tcyl1 and second-time injection amount Tcyl2 in the split injection mode, when Tcyl1<Tmin or Tcyl2<Tmin is established, a fuel injection control accuracy is extremely degraded, possibly failing to appropriately carry out the fuel injection. In this event, the fuel injection valve 6 of this embodiment is configured to establish Tcyl2<Tmin when the first-time injection ratio Rinj lies within a range of Rinj_lmt<Rinj<1.0 shown in FIG. 4, where Rinj_lmt represents a predetermined threshold value (for example, 0.8) for the first-time injection ratio Rinj.

Due to the fuel injection valve 6 having the characteristics as described above, if the ignition timing Ig_log and first-time injection ratio Rinj are changed while the intake air amount Gcyl and total fuel injection amount Tcyl are held constant in order to control the engine torque TRQ in an increasing direction or a decreasing direction when the accessory load Load or the like fluctuates during the idle rotational speed control, this can result in sudden fluctuations in torque, i.e., sudden fluctuations in the engine rotational speed NE (hereinafter called the "rotation fluctuations"). In the following, the reason for that will be described with reference to FIG. 5.

Figure 5:
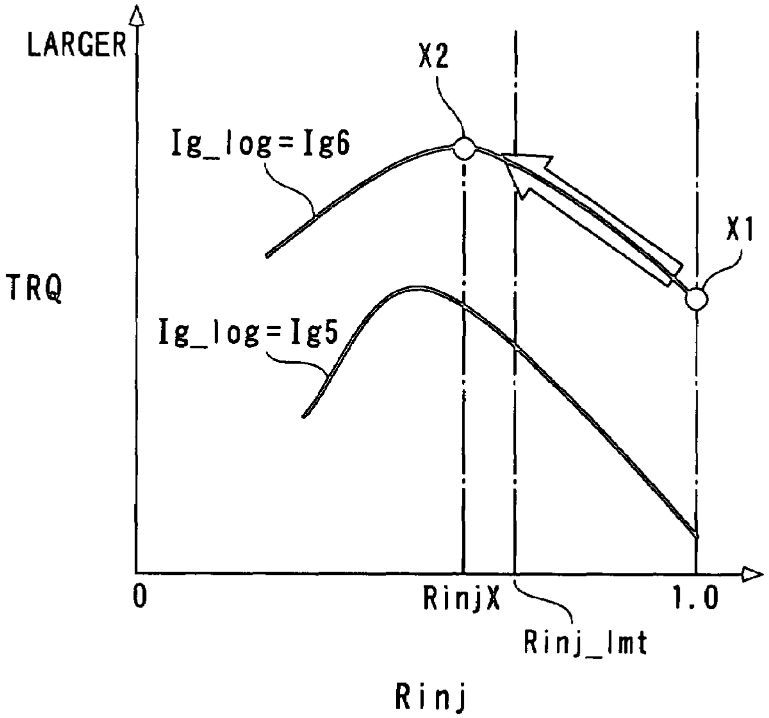
FIG. 5 is a diagram for describing a control approach for idle rotational speed control according to the first embodiment.

FIG. 5 shows an example in which the ignition timing Ig_log and first-time injection ratio Rinj are shifted from a state X1 (Rinj=1.0, Ig_log=Ig6) to a state X2 (Rinj=RinjX, Ig_log=Ig6) while the intake air amount Gcyl and total fuel injection amount Tcyl are held constant in order to improve the thermal efficiency by switching the combustion mode to the stratified combustion mode, to control the engine torque TRQ in the increasing direction, due to an increase in the accessory load Load or the like during the idle rotational speed control. In FIG. 5, RinjX represents a predetermined value for the first-time injection ratio Rinj at which RinjX<Rinj_lmt is established. Ig5, Ig6 represent predetermined values for the ignition timing Ig_log at which Ig5<Ig6 is established.

As shown in FIG. 5, when an attempt is made to shift the ignition timing Ig_log and first-time injection ratio Rinj from the condition X1 to the condition X2 in order to switch the combustion mode from the uniform combustion mode to the stratified combustion mode, the first-time injection ratio Rinj cannot be gradually changed within the range of Rinj_lmt<Rinj<1.0 due to the aforementioned characteristics of the fuel injection valve 6, so that the first-time injection ratio Rinj must be changed from the value of 1.0 to a value smaller than the threshold value Rinj_lmt at a stretch. As a result, a sudden change in the thermal efficiency is caused by the switching of the combustion mode associated with the switching of the fuel injection mode, resulting in sudden fluctuations in rotation.

Figure 6:
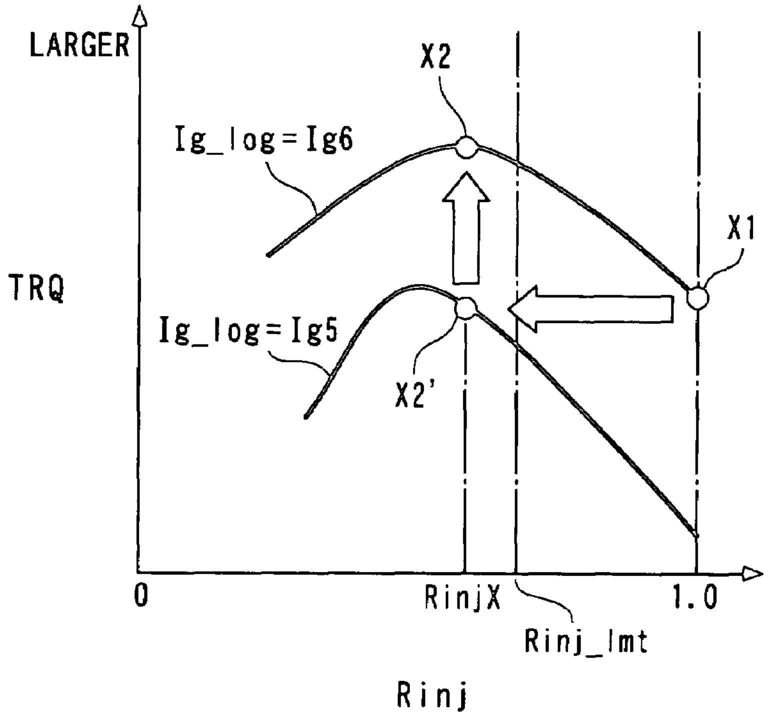
FIG. 6 is a diagram for describing a control approach when the generated torque TRQ is controlled in an increasing direction in the idle rotational speed control according to the first embodiment.

To avoid this, in the present invention, when the combustion mode is switched from the uniform combustion mode to the stratified combustion mode in order to improve the thermal efficiency during the idle rotational speed control, the ignition timing Ig_log and first-time injection ratio Rinj are first shifted rapidly from the state X1 (Rinj=1.0, Ig_log=Ig6) to a state X2' (Rinj=RinjX, Ig_log=Ig5), while the intake air amount Gcyl and total fuel injection amount Tcyl are held constant, as shown in FIG. 6. In this event, since engine torque TRQ in the state X1 has the same value as that in the state X2, no fluctuations in rotation are caused.

Next, the ignition timing Ig_log is shifted from the value Ig5 to the value Ig6 (i.e., shifted from the state X2' to the state X2) using a compensation value Umusic_ig, later described, while the total fuel injection amount Tcyl is held constant and the first-time injection ratio Rinj is held at the value RinjX, and simultaneously, an intake manipulated variable Uar is calculated by a coordinated feedback control algorithm, later described, so as to cancel out an increase in the engine rotational speed NE associated with a change of the ignition timing Ig_log in the advancing direction, for use in controlling the intake air amount Gcyl. In this event, since the intake air amount control suffers from a larger response delay than the ignition timing control as mentioned above, the ignition timing Ig_log is shifted from the predetermined value Ig5 to the predetermined value Ig6 at a speed which is set to a value that can be followed by the intake air amount control. The foregoing control approach can restrain sudden fluctuations in rotation when the combustion mode is switched from the uniform combustion mode to the stratified combustion mode in order to improve the thermal efficiency during the idle rotational speed control.

On the other hand, contrary to the example of FIG. 5, when the combustion mode is switched from the stratified combustion mode to the uniform combustion mode to control the engine torque TRQ in the decreasing direction due to a decrease in the accessory load Load or the like, for example, when the ignition timing Ig_log and first-time injection ratio Rinj are shifted from the state X2 (Rinj=RinjX, Ig_log=Ig6) to the state X1 (Rinj=1.0, Ig_log=Ig6), the first-time injection ratio Rinj must be changed from a value smaller than the threshold value Rinj_lmt to the value of 1.0 at a stretch due to the aforementioned characteristics of the fuel injection valve 6. As a result, a sudden drop of the torque is caused to result in sudden fluctuations in rotation.

Figure 7:
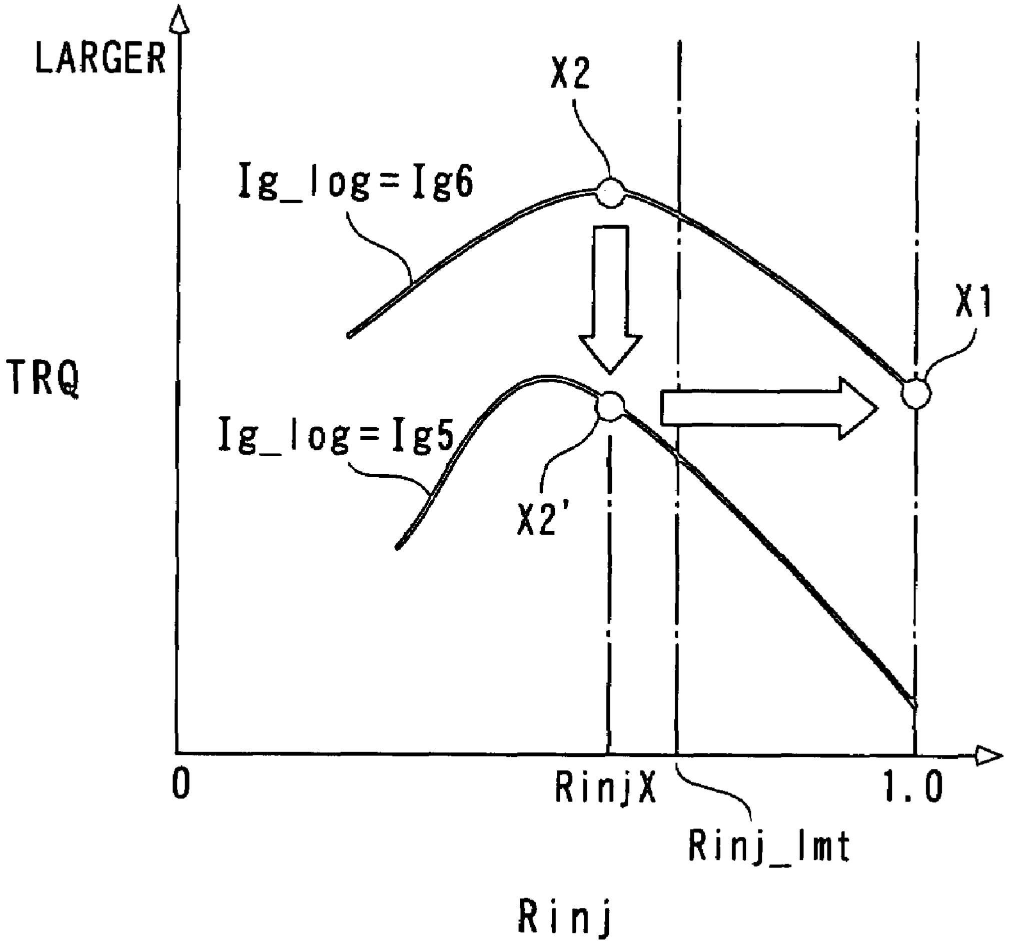
FIG. 7 is a diagram for describing a control approach when the generated torque TRQ is controlled in a decreasing direction in the idle rotational speed control according to the first embodiment.

To eliminate this, in the present invention, when the combustion mode is switched from the stratified combustion mode to the uniform combustion mode, the ignition timing Ig_log is first shifted from the value Ig6 to the value Ig5 using the aforementioned compensation value Umusic_ig while, while the total fuel injection amount Tcyl is held constant and the first-time injection ratio Rinj is held at the value RinjX, as shown in FIG. 7, and simultaneously, the ignition manipulated variable Uig is calculated by the aforementioned coordinated feedback control algorithm, thereby controlling the intake air amount Gcyl. In this event, the ignition timing Ig_log is shifted at a speed which is set to value which permit the intake air amount control to follow for the reason set forth above. In the foregoing manner, sudden fluctuations in rotation can be restrained.

Next, the ignition timing Ig_log and first-time injection ratio Rinj are rapidly shifted from the state X2' (Rinj=RinjX, Ig_log=Ig5) to the state X1 (Rinj=1.0, Ig_log=Ig6), while the intake air amount Gcyl and total fuel injection amount Tcyl are held. In this event, since the engine torque TRQ in the state X1 has the same value as that in the state X2, neither fluctuations in rotation nor torque step will be caused. With the foregoing control approach, sudden fluctuations in rotation can be restrained even when the combustion mode is switched from the stratified combustion mode to the uniform combustion mode during the idle rotational speed control.

Figure 8:
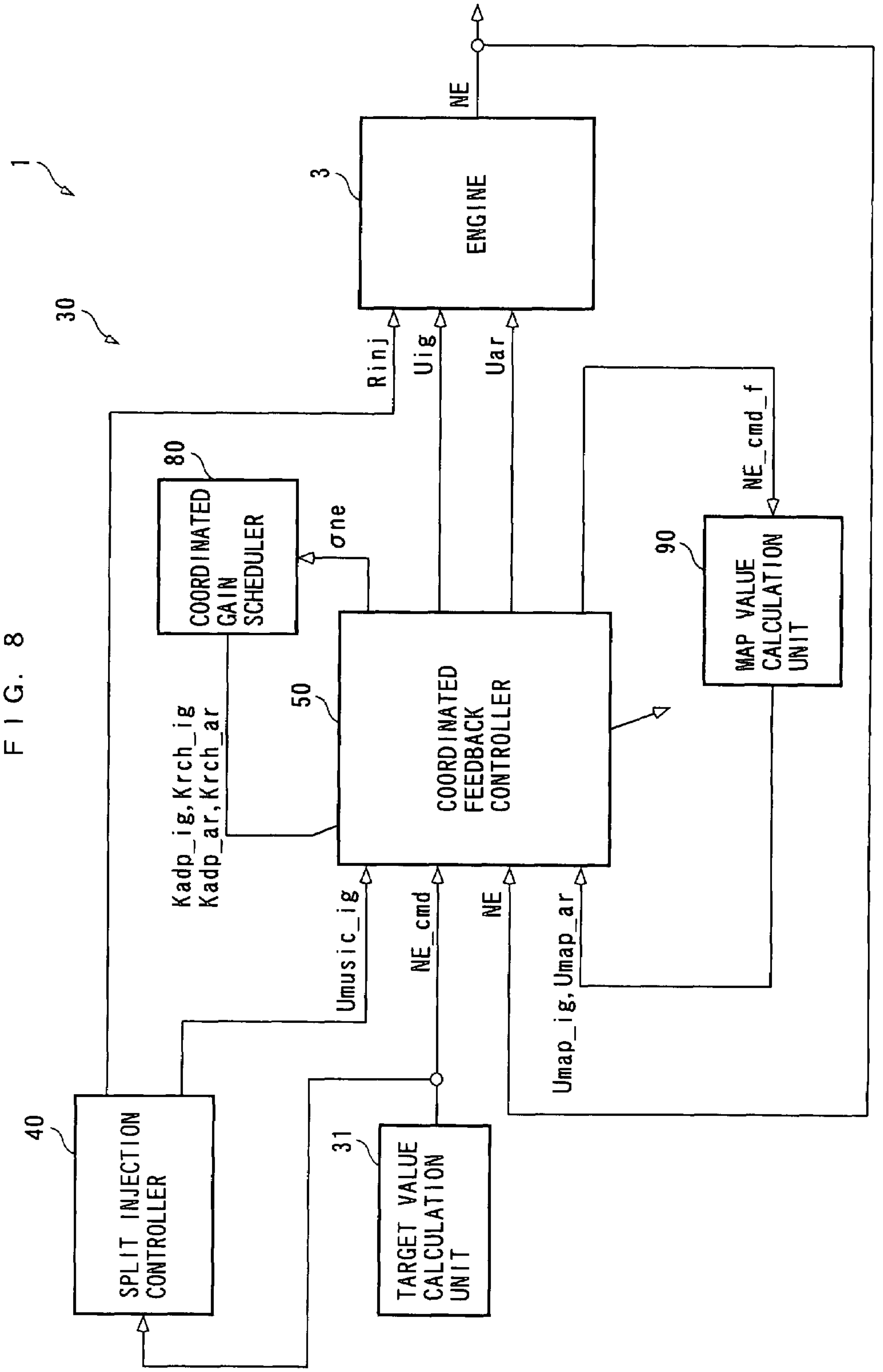
FIG. 8 is a block diagram showing the configuration of an idle rotational speed controller.

Next, the control apparatus 1 according to this embodiment will be described with reference to FIG. 8. As illustrated in FIG. 8, the control apparatus 1 comprises an idle rotational speed controller 30. Specifically, the idle rotational speed controller 30 is implemented by the ECU 2.

The idle rotational speed controller 30 calculates the first-time injection ratio Rinj, ignition manipulated variable Uig, and intake manipulated variable Uar by a control algorithm described below, and inputs these three values Rinj, Uig, Uar to the engine 3 as a controlled object to feedback control the engine rotational speed NE as a controlled variable during an idle operation such that it converges a target rotational speed NE_cmd without giving rise to sudden fluctuations in rotation of the engine 3 (in other words, a torque step). This ignition manipulated variable Uig is the ignition timing Ig_log, while the intake manipulated variable Uar is a target intake valve opening Liftin_cmd which is a target when the intake valve opening Liftin is feedback controlled, as will be later described. In this embodiment, the idle rotational speed controller 30 corresponds to first manipulated variable calculating means and second manipulated variable calculating means, the ignition manipulated variable Uig corresponds to a first manipulated variable, and the intake manipulated variable Uar corresponds to a second manipulated variable.

As illustrated in FIG. 8, the idle rotational speed controller 30 comprises a target value calculation unit 31, a split injection controller 40, a coordinated feedback controller 50, a coordinated gain scheduler 80, and a map value calculation unit 90.

The target value calculation unit 31 calculates a target rotational speed NE_cmd which is a target for the engine rotational speed NE during the idle rotational speed control, as will be later described. In this embodiment, the target value calculation unit 31 corresponds to target controlled variable calculating means, while the target rotational speed NE_cmd corresponds to a target controlled variable.

The split injection controller 40 in turn calculates the compensation value Umusic_ig and first-time injection ratio Rinj in accordance with the target rotational speed NE_cmd, as will be later described. In this embodiment, the split injection controller 40 corresponds to compensation value calculating means and delaying means, while the compensation value Umusic_ig corresponds to a correction value.

Further, the coordinated feedback controller 50 calculates the ignition manipulated variable Uig and intake manipulated variable Uar in accordance with the target rotational speed NE_cmd, engine rotational speed NE, compensation value Umusic_ig, two map values Umap_ig, Umap_ar, and four gains Krch_ig, Kadp_ig, Krch_ar, Kadp_ar, as will be later described. In this embodiment, the coordinated feedback controller 50 corresponds to first basic manipulated variable calculating means and modifying means.

The coordinated gain scheduler 80 in turn calculates the four gains Krch_ig, Kadp_ig, Krch_ar, Kadp_ar in accordance with a switching function σne calculated by the coordinated feedback controller 50, as will be later described.

The map value calculation unit 90 calculates the two map values Umap_ig, Umap_ar in accordance with a filter value NE-cmd_f for the target rotational speed calculated by the coordinated feedback controller 50, as will be later described. In this embodiment, the map value calculation unit 90 corresponds to a first basic manipulated variable calculating means.

Figure 9:
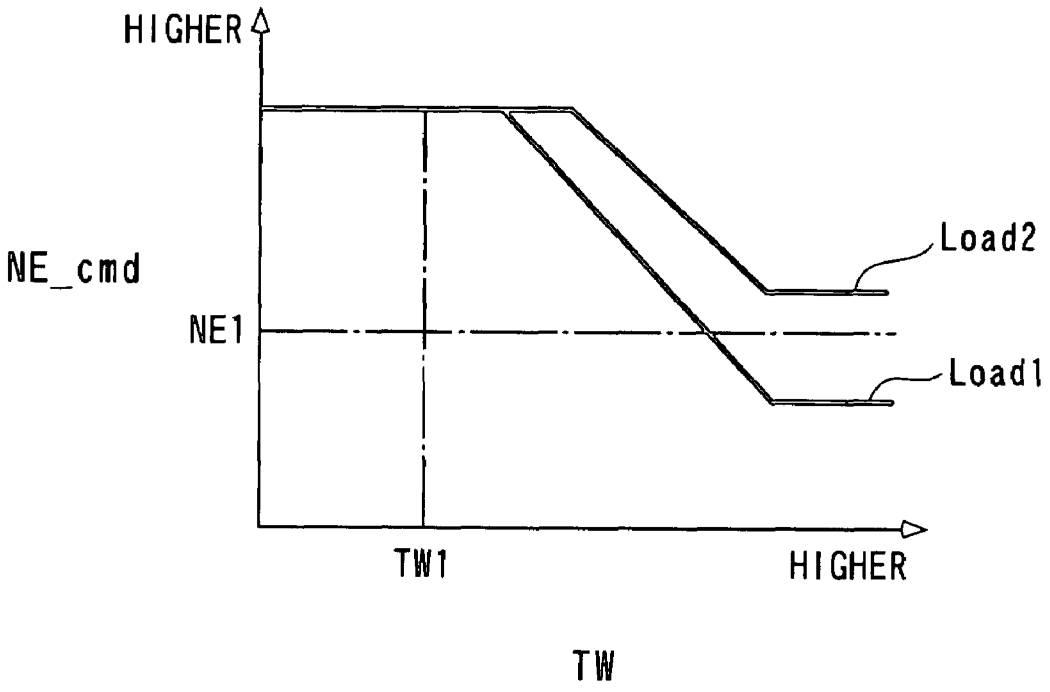
FIG. 9 is a diagram showing an example of a map used to calculate a target rotational speed NE_cmd.

Next, the aforementioned target value calculation unit 31 will be described. This target value calculation unit 31 calculates the target rotational speed NE_cmd by searching a map shown in FIG. 9 in accordance with the engine water temperature TW and accessory load Load. In FIG. 9, TW1 represents a predetermined value (for example, 25° C.) for the engine water temperature TW, while NE1 represents a predetermined value (for example, 750 rpm) for the engine rotational speed NE. Load1, Load2 represent predetermined values for the accessory load Load, and are set to establish a relationship Load1<Load2.

In this map, the target rotational speed NE_cmd is set to a higher value as the accessory load Load is larger. This is intended to stabilize the idle rotational speed by increasing the engine rotational speed NE to increase inertia energy of the internal combustion engine because a larger accessory load Load makes the engine rotational speed NE more susceptible to fluctuations due to fluctuations in load by accessories, and to control the idle rotational speed to a higher value in order to ensure a higher combustion stability in order to cover an increase in the accessory load Load. Also, the target rotational speed NE_cmd is set to a lower value in a high engine water temperature TW region than in a low engine water temperature TW region. This is because the idle operation can be performed at a lower rotational speed NE because of a stabilized combustion state of the engine 3 in the high engine water temperature TW region.

Next, the aforementioned split injection controller 40 will be described. The split injection controller 40 calculates the compensation value Umusic_ig and first-time injection ratio Rinj in accordance with the target rotational speed NE_cmd, as will be later described. This compensation value Umusic_ig is a value corresponding to a feed forward term for compensating sudden fluctuations in rotation during the idle rotational speed control through the ignition timing control, and is therefore used as an addition term in the calculation of the ignition manipulated variable Uig in the ignition timing controller 60, later described.

Figure 10:
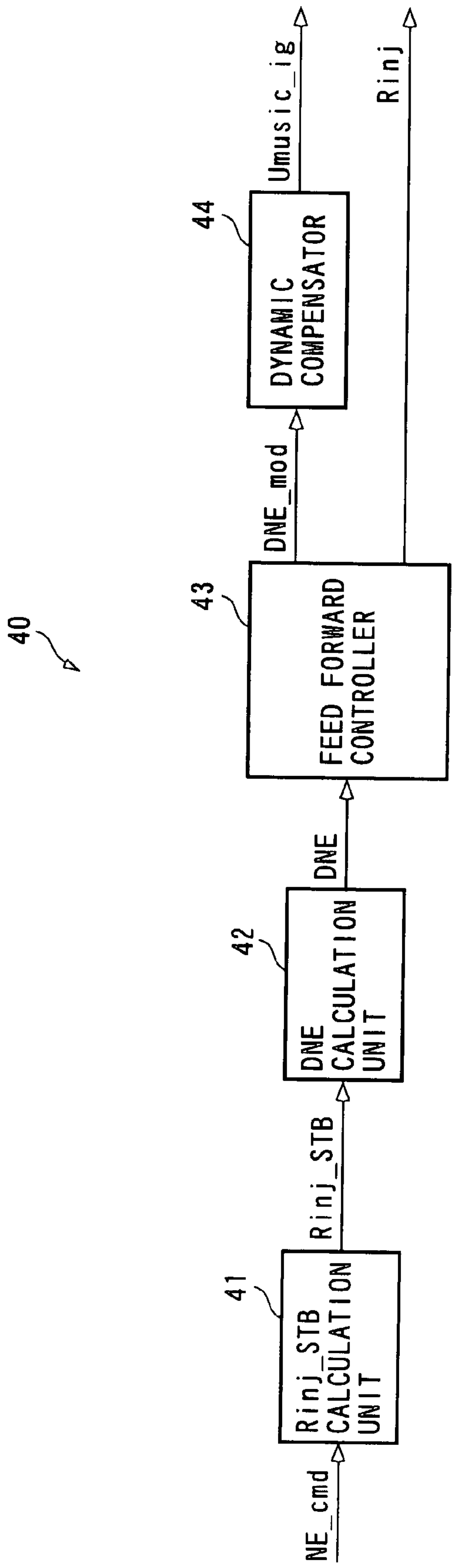
FIG. 10 is a block diagram showing the configuration of a split injection controller.

As shown in FIG. 10, the split injection controller 40 comprises an Rinj_STB calculation unit 41, a DNE calculation unit 42, a feed forward controller 43, and a dynamic compensator 44.

Figure 11:
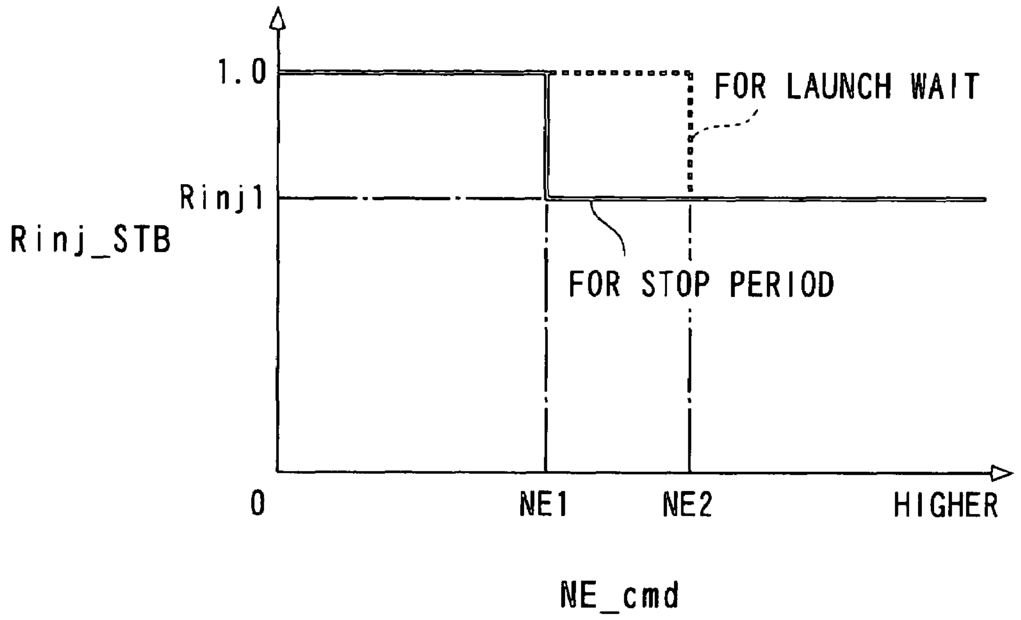
FIG. 11 is a diagram showing an example of a map used to calculate a requested value Rinj_STB for the first-time injection ratio.

The Rinj_STB calculation unit 41 calculates a requested value Rinj_STB for the first-time injection ratio Rinj by searching a map shown in FIG. 11 in accordance with the target rotational speed NE_cmd. This map corresponds to a response surface model which represents the relationship between the target rotational speed NE_cmd and the requested value Rinj_STB for the first-time injection ratio Rinj, i.e., the relationship between the engine rotational speed NE as a controlled variable and the stratified combustion mode and uniform combustion mode. In FIG. 11, NE2 represents a predetermined value (for example, 900 rpm) for the engine rotational speed NE at which a relationship NE1<NE2 is established.

As shown in FIG. 11, maps provided for calculating the requested value Rinj_STB includes a stop period map indicated by a solid line, and a launch wait map indicated by a broken line. The stop period map is used to calculate the requested value Rinj_STB when the vehicle is in stop, i.e., when a shift position of an automatic transmission is set in an N-range or a P-range, while the launch wait map is used to calculate the requested value Rinj_STB when the vehicle is in a launch waiting state, i.e., the shift position of the automatic transmission is set in a D-range or an R-range. First, in the stop period map, a map value for the requested Rinj_STB is set to the value of 1.0 in a range of NE<NE1, and is set to a predetermined value Rinj1, which is equal to or smaller than the aforementioned threshold value Rinj_lmt, in a range of NE≧NE1. This is intended to operate the engine 3 in the split injection mode, i.e., stratified combustion mode in the range of NE≧NE1 in order to improve the fuel economy. On the other hand, in the range of NE<NE1, Tcyl2<Tmin is established due to the aforementioned characteristics of the fuel injection valve 6, resulting in a failure in appropriately executing the injection at a second time, so that the engine 3 is operated in the single injection mode, i.e., uniform combustion mode in order to ensure the stability and control accuracy of the idle rotational speed control.

In the launch wait map, in turn, the map value for the requested value Rinj_STB is set to the value of 1.0 in a range of NE<NE2, and set to a predetermined value Rinj1 in a range of NE≧NE2. These settings are made for the following reason. In the split injection mode, i.e., stratified combustion mode, the degree of fluctuations in combustion is higher as compared with that in the single injection mode, i.e., uniform combustion mode, so that when the engine is operated in the stratified combustion mode in a low rotational speed range with the shift position of the automatic transmission being set in the D-range or R-range, such fluctuations in combustion are more prone to transmit to the vehicle body, as compared with when the shift position is set in the N-range or P-range, possibly leading to a lower value of commodity. Accordingly, in the launch wait map, the map value for the requested value Rinj_STB is set to 1.0 in order to operate the engine 3 in the single injection mode, i.e., uniform combustion mode for purposes of improving the value of commodity in a low rotational speed range in a rotational speed range lower than the predetermined value NE2 which is larger than the predetermined value NE1. In the range of NE≧NE2, on the other hand, the map value for the requested value Rinj_STB is set to the predetermined value Rinj1 in order to operate the engine 3 in the split injection mode, i.e., stratified combustion mode, with the intention to improve the fuel economy, as mentioned above.

For a vehicle which has a manual transmission instead of an automatic transmission, unlike this embodiment, the stop period map may be used when the shift position of the manual transmission is at a neutral position, while the launch wait map may be used when at another shift position (for example, a reverse position or one of first to fourth speed positions), as maps for calculating the requested value Rinj_STB.

Next, the DNE calculation unit 42 calculates a fluctuation prediction value DNE in accordance with the requested value Rinj_STB for the first-time injection ratio Rinj and the target rotational speed NE_cmd. This fluctuation prediction value DNE is a predicted amount of fluctuations in the engine rotational speed NE when the first-time injection ratio Rinj is changed during the idle rotational speed control, and is specifically calculated by an approach described below.

Figure 12:
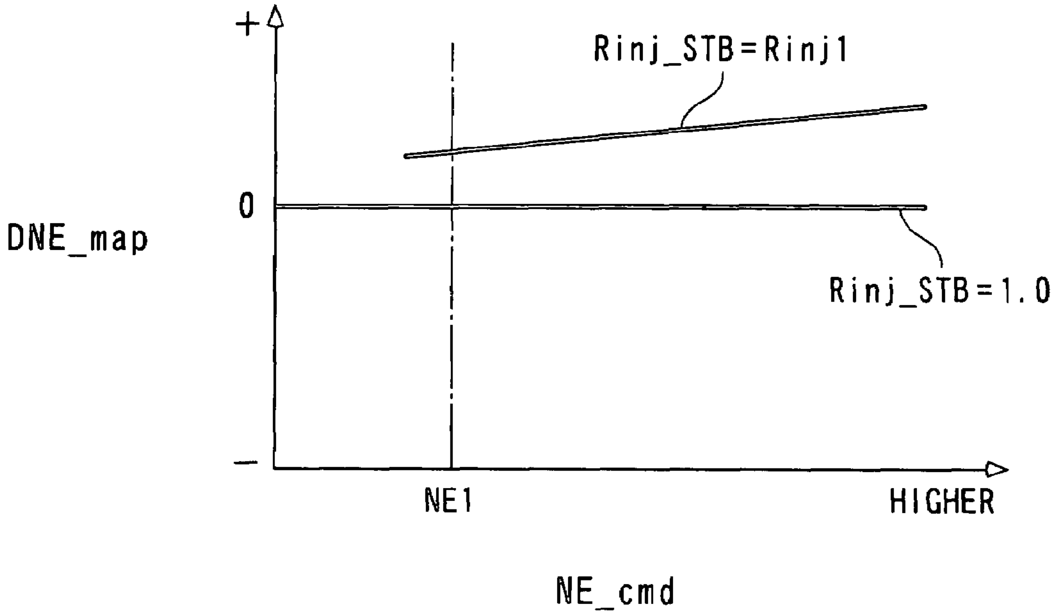
FIG. 12 is a diagram showing an example of a map used to calculate a map value DNE_map.

First, a map shown in FIG. 12 is searched in accordance with the requested value Rinj_STB for the first-time injection ratio Rinj and the target rotational speed NE_cmd to calculate a map value DNE_map. In this map, the map value DNE_map is set to a larger value as the target rotational speed NE_cmd is higher when Rinj_STB=Rinj1. This is because a change in the first-injection ratio Rinj tends to increase the amount of fluctuations in rotation as the target rotational speed NE_cmd is higher.

Next, the fluctuation prediction value DNE is calculated by the following equation (1):

$$DNE(k)=DNE\_\mathrm{map}(k)-DNE\_\mathrm{map}(k-1) \quad (1)$$

In the equation (1) above, each discrete data followed by (k) indicates data which is sampled or calculated at a predetermined control period, where the symbol k represents the turn of each discrete data sampling or calculation timing. For example, the symbol k indicates a value which is sampled or calculated at a current control timing, and a symbol k−1 indicates a value which has been sampled or calculated at the preceding control timing. This applies to the following discrete data. Also, in the following description, the symbol (k) and the like in each discrete data are omitted as appropriate.

The aforementioned feed forward controller 43 calculates the first-time injection ratio Rinj and compensation target value DNE_mod by an approach described below. The compensation target value DNE_mod is a value corresponding to the amount of fluctuations in rotation which should be compensated for by the compensation value Umusic_ig.

First, a fluctuation direction flag F_DNE_dir is set in the following manner. This fluctuation direction flag F_DNE_dir indicates whether or not it is anticipated that the engine rotational speed NE will change in an increasing direction when the first-time injection ratio Rinj is changed. Specifically, when the following condition (e1) is satisfied, or both conditions (e2), (e3) are satisfied, it is anticipated that the engine rotational speed NE will change in the increasing direction upon changing the first-time injection ratio Rinj, so that the fluctuation direction flag F_DNE_dir is set to "1" in order to indicate this anticipation:

(e1) DNE>DNE_PSTEP (e2) DNE_NSTEP≦DNE≦DNE_PSTEP (e3) F_DNE_dir(k−1)=1

Here, DNE_PSTEP in the conditions (e1), (e2) is an increasing side threshold value for determining whether or not the engine rotational speed NE will change in the increasing direction upon changing the first-time injection ratio Rinj, and is set to a predetermined positive value (for example, 10 rpm). Also, DNE_NSTEP in the condition (e2) is a decreasing side threshold value for determining whether or not the engine rotational speed NE will change in a decreasing direction upon changing the first-time injection ratio Rinj, and is set to a predetermined negative value (for example, −10 rpm).

On the other hand, when the following condition (e4) is satisfied, or when both conditions (e5), (e6) are satisfied, it is anticipated that the engine rotational speed NE will not change in the increasing direction upon changing the first-time injection ratio Rinj, so that the fluctuation direction flag F_DNE_dir is set to "0" in order to indicate this anticipation.

(e4) DNE<DNE_NSTEP (e5) DNE_NSTEP≦DNE≦DNE_PSTEP (e6) F_DNE_dir(k−1)=1

Then, when the fluctuation direction flag F_DNE_dir is set to "1," the first-time injection ratio Rinj and an increasing side value DNE_mod_p for the compensation target value are calculated by the following equations (2), (3):

$$Rinj(k)=Rinj\_STB(k) \quad (2)$$

$$DNE\_\mathrm{mod}\_p(k)=\lambda p\cdot DNE\_\mathrm{mod}\_p(k-1)+DNE(k) \quad (3)$$

λp in the equation (3) above is a forgetting coefficient which is set to satisfy 0<λp<1. As shown in the equation (3), the forgetting coefficient λp is multiplied by the preceding value DNE_mod_p(k−1) of the increasing side value, and the fluctuation prediction value DNE comes to the value of zero after the first-time injection ratio Rinj has been changed, so that the increasing side value DNE_mod_p is calculated to converge to the value of zero as the operation processing is advanced. In other words, the increasing side value DNE_mod_p is calculated through forgetting operation processing. In this way, even the compensation value Umusic_ig calculated using the increasing side value DNE_mod_p can converge to the value of zero as the operation processing is advanced, causing the ignition manipulated variable Uig to change from a state in which it has been corrected to a retarded value by the compensation value Umusic_ig to an uncorrected state.

Next, the compensation target value DNE_mod is calculated by the following equation (4):

$$DNE\_\mathrm{mod}(k)=DNE\_\mathrm{mod}\_p(k) \quad (4)$$

On the other hand, when the fluctuation direction flag F_DNE_dir is set to "0," the decreasing side value DNE_n_in for the fluctuation prediction value, the first-time injection ratio Rinj, and the decreasing side value DNE_mod_n for the compensation target value are calculated in a manner described below based on the result of a comparison of the fluctuation prediction value DNE with the decreasing side threshold value DNE_NSTEP, and a value is set for a wait flag F_Rinj_Wait.

First, a description will be given of an approach for calculating the decreasing side value DNE_n_in for the fluctuation prediction value. As will be later described, the decreasing side value DNE_n_in for the fluctuation prediction value is used to calculate the decreasing side value DNE_mod_n for the compensation target value, and is calculated by the following equation (5) when DNE<DNE_NSTEP is established.

$$DNE\_n\_in(k)=DNE(k) \quad (5)$$

On the other hand, when DNE_NSTEP≦DNE≦DNE_PSTEP is established, the decreasing side value DNE_n_in for the fluctuation prediction value is calculated by the following equation (6):

$$DNE\_n\_n\_in(k)=DNE\_n\_in(k-1) \quad (6)$$

Next, a description will be given of an approach for setting the wait flag F_Rinj_Wait. This wait flag F_Rinj_Wait is provided to determine whether or not a change in the first-time injection ratio Rinj should be awaited until the engine torque TRQ has been reduced due to a change in the ignition timing Ig_log in a scenario where it is anticipated that a change in the first-time injection ratio Rinj will cause the engine torque TRQ (i.e., the engine rotational speed NE) to change in the decreasing direction, and is set in a manner described below.

First, a change in the first-time injection ratio Rinj should be awaited when all of the following conditions (f1)-(f3) are satisfied or when a condition (f4) is satisfied, because fluctuations in rotation can be caused by simultaneously changing the first-time injection ratio Rinj and ignition timing Ig_log. Accordingly, the wait flag F_Rinj_Wait is set to "1" in order to indicate this scenario:

(f1) DNE_NSTEP≦DNE≦DNE_PSTEP (f2) F_Rinj_Wait(k−1)=1

(f3) DNE_mod_n(k−1)≧_DNE_NWAIT (f4) DNE<DNE_NSTEP

Here, DNE_NWAIT in the condition (f3) is a threshold value for determining whether or not the first-time injection ratio Rinj need be awaited, and is set to a predetermined negative value (for example, −5 rpm).

On the other hand, when all of the following conditions (f5)-(f7) are satisfied, or when both conditions (f8), (f9) are satisfied, the wait flag F_Rinj_Wait is set to "0" in order to indicate that the first-time injection ratio Rinj should be changed.

(f5) DNE_NSTEP≦DNE≦DNE_PSTEP (f6) F_Rinj_Wait(k−1)=1

(f7) DNE_mod_n(k−1)<DNE_NWAIT (f8) DNE_NSTEP≦DNE≦DNE_PSTEP (f9) F_Rinj_Wait(k−1)=0

Next, a description will be given of an approach for calculating the first-time injection ratio Rinj, and the decreasing side value DNE_mod_n for the compensation target value. First, when F_Rinj_Wait=1, these values Rinj, DNE_mod_n are calculated by the following equations (7), (8). λn in the following equation (8) is a delay coefficient which is set to establish 0<λn<1. Specifically, since the decreasing side value DNE_mod_n for the compensation target value is calculated as a value which undergoes first-order delay filter processing which is response specified filter processing, the decreasing side value DNE_mod_n is calculated to present predetermined first-order delay characteristics for the fluctuation prediction value DNE.

$$Rinj(k)=Rinj(k-1) \quad (7)$$

$$DNE\_mod\_n(k)=(1-\lambda n)\cdot DNE\_mod\_n(k-1)+\lambda n\cdot DNE\_n\_in(k) \quad (8)$$

On the other hand, when F_Rinj_Wait=0, the first-time injection ratio Rinj, and the decreasing side value DNE_mod_n for the compensation target value are calculated by the following equations (9), (10):

$$Rinj(k)=Rinj\_STB(k) \quad (9)$$

$$DNE\_mod\_fn(k)=0 \quad (10)$$

Next, the compensation target value DNE_mod is calculated by the following equation (11):

$$DNE\_mod(k)=-DNE\_mod\_n(k) \quad (11)$$

The aforementioned dynamic compensator 44 calculates the compensation value Umusic_ig by the following equation (12). al, bl in the following equation (12) are model parameters of a dynamic characteristic model later described. Here, as described above, the decreasing side value DNE_mod_n for the compensation target value is calculated to present predetermined first-order delay characteristics for the fluctuation prediction value DNE by the equation (8), the compensation value Umusic_ig for canceling out the fluctuation prediction value DNE is also calculated to present predetermined first-order delay characteristics.

$$\text{Umusic\_ig}(k) = -\frac{1}{b1}[\text{DNE\_mod}(k) - a1\cdot\text{DNE\_mod}(k-1)] \quad (12)$$

The foregoing equation (12) is derived in the following manner. First, a dynamic characteristic model of a system which is applied with the compensation value Umusic_ig and outputs the fluctuation prediction value DNE can be defined as the following equation (13). Specifically, this equation (13) corresponds to a dynamic characteristic model which represents the relationship between the compensation value Umusic_ig and the engine rotational speed NE as a controlled variable. Also, an inverse transfer function of the equation (13) is as shown by the following equation (14):

$$DNE(k+1) = a1\cdot DNE(k) + b1\cdot \text{Umusic\_ig}(k) \quad (13)$$

$$\text{Umusic\_ig}(k) = \frac{1}{b1}[DNE(k+1) - a1\cdot DNE(k)] \quad (14)$$

Here, since the compensation value Umusic_ig is a value for canceling out (i.e., for compensating) the fluctuation prediction value DNE, the compensation target value DNE_mod should be calculated so as to establish DNE(k+1)=−DNE_mod(k). Accordingly, when DNE(k+1)=−DNE_mod(k) is substituted into the foregoing equation (14), the aforementioned equation (12) is derived.

In the foregoing manner, the split injection controller 40 calculates the compensation value Umusic_ig and first-time injection ratio Rinj.

Figure 13:
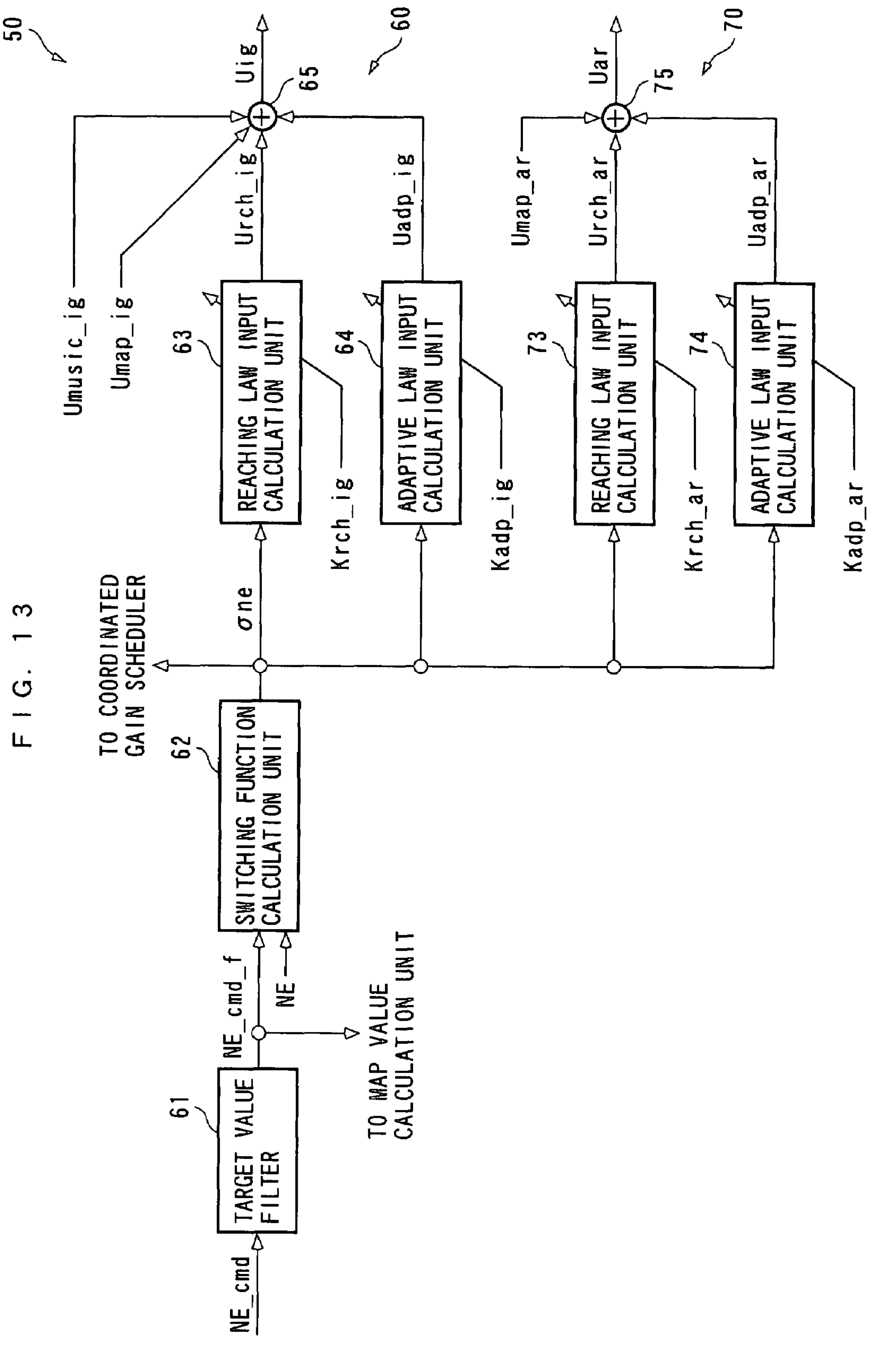
FIG. 13 is a block diagram showing the configuration of a coordinated feedback controller.

Next, the aforementioned coordinated feedback controller 50 will be described with reference to FIG. 13. As shown in FIG. 13, the coordinated feedback controller 50 comprises an ignition timing controller 60 and an intake air amount controller 70.

First, the ignition timing controller 60 will be described. The ignition timing controller 60 calculates an ignition manipulated variable Uig (=Ig_log) by a control algorithm which applies a target value filter type two-degree-of-freedom sliding mode control algorithm, as will be later described, and comprises a target value filter 61, a switching function calculation unit 62, a reaching law input calculation unit 63, an adaptive law input calculation unit 64, and an adder element 65.

The target value filter 61 calculates a filter value NE_cmd_f for the target rotational speed in accordance with a first-order delay filter algorithm expressed by the following equation (15). In the equation (15), R is a parameter for specifying a target value response, and is set to a value in a range of −1<R<0. In this way, the filter value NE_cmd_f is calculated as a value which indicates a first-order delay follow-up responsibility determined by the value of the target value response specifying parameter R for the target rotational speed NE_cmd.

$$NE\_cmd\_f(k)=-R\cdot NE\_cmd\_f(k-1)+(1+R)\cdot NE\_cmd(k) \quad (15)$$

The switching function calculation unit 62 calculates the switching function σne by the following equations (16), (17). In the equation (16), S is a switching function setting parameter, and is set to a value in a range of −1<S<0. Ene in turn is a follow-up error, and is defined as a deviation of the engine rotational speed NE from the filter value NE_cmd_f for the target rotational speed, as shown in the equation (17).

$$\sigma ne(k)=Ene(k)+S\cdot Ene(k-1) \quad (16)$$

$$Ene(k)=NE(k)-NE\_cmd\_f(k) \quad (17)$$

The reaching law input calculation unit 63 calculates a reaching law input Urch_ig by the following equation (18) using the switching function σne and a reaching law gain Krch_ig which is set by the coordinated gain scheduler 80:

$$Urch\_ig(k)=-Krch\_ig(k)\cdot\sigma ne(k) \quad (18)$$

The adaptive law input calculation unit 64 calculates an adaptive law input Uadp_ig by the following equation (19) using the switching function σne and an adaptive law gain Kadp_ig which is set by the coordinated gain scheduler 80.

$$Uadp\_ig(k)=\lambda\cdot Uadp\_ig(k-1)-Kadp\_ig(k)\cdot\sigma ne(k) \quad (19)$$

In the above equation (19), λ is a forgetting coefficient, and is set to a value in a range of $0<\lambda<1$. The adaptive law input Uadp_ig is calculated as an integral term, so that if the forgetting coefficient λ is not used, the ignition manipulated variable Uig is held corrected on the retarding side for a long time more than necessity. This forgetting coefficient λ is used in order to avoid such a state.

The adder element 65 calculates the ignition manipulated variable Uig by the following equation (20) using the reaching law input Urch_ig and adaptive law input Uadp_ig calculated in the foregoing manner, the compensation value Umusic_ig calculated by the split injection controller 40, and the map value Umap_ig calculated by the map value calculation unit 90:

$$Uig(k)=Urch\_ig(k)+Uadp\_ig(k)\ \mathrm{Umap}\_ig(k)Umusic\_ig(k) \quad (20)$$

As described above, the ignition timing controller 60 calculates the ignition manipulated variable Uig in accordance with the control algorithm which applies the target value filter type two-degree-of-freedom sliding mode control algorithm represented by the equations (15)-(20). In this embodiment, a value (Urch_ig+Uadp_ig+Umap_ig) corresponds to a first basic manipulated variable.

Next, the aforementioned intake air amount controller 70 will be described. The intake air amount controller 70 calculates the intake manipulated variable Uar (=Liftin_cmd) in accordance with a control algorithm which applies a target value filter type two-degree-of-freedom sliding mode control algorithm, as will be later described, and comprises the aforementioned target value filter 61, the aforementioned switching function calculation unit 62, a reaching law input calculation unit 73, an adaptive law input calculation unit 74, and an adder element 75. Specifically, the intake air amount controller 70 shares the ignition timing controller 60 with the target value filter 61 and switching function calculation unit 62 to calculate the intake manipulated variable Uar, while sharing the filter value NE_cmd_f for the target rotational speed and the switching function one.

Specifically, first, the reaching law input calculation unit 73 calculates a reaching law input Urch_ar by the following equation (21) using the switching function one and the reaching law gain Krch_ar which has been set by the coordinated gain scheduler 80:

$$Urch\_ar(k)=-Krch\_ar(k)\cdot\sigma ne(k) \quad (21)$$

The adaptive law input calculation unit 74 calculates an adaptive law input Uadp_ar by the following equation (22) using the switching function one and the adaptive law gain Kadp_ar which has been set by the coordinated gain scheduler 80:

$$Uadp\_ar(k)=Uadp\_ar(k-1)-Kadp\_ar(k)\cdot\sigma ne(k) \quad (22)$$

Further, the adder element 75 calculates the intake manipulated variable Uar by the following equation (23) using the reaching law input Urch_ar and adaptive law input Uadp_ar calculated in the foregoing manner, and the map value Umap_ig calculated by the map value calculation unit 90:

$$Uar(k)=Urch\_ar(k)+Uadp\_ar(k)+Umap\_ar(k) \quad (23)$$

The intake air amount controller 70 calculates the intake manipulated variable Uar in accordance with the control algorithm which applies the target value filter type two-degree-of-freedom sliding mode control algorithm represented by the equations (15)-(17) and (21)-(23), as described above.

Figure 14:
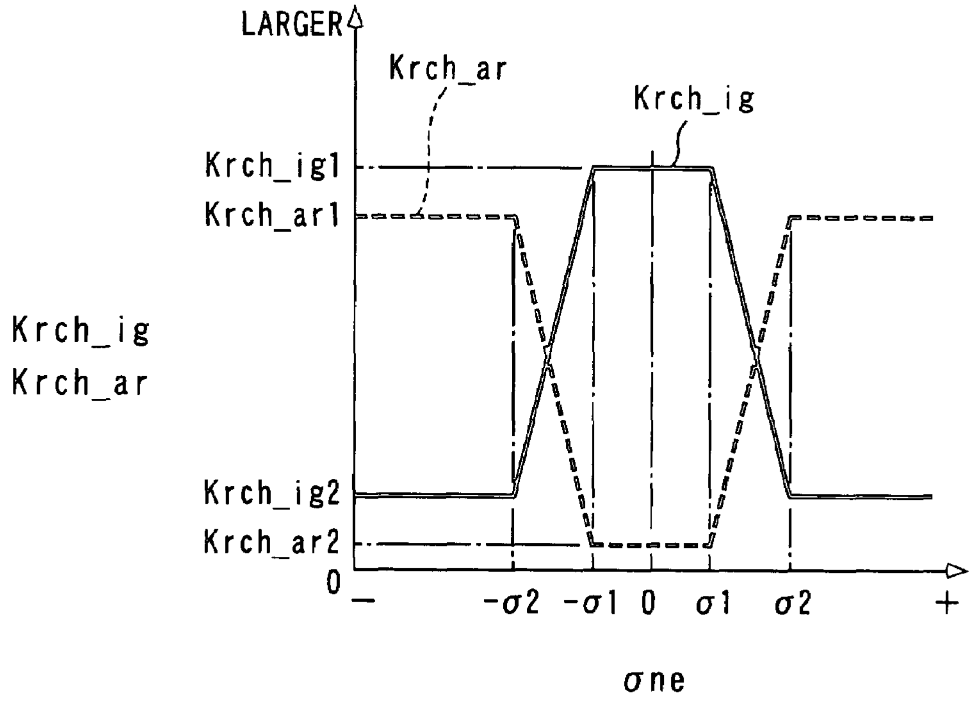
FIG. 14 is a diagram showing an example of a map used to calculate reaching law gains Krch_ig, Krch_ar.

Next, the aforementioned coordinated gain scheduler 80 will be described. This coordinated gain scheduler 80 calculates the aforementioned four gains Krch_ig, Krch_ar, Kadp_ig, Kadp_ar, respectively, by searching a map for calculating reaching law gains shown in FIG. 14 and a map for calculating adaptive law gains shown in FIG. 15 in accordance with the value of the switching function one. In FIG. 14, 15, σ1 and σ2 are predetermined positive values which satisfy a relationship σ1<σ2.

First, referring to the map for calculating the reaching law gains in FIG. 14, in this map, the reaching law gain Krch_ig, which is set symmetrically to positive and negative values of the switching function one, is set to a predetermined maximum value Krch_ig1 in a range of −σ1<σne<σ1 near the value of zero, and set to a predetermined minimum value Krch_ig2 in ranges of σne<−σ2 and σ2<σne. Also, the reaching law gain Krch_ig is set to a larger value as the absolute value of σne is smaller in ranges of −σ2≦σne≦−σ1 and σ1≦σne≦σ2.

The reaching law gain Krch_ar, which is also set symmetrically to positive and negative values of the switching function one, is set to a predetermined minimum value Krch_ar2 in the range of −σ1<σne<σ1 near the value of zero, and set to a predetermined maximum value Krch_ar1 in the ranges of σne<−σ2 and σ2<σne. Also, the reaching law gain Krch_ar is set to a smaller value as the absolute value of σne is smaller in the ranges of σ2≦σne≦−σ1 and σ1≦σne≦σ2.

Figure 15:
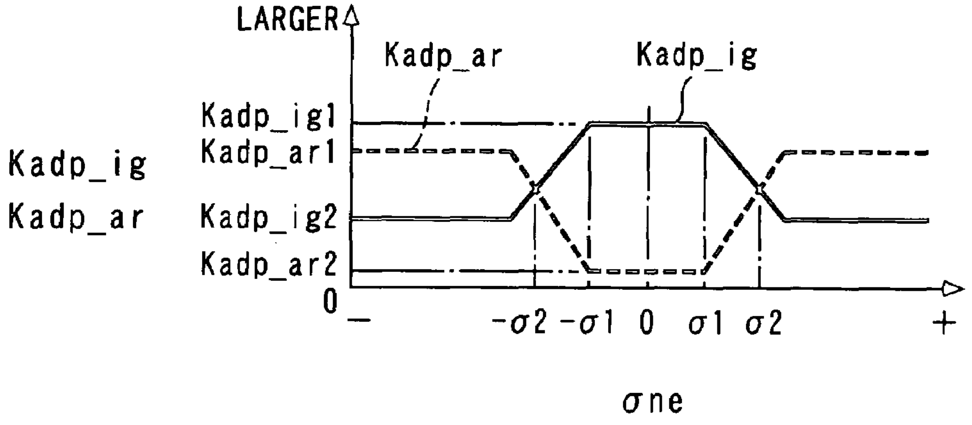
FIG. 15 is a diagram showing an example of a map used to calculate adaptive law gains Kadp_ig, Kadp_ar.

On the other hand, referring to the map for calculating the adaptive law gains in FIG. 15, in this map, the adaptive law gain Kadp_ig, which is also set symmetrically to positive and negative values of the switching function one, is set to a predetermined maximum value Kadp_ig1 in the range of −σ1<σne<σ1 near the value of zero, and set to a predetermined minimum value Kadp_ig2 in the ranges of σne<−σ2 and σ2<σne. Also, the adaptive law gain Kadp_ig is set to a larger value as the absolute value of σne is smaller in the ranges of −σ2≦σne≦−σ1 and σ1≦σne≦σ2.

The adaptive law gain Kadp_ar, which is also set symmetrically to positive and negative values of the switching function one, is set to a predetermined minimum value Kadp_ar2 in the range of −σ1 <σne<σ1 near the value of zero, and set to a predetermined maximum value Kadp_ar1 in the ranges of σne<−σ2 and σ2<σne. Also, the adaptive law gain Kadp_ar is set to a smaller value as the absolute value of one is smaller in the ranges of −σ2≦σne≦−σ1 and σ1≦σne≦σ2.

The four gains Krch_ig, Kadp_ig, Kach_ar, Kadp_ar are set to the values as described above for the following reason. As described above, the ignition timing control is characterized by having a wide variable width of an engine torque TRQ during one combustion cycle, i.e., a larger width in which the engine rotational speed NE can be changed during an idle operation, in addition to a small response delay and a high control resolution (the degree of change in the engine rotational speed NE is small in regard to a minimum ignition manipulated variable Uig), as compared with the intake air amount control, but suffering from limitations in a control width of the ignition timing Ig_log, from a viewpoint of a combustion state of the engine 3. On the other hand, the intake air amount control is characterized by having a small width in which the engine rotational speed NE can be changed during an idle operation and a large response delay in one combustion cycle, as compared with the ignition timing control, while it has a low control resolution as compared with the ignition timing control and is capable of accommodating a large change in the target rotational speed NE_cmd, resulting in poor convergence of the engine rotational speed NE to a target rotational speed NE_cmd.

In addition, since the coordinated feedback controller 50 of this embodiment employs the target value filter type two-degree-of-freedom sliding mode control algorithm as mentioned above, there is a small difference between a follow-up behavior of the engine rotational speed NE to the target rotational speed NE_cmd, which is set by the target value filter 61, and an actual follow-up behavior, and there is a small difference between a convergence behavior of a follow-up error Ene specified by the switching function σne to the value of zero and an actual convergence behavior, when the absolute value of the switching function σne is close to the value of zero.

Accordingly, when the absolute value of the switching function σne is close to the value of zero, a contribution degree of the ignition timing control to the idle rotational speed control is increased, and simultaneously, a contribution degree of the intake air amount control is reduced, in order to improve the resolution and control accuracy of the idle rotational speed control. Contrary to this, when the absolute value of the switching function one is large, there is a large difference between the follow-up behavior set by the target value filter 61 and the actual follow-up behavior, and there is a large difference between the convergence behavior specified by the switching function one and the actual convergence behavior, so that a contribution degree of the intake air amount control to the idle rotational speed control is increased, and simultaneously, the contribution degree of the ignition timing control is reduced, in order to improve the responsibility of the idle rotational speed control.

For the reason set forth above, in the coordinated control of the ignition timing control and intake air amount control in the coordinated feedback controller 50 of this embodiment, a region in which the absolute value of the switching function σne is relatively small, i.e., a region in which the value of the switching function σne is closer to a switching line is a region in which the ignition timing control is predominant, while the remaining region is a region in which the intake air amount control is predominant. Similar to this, in the relationship between the engine rotational speed NE and target rotational speed NE_cmd, a region in which an alienation degree between both is small is a region in which the ignition timing control is predominant, while the remaining region is a region in which the intake air amount control is predominant.

Next, the aforementioned map value calculation unit 90 will be described. This map value calculation unit 90 calculates two map values Umap_ig, Umap_ar in a manner described below. These map values Umap_ig, Umap_ar are both values which correspond to a feed forward term in order to control the engine rotational speed NE to the filter value NE_cmd_f for the target rotational speed (i.e., in order to control the engine rotational speed NE to the target rotational speed NE_cmd), and are accordingly used as addition terms in the calculations of the ignition manipulated variable Uig and intake manipulated variable Uar, as described above.

Figure 16:
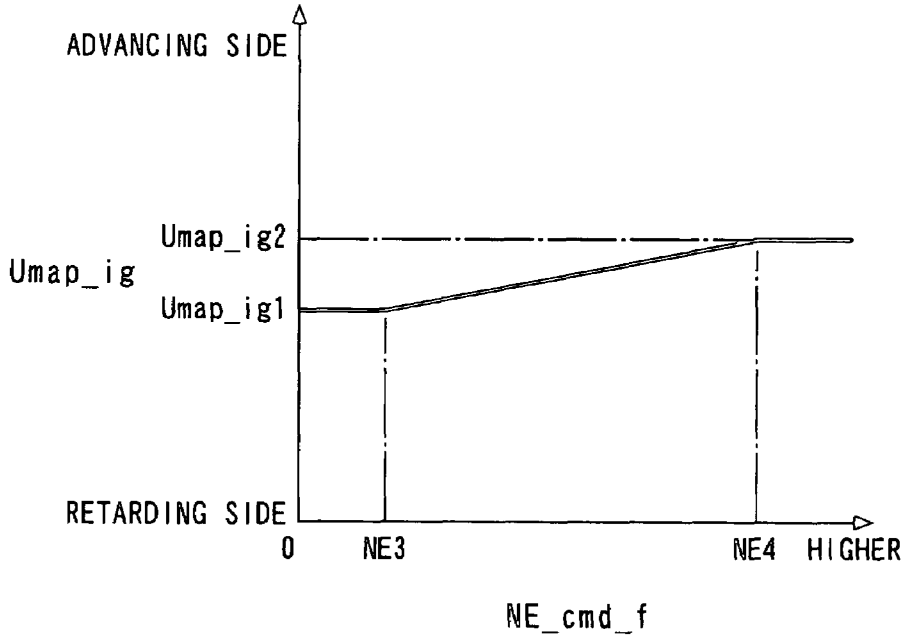
FIG. 16 is a diagram showing an example of a map used to calculate a map value Umap_ig.

First, the map value Umap_ig is calculated by searching a map shown in FIG. 16 in accordance with the filter value NE_cmd_f for the target rotational speed. NE3, NE4 in FIG. 16 are predetermined values of the engine rotational speed NE which satisfy NE3<NE4. Also, Umap_ig1, Umap_ig2 are predetermined values of the map values Umap_ig which satisfy Umap_ig1<Umap_ig2.

As shown in FIG. 16, the map value Umap_ig is set to a more advanced value as the filter value NE_cmd_f for the target rotational speed is higher in a range of NE3≦NE_cmd_f≦NE4. This is intended to control the ignition manipulated variable Uig toward a more advanced side in order to increase the engine torque TRQ, which is required to increase the engine rotational speed NE. Also, the map value Umap_ig is set to a predetermined value Umap_ig2 in a range of NE_cmd_f>NE4. This is intended to hold the ignition timing Ig_log at MBT because the engine torque TRQ decreases on the contrary if the ignition timing Ig_log is advanced beyond MBT. Further, the map value Umap_ig is set to a predetermined value Umap_ig1 in a range of NE_cmd_f<NE3. This is intended to avoid an increase in vibrations of the engine 3 resulting from an instable combustion state caused by excessively retarding the ignition timing Ig_log.

Figure 17:
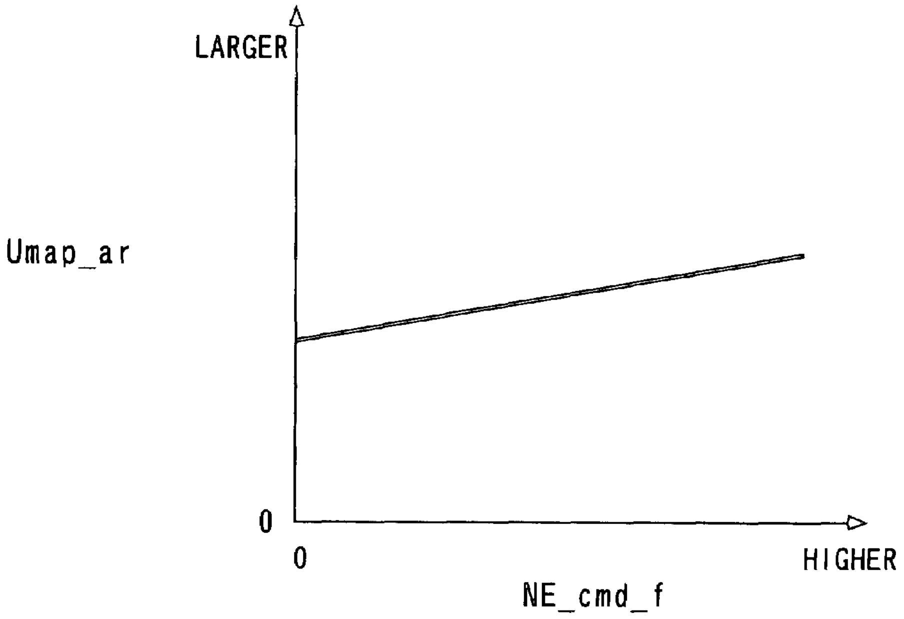
FIG. 17 is a diagram showing an example of a map used to calculate a map value Umap_ar.

The map value Umap_ar in turn is calculated by searching a map shown in FIG. 17 in accordance with the filter value NE_cmd_f for the target rotational speed. In FIG. 17, the map value Umap_ig is set to a larger value as the filter value NE_cmd_f for the target rotational speed is higher. This is intended to increase the intake air amount Gcyl by controlling the intake manipulated variable Uar to a larger value in order to achieve an increase in the engine torque TRQ required to increase the engine rotational speed NE, as described above.

Figure 18:
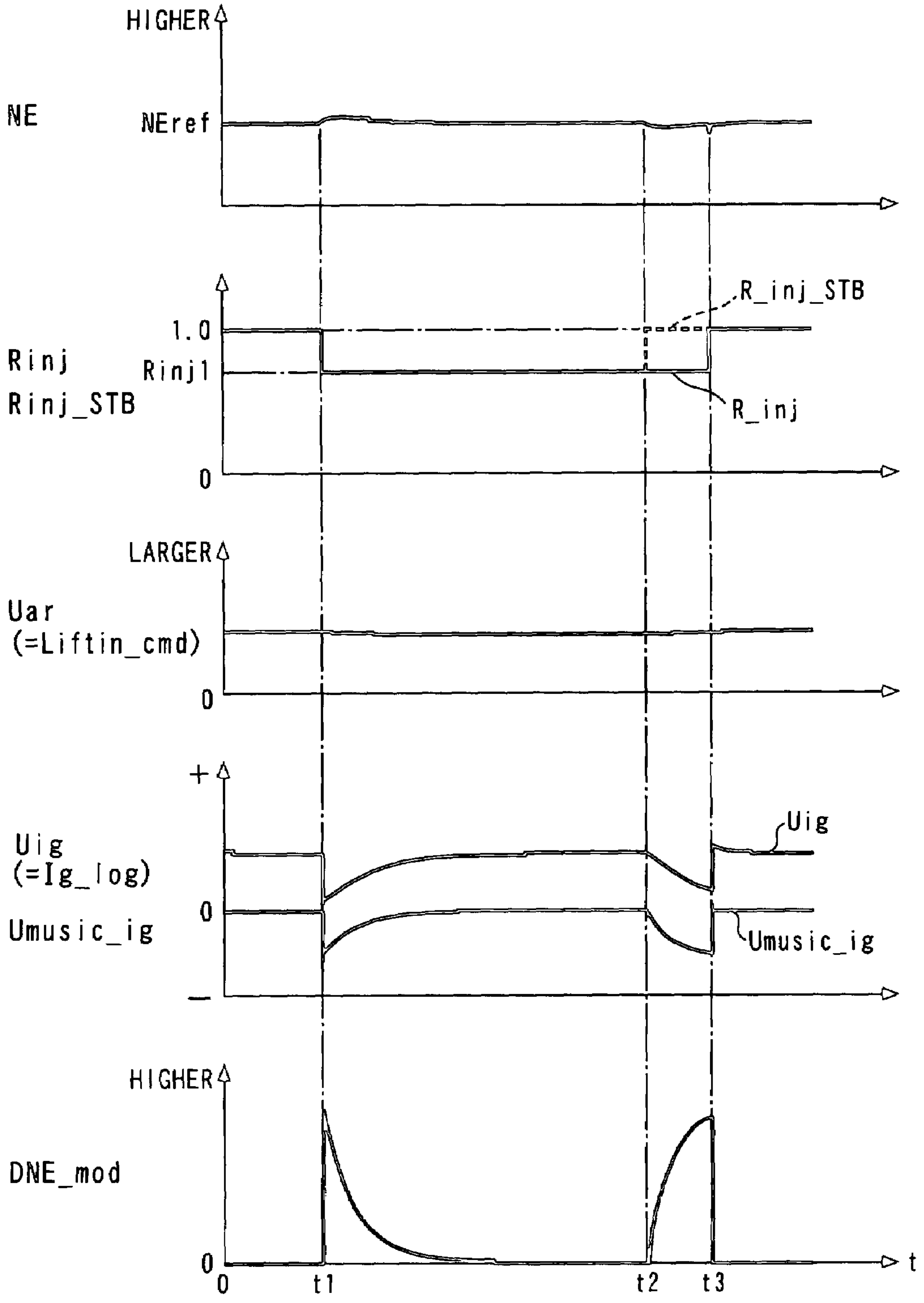
FIG. 18 is a timing chart showing an example of a simulation result of idle rotational speed control according to this embodiment.
Figure 19:
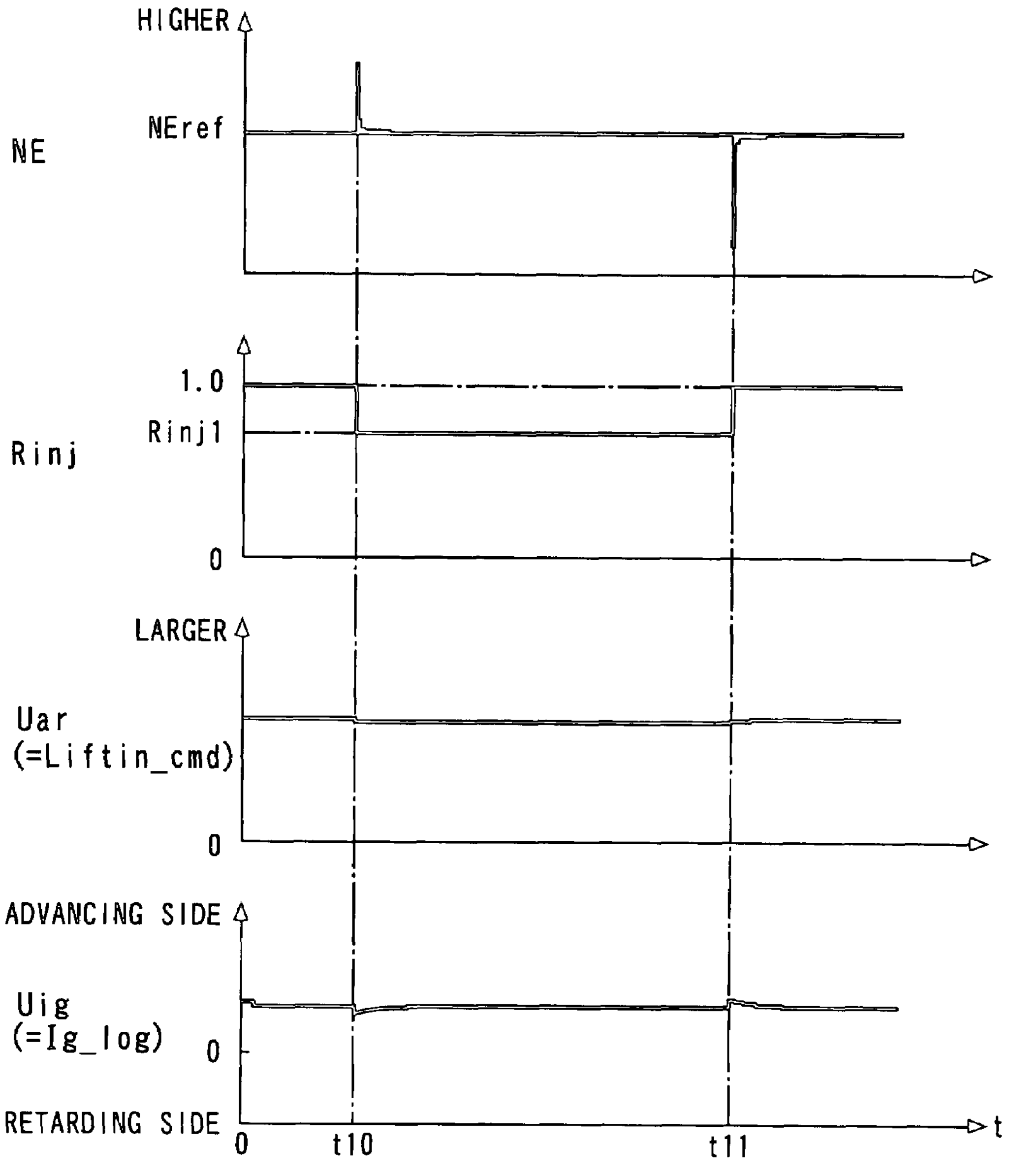
FIG. 19 is a timing chart showing an example of a simulation result of the idle rotational speed control when a compensation value Umusic_ig=0 is held for purposes of comparison.

Next, a description will be given of a simulation result of the idle rotational speed control according to this embodiment configured as described above (hereinafter called the "control result"). First, FIG. 18 shows an example of the control result of the idle rotational speed control according to the present invention, and FIG. 19 shows an example of the control result when the compensation value Umusic_ig=0 is held at zero in the equation (20) for purposes of comparison. In particular, FIGS. 18, 19 show examples of the control results when the target rotational speed NE_cmd is set to a predetermined value NEref which satisfies NE1<NEref<NE2, and a change in the shift position causes the map for calculating the requested value Rinj_STB to be changed between the aforementioned stop period map and the launch wait map in FIG. 11.

Referring first to FIG. 19, in the control result of the comparative example, when a change in the shift position at time t10 is accompanied with a change of the map for calculating the requested value Rinj_STB from the launch wait map to the stop period map, and a change of the first-time injection ratio Rinj from the value of 1.0 to a predetermined value Rinj1, the fuel injection mode is switched from the single injection mode to the split injection mode, resulting in a higher thermal efficiency to cause the engine rotational speed NE to overshoot beyond the predetermined value NEref and largely alienate therefrom. In other words, sudden fluctuations occur in rotation. In this event, at and after time t10, the intake manipulated variable Uar is reduced, and the ignition manipulated variable Uig is changed to a more retarded value in order to eliminate a deviation of the engine rotational speed NE from the target rotational speed NE_cmd (=NEref).

Also, at time t11, when a change in the sift position is accompanied with a change of the map for calculating the requested value Rinj_STB from the stop period map to the launch wait map, and a change of the first-time injection ratio Rinj from the predetermined value Rinj1 to the value of 1.0, the fuel injection mode is switched from the split injection mode to the single injection mode, resulting in a lower thermal efficiency to cause the engine rotational speed NE to undershoot beyond the predetermined value NEref and largely alienate therefrom. In other words, sudden fluctuations occur in rotation. In this event, at and after time t11, the intake manipulated variable Uar is increased, and the ignition manipulated variable Uig is changed to a more advanced value so as to eliminate a deviation of the engine rotational speed NE from the target rotational speed NE_cmd, however, the fluctuations in rotation cannot be restrained.

On the other hand, in the control result of this embodiment shown in FIG. 18, when a change in the shift position at time t1 is accompanied with a change of the map for calculating the requested value Rinj_STB from the launch wait map to the stop period map, and a change of the first-time injection ratio Rinj from the value of 1.0 to a predetermined value Rinj1, the fluctuation prediction value DNE suddenly changes from the value of zero to a larger value to cause the increasing side value DNE_mod_p for the compensation target value calculated by the equation (3), i.e., the compensation target value DNE_mod to suddenly change from the value of zero to a large value, resulting in a sudden change of the compensation value Umusic_ig from the value of zero to a significantly retarded value (negative value). As a result, an increase in the engine rotational speed NE resulting from an increased torque is canceled out by the compensation value Umusic_ig, so that the engine rotational speed NE hardly alienates from the predetermined value NEref, unlike the control result in FIG. 19, and is held in a stable state. In other words, it is understood that the use of the compensation value Umusic_ig can appropriately restrain sudden fluctuations in rotation.

Also, at and after t1, as the compensation value Umusic_ig gradually changes on the advancing side due to the forgetting effect of the aforementioned forgetting coefficient λp, the engine rotational speed NE increases to a value slightly higher than the predetermined rotational speed NEref, attributable to an increased torque associated with the change in the compensation value Umusic_ig, but the intake manipulated variable Uar slowly decreases, and the intake air amount Gcyl also slowly decreases so as to cancel the increase in the engine rotational speed NE.

The intake manipulated variable Uar changes in this manner for the following reason. Specifically, as the engine rotational speed NE increases due to an increase in torque, the follow-up error Ene shown in the equation (17) in the aforementioned coordinated feedback controller 50 increases to cause the switching function σne shown in the equation (16) to increase. This results in an increase in the absolute values of the reaching law input Urch_ar shown in the equation (21) and the adaptive law input Uadp_ar shown in the equation (22), resulting in a decrease in the value of the intake manipulated variable Uar calculated by the equation (23).

Subsequently, the time passes over, and at a time (time t2) at which a change in the sift position is accompanied with a change of the map for calculating the requested value Rinj_STB from the stop period map to the launch wait map, DNE<DNE_NSTEP is established to establish F_Rinj_Wait=1. In this way, the first-time injection ratio Rinj is held at the predetermined value Rinj1 which is a previously value, without changing to the requested value Rinj_STB (=1.0). Simultaneously with this, the decreasing side value DNE_mod_n for the compensation target value is calculated in accordance with the first-order delay filter algorithm of the equation (8), and the compensation target value DNE_mod is calculated as a negative value −DNE_mod_n for the decreasing side value, and therefore increases subsequently overtime. As a result, the compensation value Umusic_ig is calculated to gradually change to a retarded value from the value of zero, and the intake manipulated variable Uar is calculated to gradually increase in accordance with the aforementioned control algorithm so as to cancel out a reduction in the engine rotational speed NE associated therewith, causing the intake air amount Gcyl to gradually increase.

Subsequently, at a time (time t3) at which DNE_mod_n(k−1)<DNE_NWAIT is established, F_Rinj_Wait=0 is established. This causes a change of the first-time injection ratio Rinj from the predetermined value Rinj1 to the value of 1.0, a change of the fuel injection mode from the split injection mode to the single injection mode, and a simultaneous and instantaneous advance of the compensation value Umusic_ig to the value of 0°. As a result, a reduction in the engine rotational speed NE associated with a decreased torque is canceled out by the compensation value Umusic_ig, so that, unlike the control result in FIG. 19, the engine rotational speed NE hardly alienates from the predetermined value NEref, and is held in a stable state. In other words, it is understood that the use of the compensation value Umusic_ig can appropriately restrain sudden fluctuations in rotation associated with the decreased torque.

In the foregoing manner, according to the idle rotational speed control approach of this embodiment, it is understood that sudden fluctuations in rotation can be appropriately restrained by using the compensation value Umusic_ig, even when the fuel injection mode is switched from the split injection mode to the single injection mode, and vice versa, to hold the engine rotational speed NE in a stable state.

Figure 20:
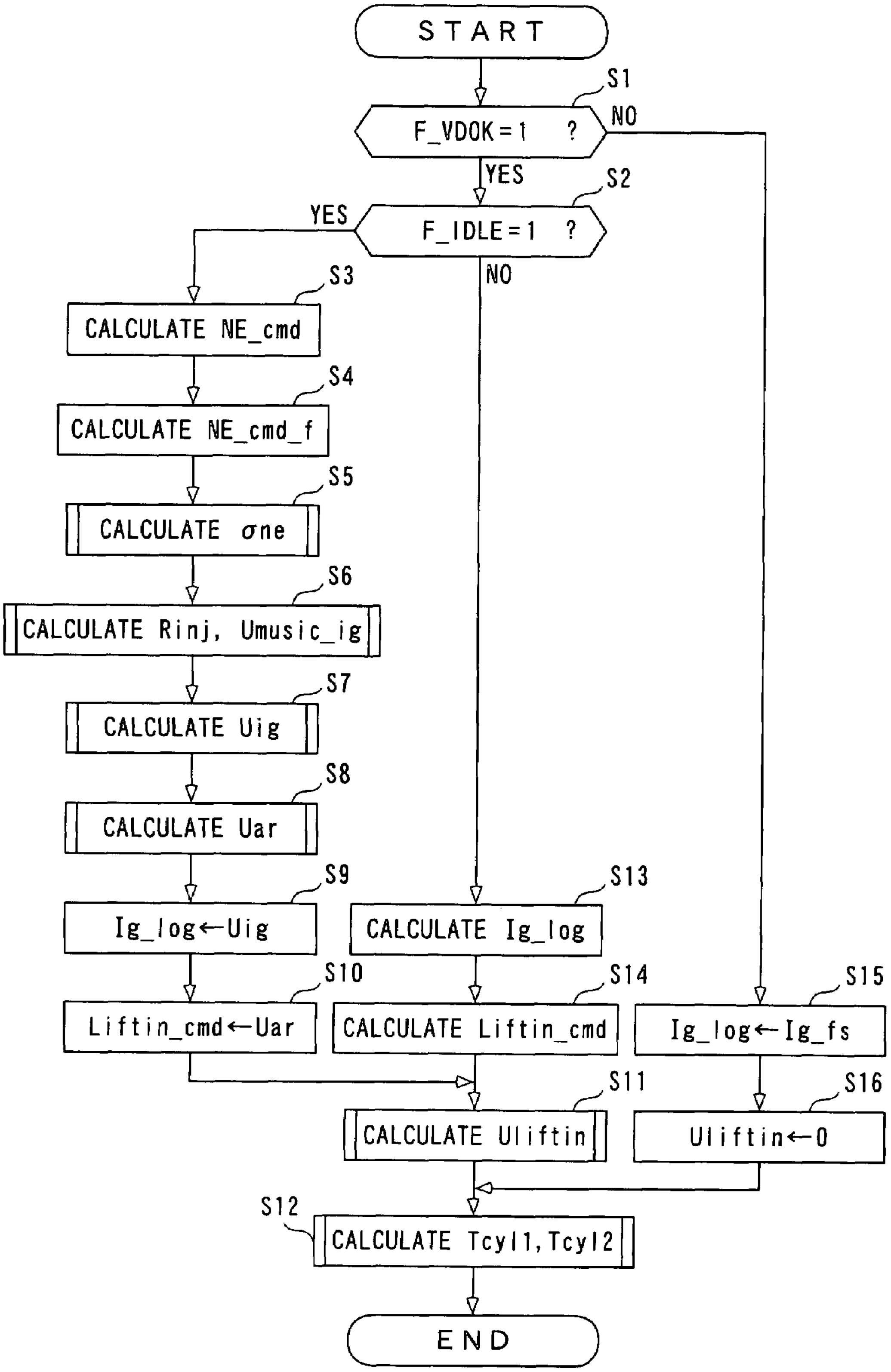
FIG. 20 is a flow chart showing a variety of control processing including the idle rotational speed control processing.

Next, a variety of control processing including the idle rotational speed control processing executed by the ECU 2 will be described with reference to FIG. 20. Specifically, this processing executes ignition timing control processing, intake air amount control processing, and fuel injection control processing at a predetermined control period.

In this processing, first, at step 1 (abbreviated as "S1" in the figures. The same is applied to the following description), it is determined whether or not a valve operation normal flag F_VDOK is "1." This valve operation normal flag F_VDOK is set to "1" when the variable intake valve driving mechanism 4 and variable exhaust valve driving mechanism 5 are both normal, and otherwise to "0."

When the result of the determination at step 1 is YES, i.e., when the variable intake valve driving mechanism 4 and variable exhaust valve driving mechanism 5 are both normal, the processing goes to step 2, where it is determined whether or not an idle operation flag F_IDLE is "1." This idle operation flag F_IDLE is set to "1" when idle operation conditions are satisfied, i.e., when the following three conditions (g1)-(g3) are all satisfied, and otherwise to "0."

(g1) the accelerator opening AP has a value indicative of a fully closed state;

(g2) the vehicle speed VP is equal to or lower than a predetermined value (for example, 3 km); and (g3) the engine rotational speed NE is equal to or higher than a predetermined value (for example, 200 rpm).

When the result of the determination at step 2 is YES, the processing goes to step 3, on the assumption that the idle rotational speed control should be executed, and the target rotational speed NE_cmd for idle operation is calculated by searching the aforementioned map of FIG. 9 in accordance with the engine water temperature TW and accessory load Load.

Next, at step 4, the filter value NE_cmd_f for the target rotational speed is calculated by the aforementioned equation (15), and subsequently, the switching function σne is calculated by the aforementioned equations (16), (17) at step 5.

Figure 21:
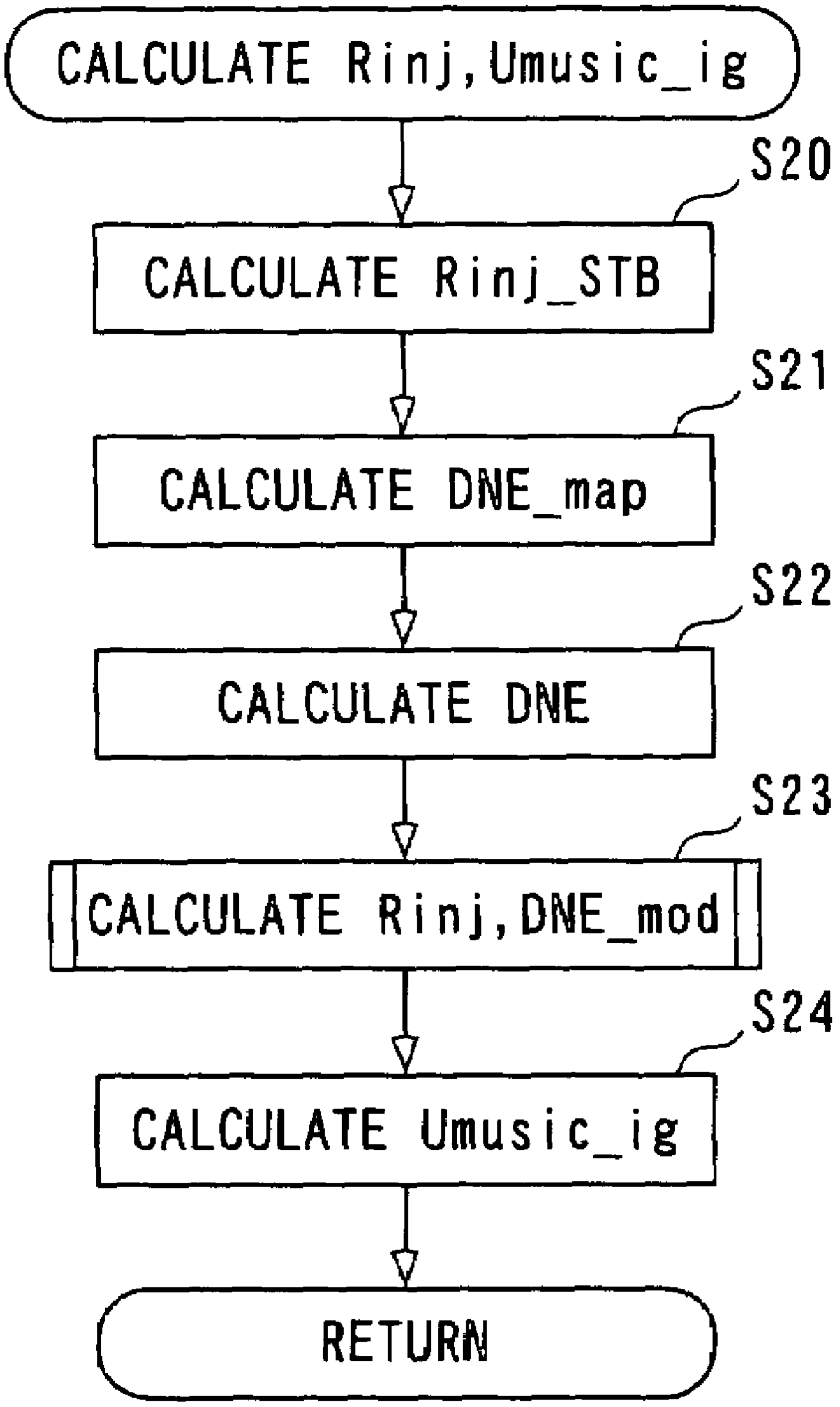
FIG. 21 is a flow chart showing calculation processing for the first-time injection ratio Rinj and compensation value Umusic_ig.

Next, the processing goes to step 6, where the first-time injection ratio Rinj and compensation value Umusic_ig is calculated. Specifically, this calculation processing is executed as shown in FIG. 21. As shown in FIG. 21, first at step 20, the requested value Rinj_STB for the first-time injection ratio Rinj is calculated by searching the aforementioned map of FIG. 11 in accordance with the target rotational speed NE_cmd.

Next, the processing goes to step 21, where the map value DNE_map is calculated by searching the aforementioned map of FIG. 12 in accordance with the requested value Rinj_STB for the first-time injection ratio Rinj and the target rotational speed NE_cmd. Subsequently, at step 22, the fluctuation prediction value DNE is calculated by the aforementioned equation (1).

Figure 22:
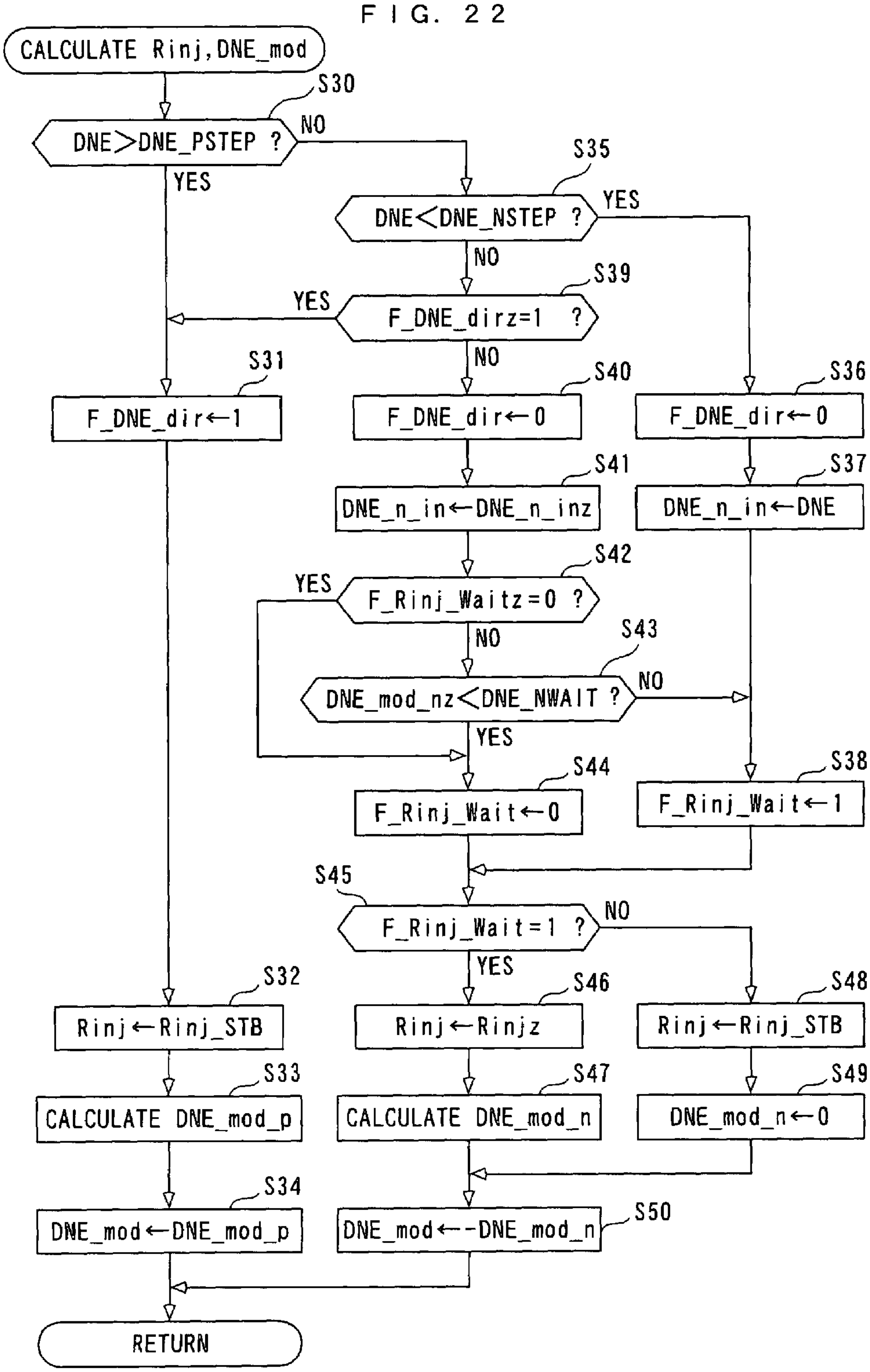
FIG. 22 is a flow chart showing calculation processing for the first-time injection ratio Rinj and a compensation target value DNE_mod.

Next, at step 23, the first-time injection ratio Rinj and compensation target value DNE_mod are calculated. Specifically, this calculation processing is executed as shown in FIG. 22. As shown in FIG. 22, first, at step 30, it is determined whether or not the fluctuation prediction value DNE is larger than the aforementioned increasing side threshold value DNE_PSTEP.

When the result of this determination is YES, the processing goes to step 31, on the assumption that the increasing side value DNE_mod_p for the compensation target value should be calculated because the engine rotational speed NE fluctuates in the increasing direction, where the fluctuation direction flag F_DNE_dir is set to "1" to indicate this. Next, the processing goes to step 32, where the first-time injection ratio Rinj is set to the requested value Rinj_STB.

At step 33 subsequent to step 32, the increasing side value DNE_mod_p for the compensation target value is calculated by the aforementioned equation (3). Next, at step 34, the compensation target value DNE_mod is set to the increasing side value DNE_mod_p, followed by the termination of this processing.

On the other hand, when the result of the determination at step 30 is NO, the processing goes to step 35, where it is determined whether or not the fluctuation predicted value DNE is smaller than the decreasing side threshold value DNE_NSTEP. When the result of this determination is YES, the processing goes to step 36, on the assumption that the decreasing side value DNE_mod_n for the compensation target value should be calculated because the engine rotational speed NE fluctuates in the decreasing direction, where the fluctuation direction flag F_DNE_dir is set to "0" to indicate this.

Next, the processing goes to step 37, where the decreasing side value DNE_n_in for the fluctuation prediction value is set to the fluctuation prediction value DNE calculated at step 22. Subsequently, the processing goes to step 38, where the wait flag F_Rinj_Wait is set to "1" to indicate that a change in the first-time injection ratio Rinj must be awaited.

On the other hand, when the result of the determination at step 35 is NO, i.e., when DNE_NSTEP≦DNE≦DNE_PSTEP is established, the processing goes to step 39, where it is determined whether or not the preceding value F_DNE_dirz of the fluctuation direction flag is "1."

When the result of this determination is YES, i.e., when the increasing side value DNE_mod_p for the compensation target value has been calculated in the preceding loop, steps 31-34 are executed in a manner described above, followed by the termination of the processing.

On the other hand, when the result of the determination at step 39 is NO, i.e., when the decreasing side value DNE_mod_n for the compensation target value has been executed in the preceding loop, the processing goes to step 40, where the fluctuation direction flag F_DNE_dir is set to "0" to indicate that the decreasing side value DNE_mod_n for the compensation target value should be continuously calculated.

At step 41 subsequent to step 40, the decreasing side value DNE_n_in for the fluctuation prediction value is se to its preceding value DNE_n_inz. Next, at step 42, it is determined whether or not the preceding value F_Rinj_Waitz of the wait flag is "0." When the result of this determination is YES, the processing goes to step 44, on the assumption that the first-time injection ratio Rinj should be changed, where the wait flag F_Rinj_Wait is set to "0" to indicate this.

On the other hand, when the result of the determination at step 42 is NO, i.e., when F_Rinj_Waitz=1, in other words, when a change in the first-time injection ratio Rinj has been awaited in the preceding loop, the processing goes to step 43, where it is determined whether or not the preceding value DNE_mod_nz of the decreasing side value for the compensation target value is smaller than the aforementioned threshold value DNE_NWAIT.

When the result of this determination is NO, i.e., when NE_mod_nz≧DNE_NWAIT, the processing goes to the aforementioned step 38, on the assumption that a change in the first-time injection ratio Rinj must be awaited, where the wait flag F_Rinj_Wait is set to "1."

On the other hand, when the result of the determination at step 43 is YES, i.e., when NE_mod_nz<DNE_NWAIT, the processing goes to the aforementioned step 44, on the assumption that the first-time injection ratio Rinj should be changed, where the wait flag F_Rinj_Wait is set to "0."

At step 45 subsequent to step 38 or 44, it is determined whether or not the wait flag F_Rinj_Wait is "1." When the result of this determination is YES, i.e., when a change in the first-time injection ratio Rinj must be awaited, the processing goes to step 46, where the first-time injection ratio Rinj is set to its preceding value Rinjz.

Next, at step 47, the decreasing side value DNE_mod_n for the compensation target value is calculated by the aforementioned equation (8).

On the other hand, when the result of the determination at step 45 is NO, i.e., when the first-time injection ratio Rinj should be changed, the processing goes to step 48, where the first-time injection ratio Rinj is set to its requested value Rinj_STB. Next, at step 49, the decreasing side value DNE_mod_n for the compensation target value is set to the value of zero.

At step 50 subsequent to step 47 or 49, the compensation target value DNE_mod is set to a negative value −DNE_mod_n of the decreasing side value therefor. Then, the processing is terminated.

Turning back to FIG. 21, after the first-time injection ratio Rinj and compensation target value DNE_mod have been calculated at step 23 in the foregoing manner, the processing goes to step 24, where the compensation value Umusic_ig is calculated by the aforementioned equation (12), followed by the termination of the processing.

Turning back to FIG. 20, after the first-time injection ratio Rinj and compensation value Umusic_ig have been calculated at step 6 in the foregoing manner, the processing goes to step 7, where the ignition manipulated variable Uig is calculated. Specifically, this calculation processing is executed as shown in FIG. 23.

Figure 23:
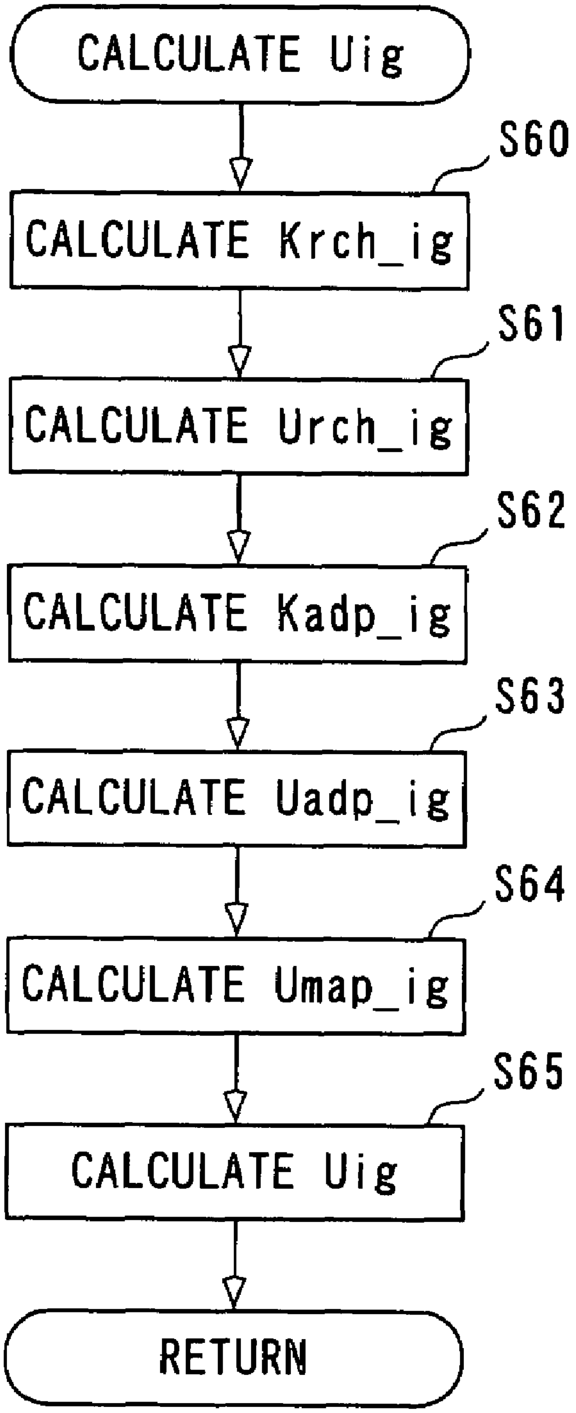
FIG. 23 is a flow chart showing calculation processing for an ignition manipulated variable Uig.

As shown in FIG. 23, first, at step 60, the reaching law gain Krch_ig is calculated by searching the aforementioned map of FIG. 14 in accordance with the switching function σne. At step 61 subsequent to step 60, the reaching law input Urch_ig is calculated by the aforementioned equation (18).

Next, the processing goes to step 62, where the adaptive law gain Kadp_ig is calculated by searching the aforementioned map of FIG. 15 in accordance with the switching function σne. At step 63 subsequent to step 62, the adaptive law input Uadp_ig is calculated by the aforementioned equation (19).

Next, the processing goes to step 64, where the map value Umap_ig is calculated by searching the aforementioned map of FIG. 16 in accordance with the filter value NE_cmd_f for the target rotational speed. Next, at step 65, the ignition manipulated variable Uig is calculated by the aforementioned equation (20), followed by the termination of the processing.

Turning back to FIG. 20, after the ignition manipulated variable Uig has been calculated at step 7, the processing goes to step 8, where the intake manipulated variable Uar is calculated. Specifically, this calculation processing is executed as shown in FIG. 24.

Figure 24:
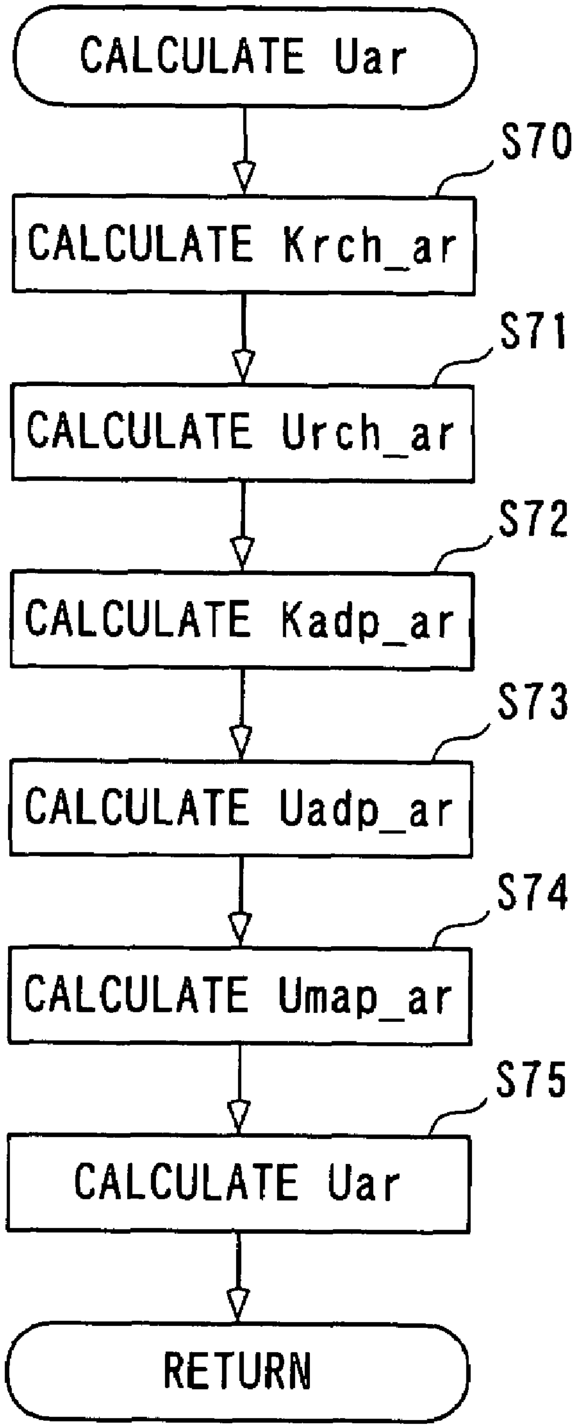
FIG. 24 is a flow chart showing calculation processing for an intake manipulated variable Uar.

As shown in FIG. 24, first, at step 70, the reaching law gain Krch_ar is calculated by searching the aforementioned map of FIG. 14 in accordance with the switching function σne. At step 71 subsequent to step 70, the reaching law input Urch_ar is calculated by the aforementioned equation (21).

Next, the processing goes to step 72, where the adaptive law gain Kadp_ar is calculated by searching the aforementioned map of FIG. 15 in accordance with the switching function σne. At step 73 subsequent to step 72, the adaptive law input Uadp_ar is calculated by the aforementioned equation (22).

Next, the processing goes to step 74, where the map value Umap_ar is calculated by searching the aforementioned map of FIG. 17 in accordance with the filter value NE_cmd_f for the target rotational speed. Next, at step 75, the intake manipulated variable Uar is calculated by the aforementioned equation (23), followed by the termination of the processing.

Turning back to FIG. 20, after the intake manipulated variable Uar has been calculated at step 8 in the foregoing manner, the processing proceeds to step 9, where the ignition manipulated variable Uig is set as the ignition timing Ig_log. Subsequently, the processing goes to step 10, where the intake manipulated variable Uar is set as the target intake valve opening Liftin_cmd.

Next, at step 11, an intake valve control input Uliftin is calculated in accordance with a target value filter type two-degree-of freedom sliding mode control algorithm represented by the following equations (24)-(30) in accordance with the intake valve opening Liftin and target intake valve opening Liftin_cmd:

$$\mathrm{Liftin\_cmd\_f}(k) = -\mathrm{POLE\_f}'' \cdot \mathrm{Liftin\_cmd\_f}(k-1) + (1+\mathrm{POLE\_f}'')\cdot \mathrm{Liftin\_cmd}(k) \tag{24}$$

$$\sigma li(k) = Eli(k) + \mathrm{POLE}'' \cdot Eli(k-1) \tag{25}$$

$$Eli(k) = Liftin(k) - \mathrm{Liftin\_cmd\_f}(k-1) \tag{26}$$

-continued $$\mathrm{Ueq\_li}(k) = \frac{1}{b1''}\{(1-a1''-\mathrm{POLE}'')\cdot Liftin(k) + (\mathrm{POLE}''-a2'')\cdot Liftin(k-1) - b2''\cdot Uliftin(k-1) + \mathrm{Liftin\_cmd\_f}(k) + (\mathrm{POLE}''-1)\cdot \mathrm{Liftin\_cmd\_f}(k-1) - \mathrm{POLE}''\cdot \mathrm{Liftin\_cmd\_f}(k-2)\} \tag{27}$$

$$\mathrm{Urch\_li}(k) = \frac{-\mathrm{Krch\_li}}{b1''}\cdot \sigma li(k) \tag{28}$$

$$\mathrm{Uadp\_li}(k) = \frac{-\mathrm{Kadp\_li}}{b1''}\cdot \sum_{i=0}^{k} \cdot \sigma li(i) \tag{29}$$

$$Uliftin(k) = \mathrm{Ueq\_li}(k) + \mathrm{Urch\_li}(k) + \mathrm{Uadp\_li}(k) \tag{30}$$

In these equations (24)-(30), Liftin_cmd_f represents a filter value for the target intake valve opening Liftin_cmd; σli a switching function; Eli a follow-up error; Ueq_li an equivalent control input; Urch_μl a reaching law input; Krch_li a reaching law input gain; Uadp_li an adaptive law input; and Kapt_μl an adaptive law input gain, respectively. Also, POLE_f" is a target value response specifying parameter which is set to establish a relationship −1<POLE"_f<0, and POLE" is a switching function setting parameter which is set to establish −1<POLE"<0. Further, a1", a2", b1", b2" represent model parameters for a model (not shown) which defines dynamic characteristics of the valve lift Liftin and intake valve control input Uliftin.

As described above, the ignition timing Ig_log and intake valve control input Uliftin for the idle rotational speed control are calculated to execute the ignition timing control at a timing in accordance with the ignition timing Ig_log through the ignition plug 13, and the intake valve 4*a* is driven to open to the intake valve opening Liftin in accordance with the intake valve control input Uliftin through the variable intake valve driving mechanism 4. In this way, the intake valve opening Liftin is controlled to converge to the target intake valve opening Liftin_cmd to control the intake air amount Gcyl.

At step 12 subsequent to step 11, the first-time injection amount Tcyl1 and second-time injection amount Tcyl2 are calculated. Specifically, this calculation processing is executed as shown in FIG. 25.

Figure 25:
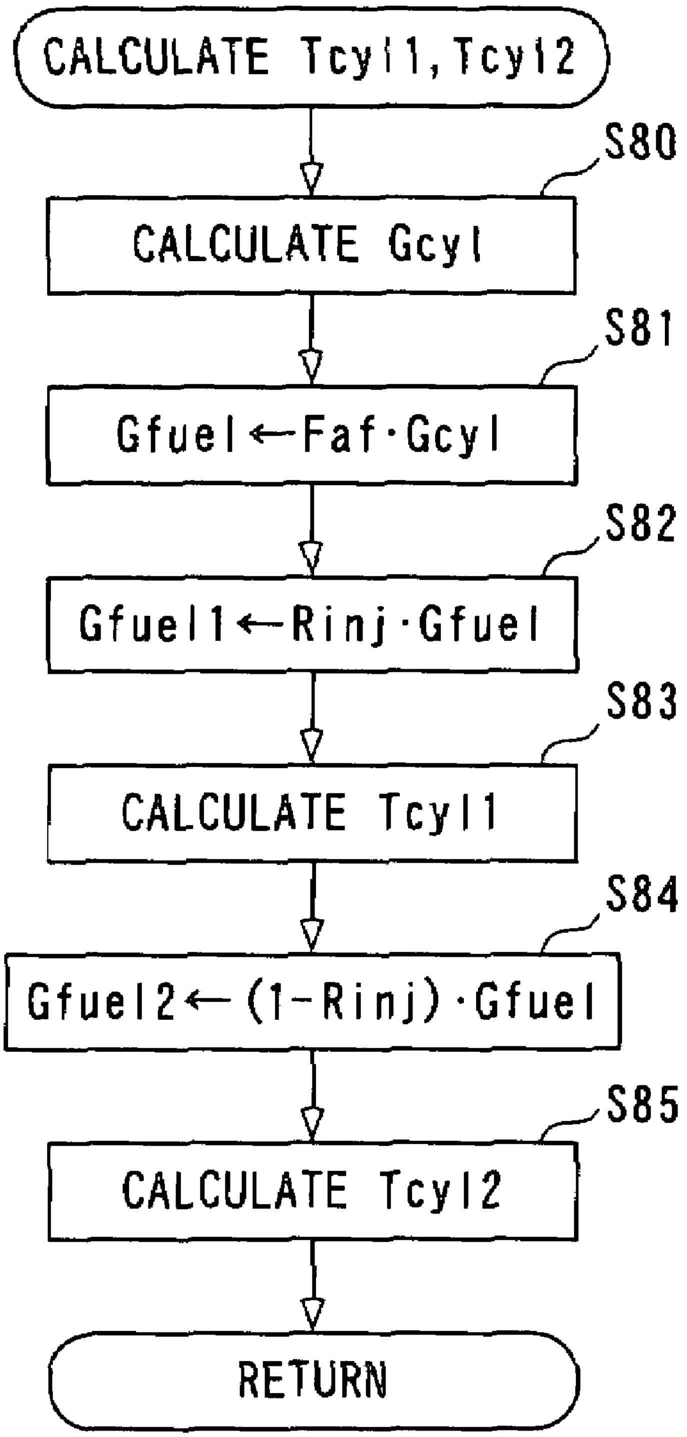
FIG. 25 is a flow chart showing calculation processing for a first-time injection amount Tcyl1 and a second-time injection amount Tcyl2.

As shown in FIG. 25, first, at step 80, the intake air amount Gcyl is calculated based on the detection signal of the air flow sensor 22, engine rotational speed NE and the like. Next, the processing goes to step 81, where the product Faf·Gcyl of a conversion coefficient Faf and the intake air amount Gcyl is set as a fuel conversion value Gfuel. This conversion value Faf is a value for converting the intake air amount Gcyl into the amount of fuel, and is calculated as a value which reflect a target air/fuel ratio which is a target value for the air/fuel ratio of the air/fuel mixture in calculation processing not shown.

At step 82 subsequent to step 81, the product Rinj·Gfuel of the first-time injection ratio Rinj and fuel conversion value Gfuel is set as a first-time fuel conversion value Gfuel1. Next, the processing proceeds to step 83, where the first-time injection amount Tcyl1 is calculated by searching a map, not shown, in accordance with the first-time fuel conversion value Gfuel1. In this event, the first-time injection amount Tcyl1 is calculated as a valve timings (a valve opening and a valve closing timing) for the fuel injection valve 6.

Next, at step 84, the product (1−Rinj)·Gfuel of a value calculated by subtracting the first-time injection ratio Rinj from the value of one and the fuel conversion value Gfuel is set as a second-time fuel conversion value Gfuel2. At step 85 subsequent to step 84, the second-time injection amount Tcyl2 is calculated by searching a map, not shown, in accordance with the second-time fuel conversion value Gfuel2. In this event, the second-time injection amount Tcyl2 is also calculated as valve timings for the fuel injection valve 6 in a manner similar to the first-time injection amount Tcyl1. Subsequently, the processing is terminated.

Turning back to FIG. 20, the processing is terminated after the first-time injection amount Tcyl1 and second-time injection amount Tcyl2 have been calculated at step 12 in the foregoing manner.

Figure 26:
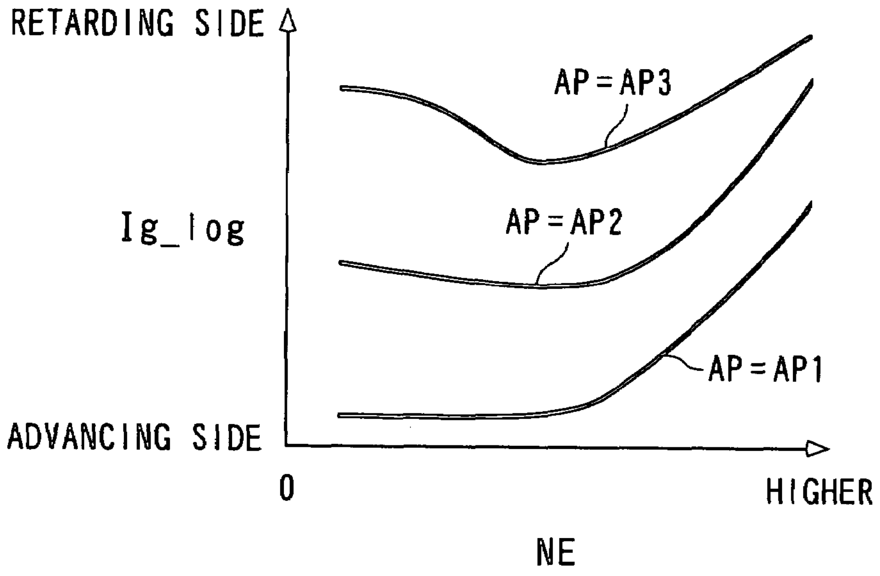
FIG. 26 is a diagram showing an example of a map used to calculate an ignition timing Ig_log.

On the other hand, when the result of the determination at step 2 is NO, i.e., when the idle operation conditions are not satisfied, the processing goes to step 13, where the ignition timing Ig_log is calculated by searching a map shown in FIG. 26 in accordance with the target rotational speed NE_cmd and accelerator opening AP. In FIG. 26, AP1-AP3 are predetermined accelerator openings AP which satisfy a relationship AP1<AP2<AP3. This aspect is also applied to the following description. In this map, the ignition timing Ig_log is set to a more retarded value as the accelerator opening AP is larger, and is set to a more retarded value as the engine rotational speed NE is higher in a high rotation region. This is because the ignition timing Ig_log must be controlled to the retarding side in order to avoid knocking which is more susceptible to occur when the engine rotational speed NE or engine load is high.

Figure 27:
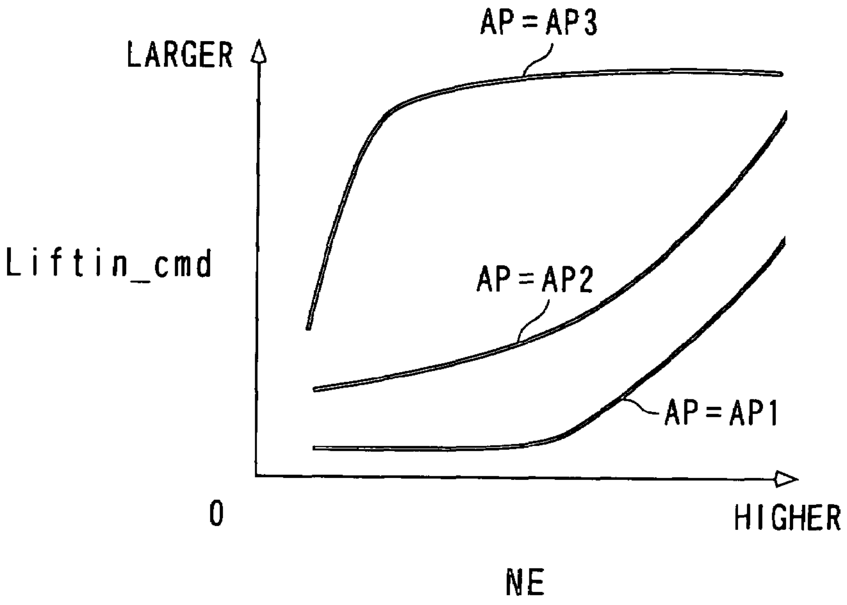
FIG. 27 is a diagram showing an example of a map used to calculate a target intake opening angle Liftin_cmd.

Next, at step 14, the target intake valve opening Liftin_cmd is calculated by searching a map shown in FIG. 27 in accordance with the target rotational speed NE_cmd and accelerator opening AP. In this map, the target intake valve opening Liftin_cmd is set to a larger value as the accelerator opening AP is larger, or as the engine rotational speed NE is higher. This is intended to control the intake valve opening Liftin, i.e., intake air amount Gcyl to a large value with the intention to ensure an appropriate engine torque TRQ when the engine rotational speed NE or engine load is high.

Next, the intake valve control input Uliftin is calculated at step 11 as described above, and then, the first-time injection amount Tcyl1 and second-time injection amount Tcyl2 are calculated at step 12, followed by the termination of the processing.

On the other hand, when the result of the determination at step 1 is NO, i.e., when at least one of the variable intake valve driving mechanism 4 and variable exhaust valve driving mechanism 5 fails, the processing goes to step 15, where the ignition timing Ig_log is set to a failure event value Ig_fs. This failure event value Ig_fs is calculated in accordance with a predetermined feedback control algorithm such that the engine rotational speed NE reaches a predetermined failure event target rotational speed NE_cmd_fs (for example, 1500 rpm).

Next, after the intake valve control input Uliftin is set to the value of zero at step 16, followed by the termination of the processing. In this way, the intake valve 4*a* is driven by the variable intake valve driving mechanism 4 such that the intake valve opening Liftin reaches a minimum value.

As described above, according to the control apparatus 1 of the first embodiment, when the combustion mode is switched from the uniform combustion mode to the stratified combustion mode due to a request for an increase in the engine torque TRQ, switching of the map for calculating the requested value Rinj_STB for the first-time injection ratio Rinj, and the like, the ignition manipulated variable Uig, i.e., ignition timing Ig_log is rapidly corrected toward the retarding side by the compensation value Umusic_ig in synchronism with a switching timing, thus making it possible to cancel out an increase in the engine torque TRQ associated with the switching to the stratified combustion mode, i.e., an increase in the engine rotational speed NE.

Also, after the switching to the stratified combustion mode, the increasing side value DNE_mod_p for the compensation target value is calculated by the forgetting operation processing using the forgetting coefficient λp shown in the equation (3), so that the compensation value Umusic_ig changes toward the value of zero as the operation processing advances, and the ignition manipulated variable Uig, i.e., ignition timing Ig_log gradually changes toward the advancing side. In this way, the ignition timing Ig_log is prevented from being held as corrected toward the retarding side by the compensation value Umusic_ig for a long time, thus making it possible to improve the fuel economy.

Further, as the engine rotational speed NE is to increase due to a gradual change of the ignition timing Ig_log toward the advancing side, the intake manipulated variable Uar, i.e., target intake valve opening Liftin_cmd is calculated to slowly decrease by the equation (23) of the coordinated feedback controller 50, as described above, so that the intake air amount Gcyl is slowly controlled toward the decreasing side. As a result, an increase in the engine rotational speed NE associated with a change of the ignition timing Ig_log toward the advancing side can be restrained after the switching to the stratified combustion mode. In other words, the intake air amount Gcyl can be controlled by the intake manipulated variable Uar so as to cancel out the influence of the compensation value Umusic_ig.

On the other hand, when the combustion mode is switched from the stratified combustion mode to the uniform combustion mode due to a request for a decrease in the engine torque TRQ, switching of the map for calculating the requested value Rinj_STB for the first-time injection ratio Rinj, and the like, the switching to the uniform combustion mode is not performed at a timing at which the request for a decrease is made or at a timing at which the calculation map is switched, but the switching to the uniform combustion mode is executed at a subsequent timing after the absolute value of the compensation value Umusic_ig has been changed to such a value on the retarding side that torque down can be compensated, and the compensation value Umusic_ig is also changed rapidly to the value of zero on the advancing side. In this way, the compensation value Umusic_ig can cancel out a decrease in the engine torque TRQ associated with the switching to the uniform combustion mode, i.e., a reduction in the engine rotational speed NE.

Also, when the engine rotational speed NE tends to become lower due to a change of the compensation value Umusic_ig toward the retarding side while switching of the combustion mode is being awaited, the intake manipulated variable Uar, i.e., target intake valve opening Liftin_cmd is calculated to slowly increase by the equation (23) of the coordinated feedback controller 50, to slowly control the intake air amount Gcyl toward the increasing side. This can cancel out a reduction in the engine rotational speed NE.

Further, since the ignition manipulated variable Uig and intake manipulated variable Uar are respectively calculated by the control algorithm which applies the target value filter type two-degree-of-freedom sliding mode control algorithm, while sharing the switching function σne and the filter value NE_cmd_f for the target rotational speed, the engine rotational speed NE can be appropriately converged to the target rotational speed NE_cmd while avoiding these manipulated variables Uig, Uar from interfering with each other.

While the first embodiment has shown an example in which the compensation value Umusic_ig as a correction value is calculated as an addition term, the correction value for correcting the first manipulated variable of the present invention is not so limited, but any correction value can be employed as long as it corrects the first manipulated variable so as to cancel a change in the controlled variable associated with the switching of the combustion mode. For example, a value multiplied by the ignition manipulated variable Uig may be used as a correction value.

Also, while the first embodiment has shown an example in which the control apparatus of the present invention is applied to an internal combustion engine which is operated with the air/fuel mixture combustion mode being switched between two combustion modes (i.e., the stratified combustion mode and uniform combustion mode), the control apparatus of the present invention is not so limited, but may be applied to an internal combustion engine which is operated with the air/fuel mixture combustion mode being switched among three or more combustion modes. For example, the control apparatus of the present invention may be applied to an internal combustion engine which is operated with the air/fuel mixture combustion mode being switched among a compression ignition combustion mode, a uniform combustion mode, and a stratified combustion mode, or to an internal combustion engine which is operated with the air/fuel mixture combustion mode being switched between a two-cycle mode and a four-cycle mode.

Further, while the first embodiment has shown an example in which the control apparatus of the present invention is applied to an internal combustion engine which is operated with the air/fuel mixture combustion mode being switched between the stratified combustion mode and uniform combustion mode, the control apparatus of the present invention is not so limited, but may be applied to an internal combustion engine which is operated with a plurality of combustion modes being switched from one to another. For example, the present invention may be applied to an internal combustion engine which is operated with the combustion mode being switched between a compression ignition combustion mode and a uniform combustion mode.

On the other hand, while the first embodiment has shown an example in which the control apparatus of the present invention is applied to an internal combustion engine for a vehicle, the control apparatus of the present invention is not so limited, but can be applied to a variety of internal combustion engines such as internal combustion engines for shipping, power generation and the like.

Also, while the first embodiment has shown an example in which the intake manipulated variable Uar corresponding to the second manipulated variable is calculated as the target intake valve opening Liftin_cmd, the control apparatus may be configured to calculate the intake manipulated variable Uar as the intake control input Uliftin and control the variable intake valve driving mechanism 4 using the thus calculated intake control input Uliftin. Also, when a variable lift mechanism for freely changing a lift (maximum lift) of an intake value, or a variable cam phase mechanism for freely changing the phase of an intake cam to a crank shaft is used as a mechanism for freely changing a valve timing of an intake valve, the intake manipulated variable Uar may be calculated as a control input or a value for controlling these mechanism. In other words, the intake manipulated variable Uar may be any value which is calculated such that the intake air amount Gcyl can be changed.

Further, while the first embodiment has shown an example in which the compensation value Umusic_ig is calculated so as to instantaneously change to the value of zero at a timing at which the wait flag F_Rinj_Wait switches from "1" to "0" when torque down is caused by switching of the combustion mode, the compensation value Umusic_ig may be calculated to more slowly change to the value of zero than the first embodiment as long as fluctuations in rotation associated with the torque down can be restrained.

Next, a control apparatus 1A for an internal combustion engine according to a second embodiment of the present invention will be described with reference to FIG. 28. This control apparatus 1A differs from the control apparatus 1 of the first embodiment only in that a Pmi controller 130 shown in FIG. 28 is provided in place of the idle rotational speed controller 30, and the rest of the configuration is similar to that of the control apparatus 1 of the first embodiment, so that the following description will be centered on the Pmi controller 130.

The Pmi controller 130 controls an indicated mean effective pressure Pmi shown in FIG. 28 in a manner described below, and is specifically implemented by the ECU 2. In this event, since the shown indicated mean effective pressure Pmi substantially corresponds to the engine torque TRQ, controlling the shown indicated mean effective pressure Pmi corresponds to controlling the engine torque TRQ. In this embodiment, the shown indicated mean effective pressure Pmi corresponds to a controlled variable representative of a generated torque.

The Pmi controller 130 calculates a first-time injection ratio Rinj, an ignition manipulated variable Uig', and an intake manipulated variable Uar' in accordance with a control algorithm described below, and inputs these three values Rinj, Uig', Uar' to the engine 3 as a controlled object to feedback control the shown indicated mean effective pressure Pmi as a controlled variable during the operation of the engine 3 to converge to a target pressure Pmi_cmd, later described, without presenting sudden fluctuations (in other words, without causing sudden fluctuations in torque). In this event, the ignition manipulated variable Uig' is the ignition timing Ig_log, while the intake manipulated variable Uar' is the aforementioned target intake valve opening Liftin_cmd. In this embodiment, the Pmi controller 130 corresponds to first manipulated variable calculating means and second manipulated variable calculating means, the ignition manipulated variable Uig' corresponds to a first manipulated variable, and the intake manipulated variable Uar' corresponds to a second manipulated variable.

Figure 28:
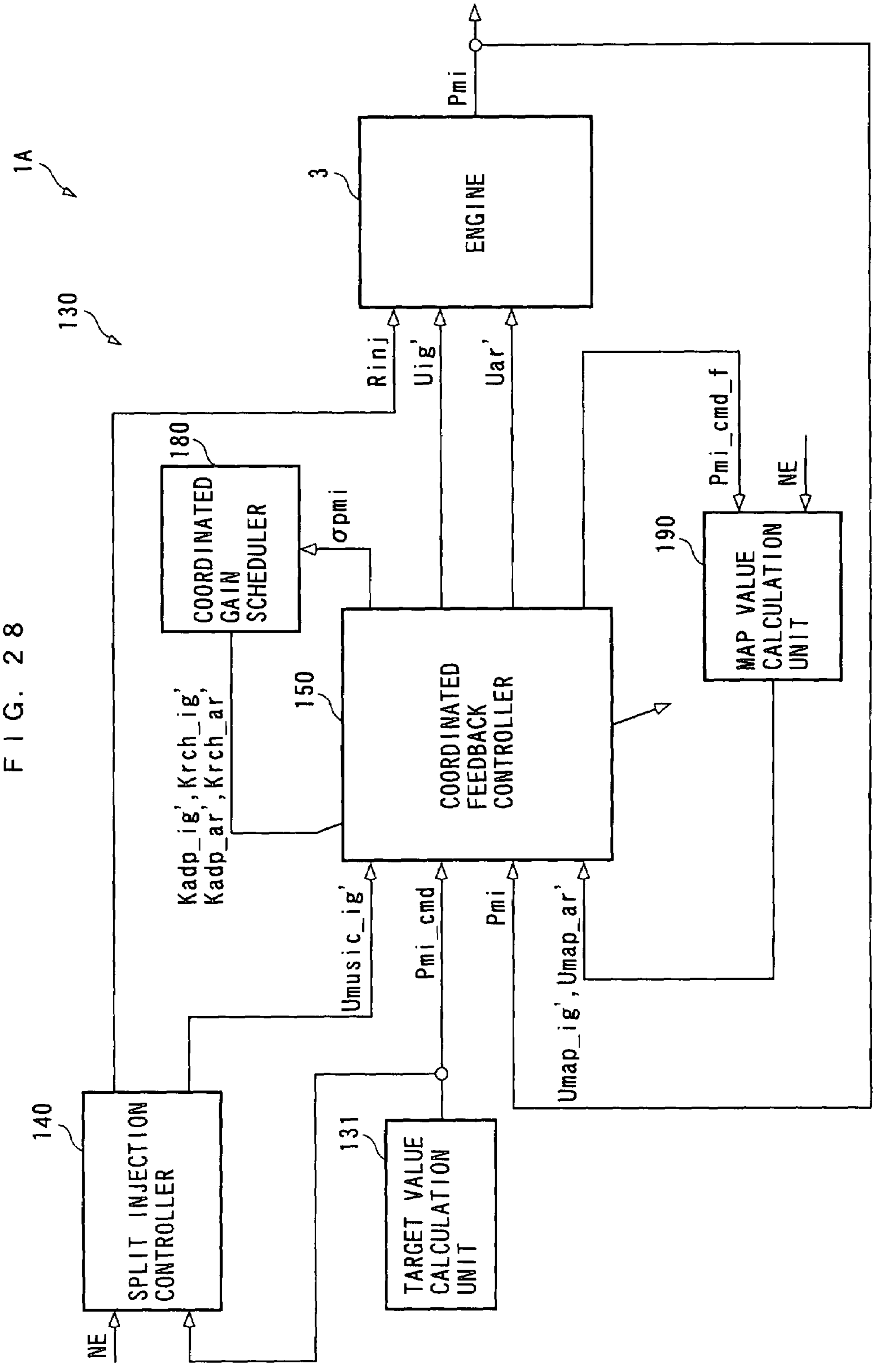
FIG. 28 is a block diagram generally showing the configuration of a Pmi controller of a control apparatus according to a second embodiment of the present invention.

As shown in FIG. 28, the Pmi controller 130 comprises a target value calculation unit 131, a split injection controller 140, a coordinated feedback controller 150, a coordinated gain scheduler 180, and a map value calculation unit 190.

The target value calculation unit 131 calculates the target pressure Pmi_cmd by searching a map, not shown, in accordance with an operating condition parameter representative of an operating condition of the engine 3 (for example, the engine rotational speed NE and accelerator opening AP). In this embodiment, the target value calculation unit 131 corresponds to target controlled variable calculating means, and the target pressure Pmi_cmd corresponds to a target controlled variable.

The split injection controller 140 in turn calculates a compensation value Umusic_ig' and the first-time injection ratio Rinj in accordance with the engine rotational speed NE and target pressure Pmi_cmd, as will be later described. In this embodiment, the split injection controller 140 corresponds to correction value calculating means and delaying means, and the compensation value Umusic_ig' corresponds to a correction value.

Further, the coordinated feedback controller 150 calculates the ignition manipulated variable Uig' and intake manipulated variable Uar' in accordance with the target pressure Pmi_cmd, shown average affective pressure Pmi, compensation value Umusic_ig', two map values Umap_ig', Umap_ar', and four gains Krch_ig', Kadp_ig', Krch_ar', Kadp_ar', as ill be later described. In this embodiment, the coordinated feedback controller 150 corresponds to first basic manipulated variable calculating means and modifying means.

The coordinated gain scheduler 180 in turn calculates the four gains Krch_ig', Kadp_ig', Krch_ar', Kadp_ar' in accordance with a switching function σpmi calculated by the coordinated feedback controller 150, as will be later described.

The map value calculation unit 190 calculates the two map values Umap_ig', Umap_ar' in accordance with the engine rotational speed NE and a filter value Pmi_cmd_f for the target pressure calculated by the coordinated feedback controller 150, as will be later described. In this embodiment, the map value calculation unit 190 corresponds to first basic manipulated variable calculating means.

Next, the aforementioned split injection controller 140 will be described. As will be later described, the split injection controller 140 calculates the compensation value Umusic_ig' and first-time injection ratio Rinj in accordance with the engine rotational speed NE and target pressure Pmi_cmd. This compensation value Umusic_ig' is a value corresponding to a feed forward term for compensating for sudden fluctuations in torque through the ignition timing control during the operation of the engine 3, and is therefore used as an addition term in a calculation of the ignition manipulated variable Uig' in the ignition timing controller 60, later described.

Figure 29:
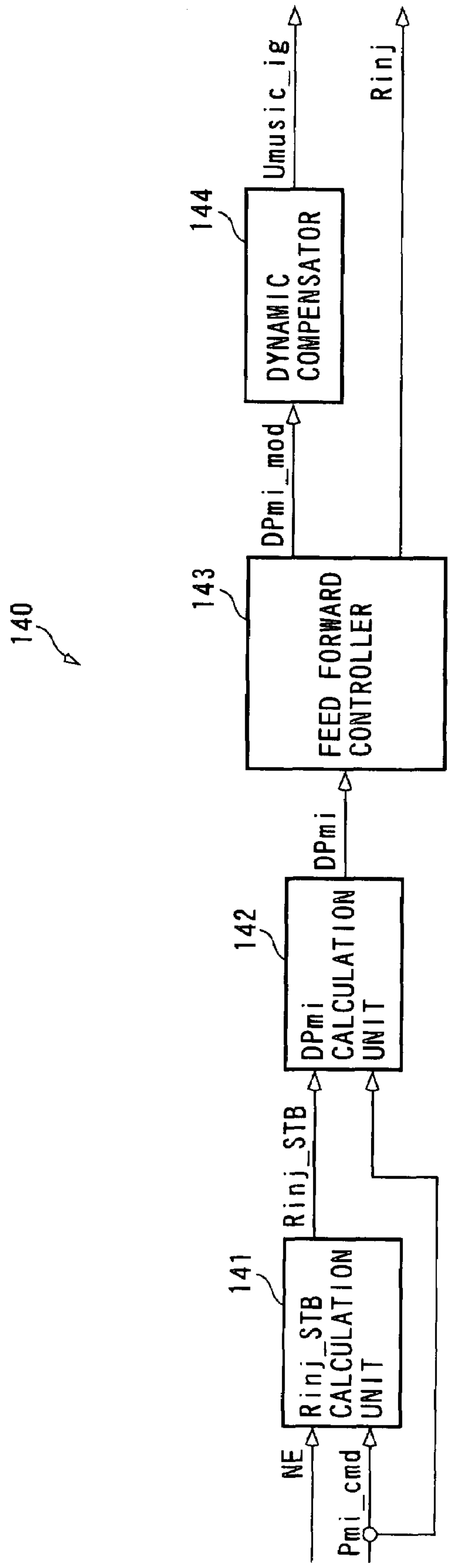
FIG. 29 is a block diagram generally showing the configuration of a split injection controller according to the second embodiment.

The split injection controller 140 comprises an Rinj_STB calculation unit 141, a DPmi calculation unit 142, a feed forward controller 143, and a dynamic compensator 144, as shown in FIG. 29.

Figure 30:
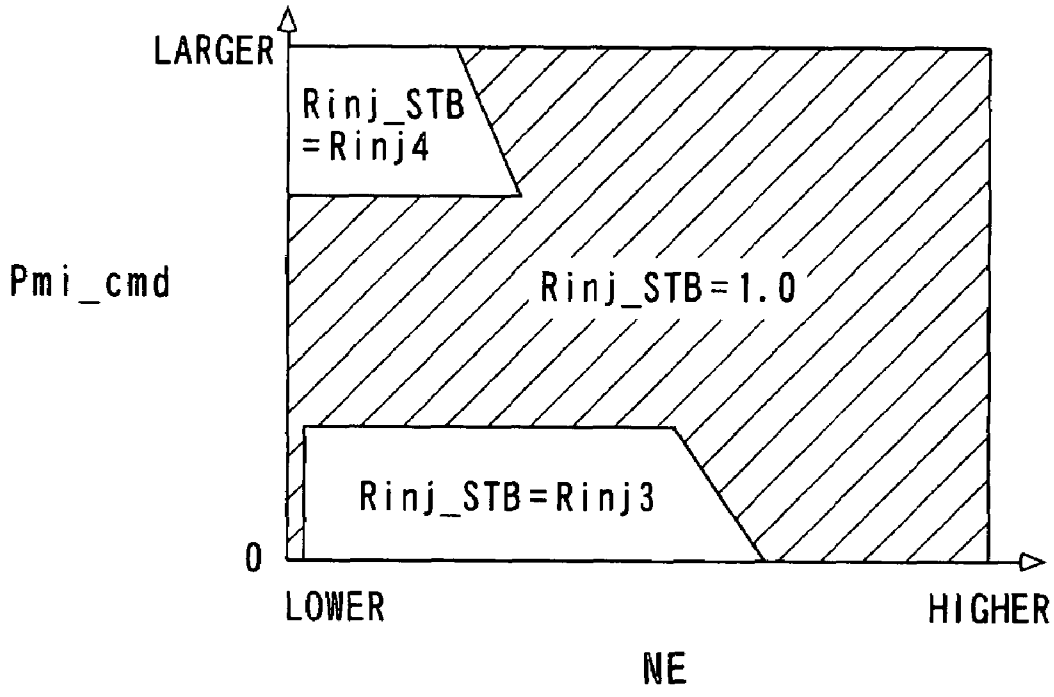
FIG. 30 is a diagram showing an example of a map used to calculate a requested value Rinj_STB for the first-time injection ratio.

The Rinj_STB calculation unit 141 calculates a requested value Rinj_STB for the first-time injection ratio Rinj by searching a map shown in FIG. 30 in accordance with the engine rotational speed NE and target pressure Pmi_cmd. In FIG. 30, Rinj3, Rinj4 are predetermined values of the first-time injection ratio Rinj which satisfy Rinj3<Rinj4 and Rinj4=Rinj_lmt.

As shown in FIG. 30, the requested value Rinj_STB is set at the value of 1.0 in a high rotational speed region. This is intended to select the single injection mode because one combustion cycle becomes too short to ensure an injection time for the second-time injection amount Tcyl2 in the high rotational speed region. Also, in this map, the requested value Rinj_STB is set at a predetermined value Rinj2 in a region in which both the target pressure Pmi_cmd and engine rotational speed NE are low, i.e., in a low load/low rotational speed region. This is intended to improve the fuel efficiency to improve the fuel economy by promoting the stratified combustion with a weak air/fuel mixture. Further, in a high load/low rotational speed region, the requested value Rinj_STB is set at a predetermined value Rinj3. This is intended to improve a filling efficiency by cooling down the fuel and to restrain knocking to improve the engine torque TRQ by promoting the stratified combustion with a weak air/fuel mixture.

Next, the DPmi calculation unit 142 calculates a fluctuation prediction value DPmi in accordance with the requested value Rinj_STB for the first-time injection ratio Rinj and the target pressure Pmi_cmd. This fluctuation prediction value DPmi predicts the amount of fluctuations in the shown indicated mean effective pressure Pmi when the first-time injection ratio Rinj is changed during the operation of the engine 3, and is specifically calculated by an approach described below.

Figure 31:
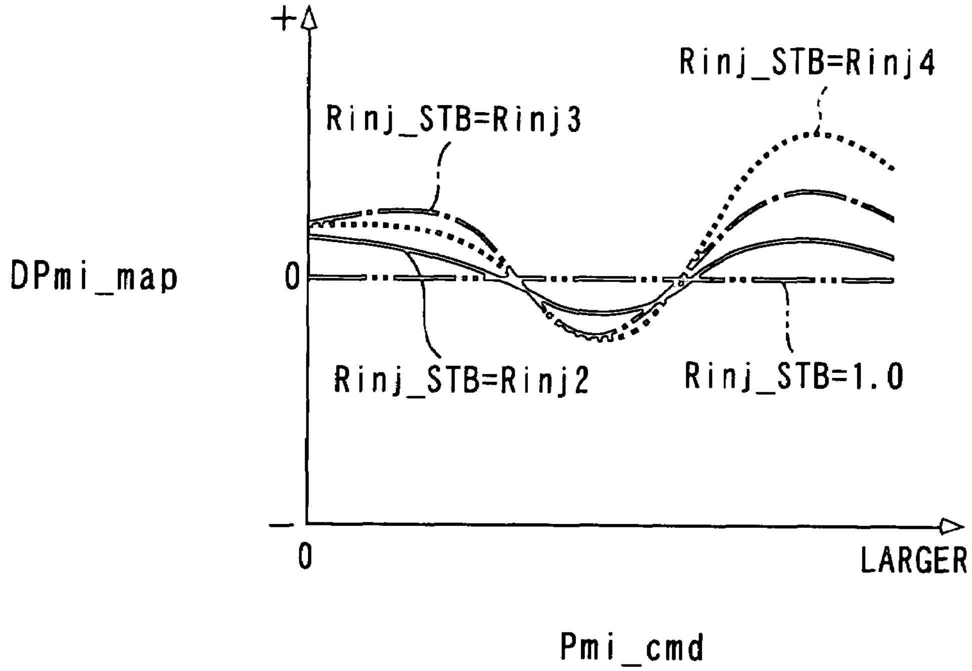
FIG. 31 is a diagram showing an example of a map for a low rotation range used to calculate a map value DPmi_map.
Figure 32:
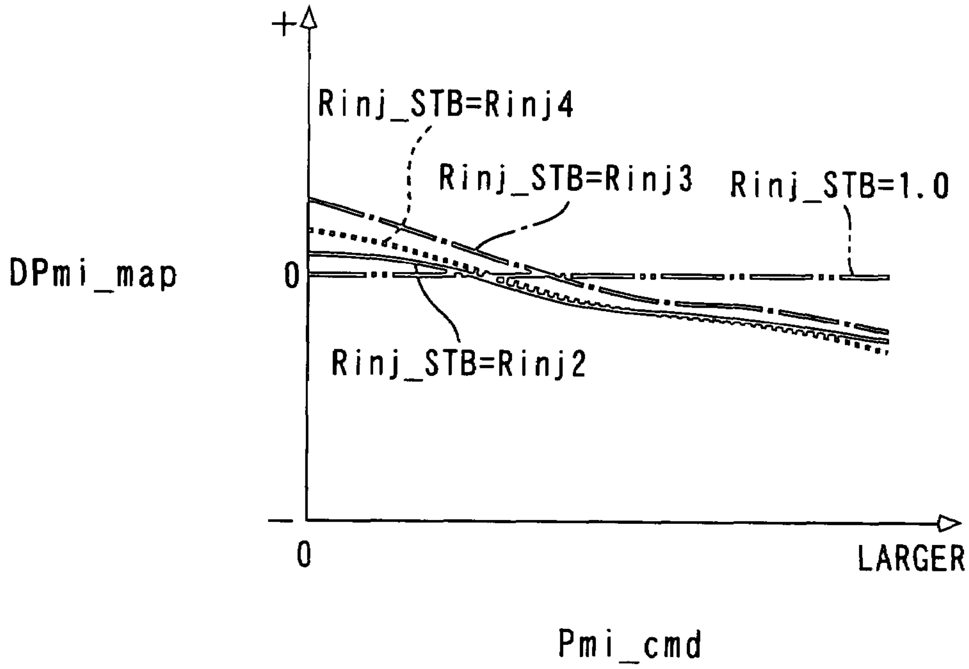
FIG. 32 is a diagram showing an example of a map for a middle rotation range used to calculate the map value DPmi_map.

First, the map value DPmi_map is calculated by searching maps shown in FIGS. 31 and 32 in accordance with the requested value Rinj_STB for the first-time injection ratio Rinj and the target pressure Pmi_cmd. FIGS. 31 and 32 show maps for a low rotational speed region and a middle rotational speed region, respectively, which are used to calculate the map value DPmi_map when the engine rotational speed NE is in a predetermined low rotational speed region or in middle rotational speed region. These maps correspond to a response surface model which represents the relationship between the target pressure Pmi_cmd and the requested value Rinj_STB for the first-time injection ratio Rinj, i.e., the relationship between the shown indicated mean effective pressure Pmi as a controlled variable and the stratified combustion mode and uniform combustion mode. Also, a map for a high rotational speed region is not set because the split injection mode is not executed when the engine rotational speed NE is in the high rotational speed region.

Rinj2 in FIGS. 31 and 32 is a predetermined value for the first-time injection ratio Rinj which satisfies Rinj2<Rinj3 for the aforementioned predetermined value Rinj3. In these maps, a curve for the target pressure Pmi_cmd is not set for a range of Rinj_STB<Rinj2. This is intended to avoid an instable combustion state of the engine 3 in the range of Rinj_STB<Rinj2. Also, a curve for the target pressure Pmi_cmd is not either set for a range of Rinj4<Rinj_STB<1.0 due to the aforementioned characteristics of the fuel injection valve 6.

Next, the fluctuation prediction value DPmi is calculated by the following equation (31):

$$DPmi(k)=DPmi\_map(k)-DPmi\_map(k-1) \tag{31}$$

The aforementioned feed forward controller 143 calculates the first-time injection ratio Rinj and compensation target value DPmi_mod by an approach described below. The compensation target value DPmi_mod is a value corresponding to the amount of fluctuations in the shown indicated mean effective pressure Pmi which should be compensated for by the compensation value Umusic_ig'.

First, a fluctuation direction flag F_DPmi_dir is set to a value in the following manner. The fluctuation direction flag F_DPmi_dir indicates whether or not it is anticipated that the shown indicated mean effective pressure Pmi will change toward an increasing side when the first-time injection ratio Rinj is changed. Specifically, when the following condition (h1) is satisfied, or both conditions (h2), (h3) are satisfied, it is anticipated that the shown indicated mean effective pressure Pmi will change toward the increasing side, so that the fluctuation direction flag F_DPmi_dir is set to “1” to indicate the anticipation.

(h1) DPmi>DPmi_PSTEP (h2) DPmi_NSTEP≦DPmi≦DPmi_PSTEP (h3) F_DPmi_dir(k−1)=1

Here, DPmi_PSTEP in the conditions (h1), (h2) is an increasing side threshold value for determining whether or not the shown indicated mean effective pressure Pmi will increase toward the increasing side when the first-time injection ratio Rinj is changed, and is set to a predetermined positive value (for example, 50 kpa). Also, DPmi_NSTEP in the condition (h2) is a decreasing side threshold value for determining whether or not the shown indicated mean effective pressure Pmi will change toward the decreasing side when the first-time injection ratio Rinj is changed, and is set to a predetermined negative value (for example, −50 kpa).

On the other hand, when the following condition (h4) is satisfied, or when both conditions (h5), (h6) are satisfied, it is anticipated that the shown indicated mean effective pressure Pmi will not increase toward the increasing side when the first-time injection ratio Rinj is changed, so that the fluctuation direction flag F_DPmi_dir is set to "0" to indicate this.

(h4) DPmi<DPmi_NSTEP (h5) DPmi_NSTEP≦DPmi≦DPmi_PSTEP (h6) F_DPmi_dir(k−1)=0

Then, when the fluctuation direction flag F_DPmi_dir is set to "1," the first-time injection ratio Rinj and the increasing side value DPmi_mod_p for the compensation target value are calculated by the following equations (32), (33):

$$Rinj(k)=Rinj\_STB(k) \tag{32}$$

$$DPmi\_\mathrm{mod}\_p(k)=\lambda p'\cdot DPmi\_\mathrm{mod}\_p(k-1)+DPmi(k) \tag{33}$$

λp' in the foregoing equation (33) is a forgetting coefficient which is set to establish 0<λp'<1. As shown in the equation (33), the forgetting coefficient λp' is multiplied by the preceding value DPmi_mod_p(k−1) of the increasing side value, and the fluctuation prediction value Dpmi reaches the value of zero after the first-time injection ratio Rinj is changed, thereby causing the increasing side value DPmi_mod_p to converge to the value of zero as the operation processing advances. As such, the compensation value Umusic_ig' calculated using the increasing side value DPmi_mod_p also converges to the value of zero, thereby causing the ignition manipulated variable Uig to change from a state corrected to a retarded value by the compensation value Umusic_ig' to a non-corrected state.

Next, the compensation target value DPmi_mod is calculated by the following equation (34):

$$DPmi\_\mathrm{mod}(k)=DPmi\_\mathrm{mod}\_p(k) \tag{34}$$

On the other hand, when the fluctuation direction flag F_DPmi_dir is set to "0," the decreasing side value DPmi_n_in for the fluctuation prediction value, the first-time injection ratio Rinj, and the decreasing side value DPmi_mod_n for the compensation target value are calculated in the following manner based on the result of a comparison between the fluctuation prediction value DPmi and decreasing side threshold value DPmi_NSTEP, and the value of the wait flag F_Rinj_Wait is set.

First, a description will be given of an approach for calculating the decreasing side value DPmi_n_in for the fluctuation prediction value. This decreasing side value DPmi_n_in for the fluctuation prediction value is used to calculate the decreasing side value DPmi_mod_n for the compensation target value, as will be later described, and is calculated by the following equation (35) when DPmi<DPmi_NSTEP is established:

$$DPmi\_n\_in(k)=Dpmi(k) \tag{35}$$

On the other hand, the decreasing side value DPmi_n_in for the fluctuation prediction value is calculated by the following equation (36) when DPmi_NSTEP≦DPmi≦DPmi_PSTEP is established.

$$DPmi\_n\_in(k)=DPmi\_n\_in(k-1) \tag{36}$$

Next, a description will be given of an approach for setting the wait flag F_Rinj_Wait. This wait flag F_Rinj_Wait is provided to determine whether or not a change in the first-time injection ratio Rinj should be awaited until the engine torque TRQ has been reduced by changing the ignition timing Ig_log when it is anticipated that the engine torque TRQ (i.e., the shown indicated mean effective pressure Pmi) will change toward the decreasing side when the first-time injection ratio Rinj is changed, and is set in a manner described below.

First, when the following conditions (j1)-(j3) are all satisfied, or when a condition (j4) is satisfied, the wait flag F_Rinj_Wait is set to "1." DPmi_NWAIT in the condition (j3) is a threshold value for determining whether or not a change in the first-time injection Rinj must be awaited, and is set to a predetermined negative value (for example, −10 kPa).

(j1) DPmi_NSTEP≦DPmi(k)≦DPmi_PSTEP (j2) F_Rinj_Wait(k−1)=1

(j3) DPmi_mod_n(k−1)≧DPmi_NWAIT (j4) DPmi<DPmi_NSTEP

On the other hand, when the following conditions (j5)-(j7) are all satisfied, or when both conditions (j8), (j9) are satisfied, the wait flag F_Rinj_Wait is set to "0."

(j5) DPmi_NSTEP≦DPmi(k)≦DPmi_PSTEP (j6) F_Rinj_Wait(k−1)=1

(j7) DPmi_mod_n(k−1)<DPmi_NWAIT (j8) DPmi_NSTEP≦DPmi(k)≦DPmi_PSTEP (j9) F_Rinj_Wait(k−1)=0

Next, a description will be given of an approach for calculating the first-time injection ratio Rinj and the decreasing side value DPmi_mod_n for the compensation target value. First, when F_Rinj_Wait=1, these values Rinj, DPmi_mod_n are calculated by the following equations (37), (38), respectively. λn' in the following equation (38) is a delay coefficient which is set to satisfy 0<λn'<1. In other words, the decreasing side value DPmi_mod_n for the compensation target value is calculated as such a value that is applied with first-order delay filter processing.

$$Rinj(k)=Rinj(k-1) \tag{37}$$

$$DPmi\_\mathrm{mod}\_n(k)=(1-\lambda n')\cdot DPmi\_\mathrm{mod}\_n(k-1)+\lambda n'\cdot DPmi\_n\_in(k) \tag{38}$$

On the other hand, when F_Rinj_Wait=0, the first-time injection ratio Rinj and the decreasing side value DPmi_mod_n for the compensation target value are calculated by the following equations (39), (40):

$$Rinj(k)=Rinj\_STB(k) \tag{39}$$

$$DPmi\_\mathrm{mod}\_n(k)=0 \tag{40}$$

Then, finally, the compensation target value DPmi_mod is calculated by the following equation (41):

$$DPmi\_\mathrm{mod}(k)=-DPmi\_\mathrm{mod}\_n(k) \tag{41}$$

The aforementioned dynamic compensator 144 calculates the compensation value Umusic_ig' by the following equation (42). In the following equation (42), a1', b1' are model parameters for a dynamic characteristic model, later described.

$$\mathrm{Umusic\_ig}'(k)=-\frac{1}{b1'}[\mathrm{DPmi\_mod}(k)-a1'\cdot\mathrm{DPmi\_mod}(k-1)] \tag{42}$$

The foregoing equation (42) is derived in the following manner. First, a dynamic characteristic model can be defined as in the following equation (43) when it is applied with the compensation value Umusic_ig' and outputs the fluctuation prediction value DPmi. Specifically, the equation (43) corresponds to a dynamic characteristic model which represents the relationship between the compensation value Umusic_ig' and the shown indicated mean effective pressure Pmi as a controlled variable. Also, an inverse transfer function of the equation (43) is expressed by the following equation (44):

$$DPmi(k+1) = a1' \cdot DPmi(k) + b1' \cdot \text{Umusic\_ig}'(k) \quad (43)$$

$$\text{Umusic\_ig}'(k) = \frac{1}{b1'}[DPmi(k+1) - a1' \cdot DPmi(k)] \quad (44)$$

Here, the compensation value Umusic_ig' is a value for canceling out (i.e., compensating for) the fluctuation prediction value DPmi, so that the compensation target value DPmi_mod should be calculated such that DPmi(k+1)=−DPmi_mod(k) is established. Therefore, when DPmi(k+1)=−DPmi_mod(k) is substituted into the foregoing equation (44), the aforementioned equation (42) is derived.

In the foregoing manner, the split injection controller 140 calculates the compensation value Umusic_ig' and first-time injection ratio Rinj.

Figure 33:
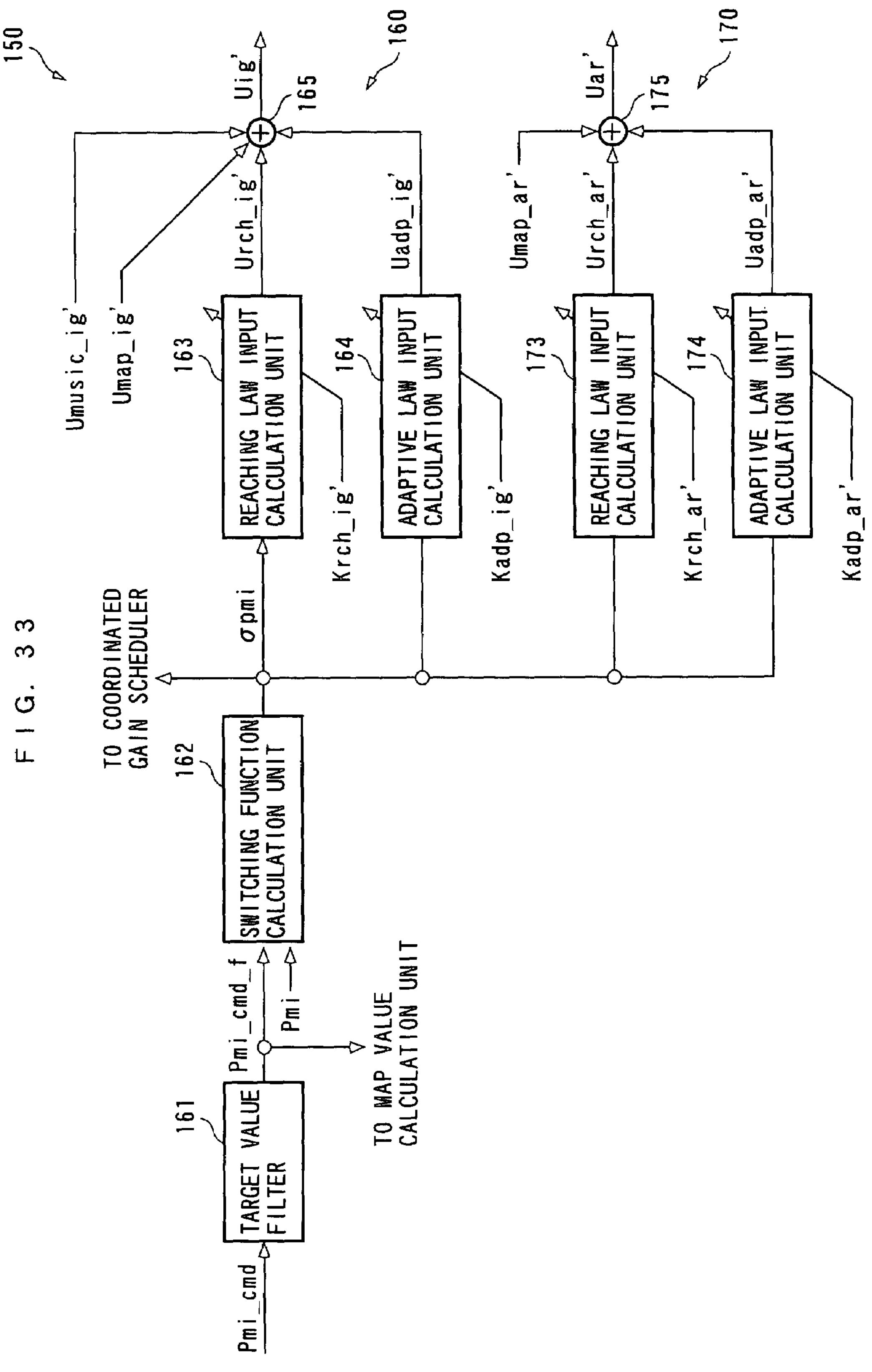
FIG. 33 is a block diagram generally showing the configuration of a coordinated feedback controller according to the second embodiment.

Next, the aforementioned coordinated feedback controller 150 will be described with reference to FIG. 33. As illustrated in FIG. 33, the coordinated feedback controller 150 comprises an ignition timing controller 160 and an intake air amount controller 170.

First, the ignition timing controller 160 will be described. The ignition timing controller 160 calculates an ignition manipulated variable Uig' (=Ig_log) by a control algorithm which applies a target value filter type two-degree-of-freedom sliding mode control algorithm, as will be later described, and comprises a target value filter 161, a switching function calculation unit 162, a reaching law input calculation unit 163, an adaptive law input calculation unit 164, and an adder element 165.

The target value filter 161 calculates a filter value Pmi_cmd_f for the target pressure in accordance with a first-order delay filter algorithm expressed by the following equation (45). In the equation (45), R' is a parameter for specifying a target value response, and is set to a value in a range of −1<R'<0. In this way, the filter value Pmi_cmd_f is calculated as a value which indicates a first-order delay follow-up responsibility determined by the value of the target value response specifying parameter R' for the target pressure Pmi_cmd.

$$Pmi\_cmd\_f(k) = -R' \cdot Pmi\_cmd\_f(k-1) + (1+R') \cdot Pmi\_cmd(k) \quad (45)$$

The switching function calculation unit 162 calculates the switching function σpmi by the following equations (46), (47). In the equation (46), S' is a switching function setting parameter, and is set to a value in a range of −1<S'<0. Epmi in turn is a follow-up error, and is defined as a deviation of the shown indicated mean effective pressure Pmi from the filter value Pmi_cmd_f for the target pressure, as shown in the equation (47).

$$\sigma pmi(k) = Epmi(k) + S' \cdot Epmi(k-1) \quad (46)$$

$$Epmi(k) = Pmi(k) - Pmi\_cmd\_f(k) \quad (47)$$

The reaching law input calculation unit 163 calculates a reaching law input Urch_ig' by the following equation (48) using the switching function σpmi and a reaching law gain Krch_ig' which is set by the coordinated gain scheduler 180:

$$Urch\_ig'(k) = -Krch\_ig'(k) \cdot \sigma pmi(k) \quad (48)$$

The adaptive law input calculation unit 164 calculates an adaptive law input Uadp_ig' by the following equation (49) using the switching function σpmi and an adaptive law gain Kadp_ig' which is set by the coordinated gain scheduler 180. In the equation (49), λ' is a forgetting coefficient, and is set to a value in a range of 0<λ'<1. The reason for using the forgetting function λ' is the same as the reason which has been described in the calculation of the adaptive law input Uadp_ig in the first embodiment.

$$Uadp\_ig'(k) = \lambda' \cdot \text{Uadp\_}ig'(k-1) - Kadp\_ig'(k) \cdot \sigma pmi(k) \quad (49)$$

Further, the adder element 165 calculates the ignition manipulated variable Uig' by the following equation (50) using the reaching law input Urch_ig' and adaptive law input Uadp_ig' calculated in the foregoing manner, the compensation value Umusic_ig' calculated by the split injection controller 140, and the map value Umap_ig' calculated by the map value calculation unit 190:

$$Uig'(k) = Urch\_ig'(k) + Uadp\_ig'(k) + Umap\_ig'(k) + Umusic\_ig'(k) \quad (50)$$

As described above, the ignition timing controller 160 calculates the ignition manipulated variable Uig' in accordance with the control algorithm which applies the target value filter type two-degree-of-freedom sliding mode control algorithm represented by the equations (45)-(50). In this embodiment, a value (Urch_ig'+Uadp_ig'+Umap_ig') corresponds to a first basic manipulated variable.

Next, the aforementioned intake air amount controller 170 will be described. The intake air amount controller 170 calculates the intake manipulated variable Uar' (=Liftin_cmd) in accordance with a control algorithm which applies a target value filter type two-degree-of-freedom sliding mode control algorithm, as will be later described, and comprises the aforementioned target value filter 161, the aforementioned switching function calculation unit 162, a reaching law input calculation unit 173, an adaptive law input calculation unit 174, and an adder element 175. Specifically, the intake air amount controller 170 shares the target value filter 161 and switching function calculation unit 162 with the ignition timing controller 160 to calculate the intake manipulated variable Uar', while sharing the filter value Pmi_cmd_f for the target pressure and the switching function σpmi.

Specifically, first, the reaching law input calculation unit 173 calculates a reaching law input Urch_ar' by the following equation (51) using the switching function σpmi and the reaching law gain Krch_ar' which has been set by the coordinated gain scheduler 180:

$$Urch\_ar'(k) = -Krch\_ar'(k) \cdot \sigma pmi(k) \quad (51)$$

Further, the adaptive law input calculation unit 174 calculates an adaptive law input Uadp_ar' by the following equation (52) using the switching function σpmi and the adaptive law gain Kadp_ar' which has been set by the coordinated gain scheduler 180:

$$Uadp\_ar'(k) = Uadp\_ar'(k-1) - Kadp\_ar'(k) \cdot \sigma pmi(k) \quad (52)$$

Further, the adder element 175 calculates the intake manipulated variable Uar' by the following equation (53) using the reaching law input Urch_ar' and adaptive law input Uadp_ar' calculated in the foregoing manner, and the map value Umap_ig' calculated by the map value calculation unit 190:

$$Uar'(k) = Urch\_ar'(k) + Uadp\_ar'(k) + Umap\_ar'(k) \quad (53)$$

The intake air amount controller 170 calculates the intake manipulated variable Uar' in accordance with the control algorithm which applies the target value filter type two-degree-of-freedom sliding mode control algorithm represented by the equations (45)-(47) and (51)-(53), as described above.

Figure 34:
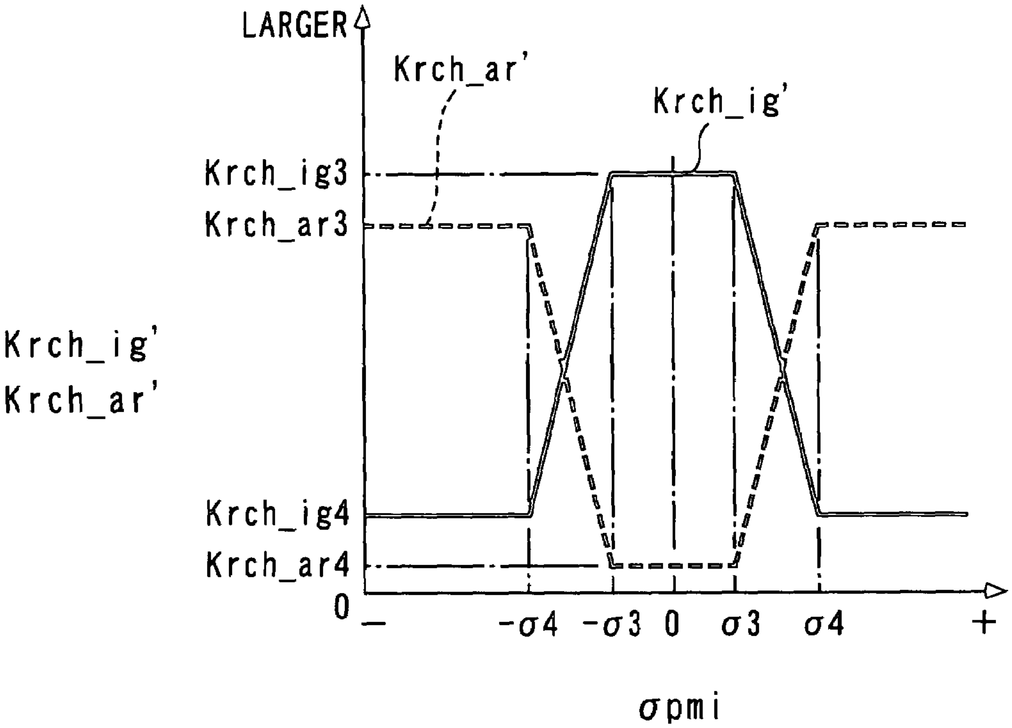
FIG. 34 is a diagram showing an example of a map used to calculate reaching law gains Krch_ig', Krch_ar'.

Next, the aforementioned coordinated gain scheduler 180 will be described. This coordinated gain scheduler 180 calculates the aforementioned four gains Krch_ig', Krch_ar', Kadp_ig', Kadp_ar', respectively, by searching a map for calculating reaching law gains shown in FIG. 34 and a map for calculating adaptive law gains shown in FIG. 35 in accordance with the value of the switching function $\sigma$pmi. In FIG. 34, 35, $\sigma 3$ and $\sigma 4$ are predetermined positive values of the switching function $\sigma$pmi which satisfy a relationship $\sigma 3<\sigma 4$.

First, referring to the map for calculating the reaching law gains in FIG. 34, in this map, the reaching law gain Krch_ig', which is set symmetrically to positive and negative values of the switching function $\sigma$pmi, is set to a predetermined maximum value Krch_ig3 in a range of $-\sigma 3<\sigma pmi<\sigma 3$ near the value of zero, and set to a predetermined minimum value Krch_ig4 in ranges of $\sigma pmi<-\sigma 4$ and $\sigma 4<\sigma pmi$. Also, the reaching law gain Krch_ig' is set to a larger value as the absolute value of $\sigma$pmi is smaller in ranges of $-\sigma 4\leqq\sigma pmi\leqq-\sigma 3$ and $\sigma 3\sigma pmi\leqq\sigma 4$.

The reaching law gain Krch_ar', which is also set symmetrically to positive and negative values of the switching function $\sigma$pmi, is set to a predetermined minimum value Krch_ar4 in the range of $-\sigma 3<\sigma pmi<\sigma 3$ near the value of zero, and set to a predetermined maximum value Krch_ar3 in the ranges of $\sigma pmi<-\sigma 4$ and $\sigma 4<\sigma pmi$. Also, the reaching law gain Krch_ar' is set to a smaller value as the absolute value of $\sigma$pmi is smaller in the ranges of $-\sigma 4\leqq\sigma pmi\leqq-\sigma 3$ and $\sigma 3\leqq\sigma pmi\leqq\sigma 4$.

Figure 35:
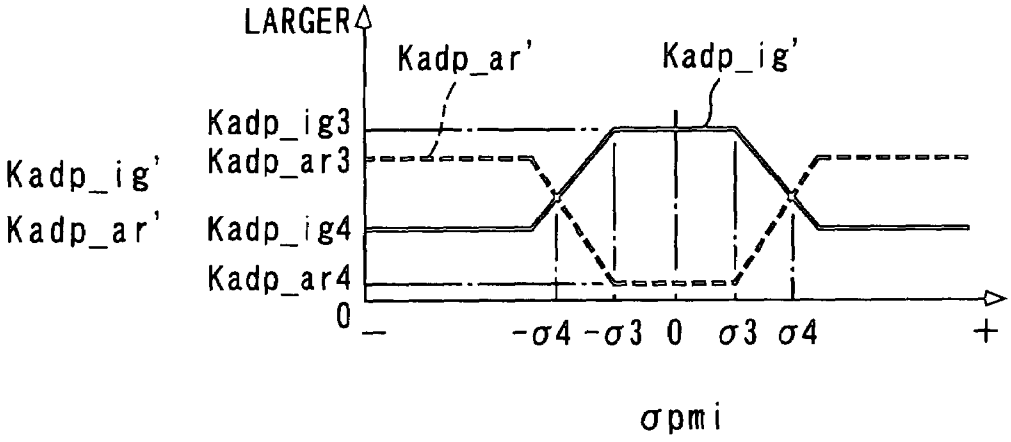
FIG. 35 is a diagram showing an example of a map used to calculate adaptive law gains Kadp_ig', Kadp_ar'.

On the other hand, referring to the map for calculating the adaptive law gains in FIG. 35, in this map, the adaptive law gain Kadp_ig', which is also set symmetrically to positive and negative values of the switching function $\sigma$pmi, is set to a predetermined maximum value Kadp_ig3 in the range of $-\sigma 3<\sigma pmi<\sigma 3$ near the value of zero, and set to a predetermined minimum value Kadp_ig4 in the ranges of $\sigma pmi<-\sigma 4$ and $\sigma 4<\sigma pmi$. Also, the adaptive law gain Kadp_ig' is set to a larger value as the absolute value of $\sigma$pmi is smaller in the ranges of $-\sigma 4\leqq\sigma pmi\leqq-\sigma 3$ and $\sigma 3\leqq\sigma pmi\leqq\sigma 4$.

The adaptive law gain Kadp_ar', which is also set symmetrically to positive and negative values of the switching function $\sigma$pmi, is set to a predetermined minimum value Kadp_ar4 in the range of $-\sigma 3<\sigma pmi<\sigma 3$ near the value of zero, and set to a predetermined maximum value Kadp_ar3 in the ranges of $\sigma pmi<-\sigma 4$ and $\sigma 4<\sigma pmi$. Also, the adaptive law gain Kadp_ar' is set to a smaller value as the absolute value of $\sigma$pmi is smaller in the ranges of $-\sigma 4\leqq\sigma pmi\leqq-\sigma 3$ and $\sigma 3\leqq\sigma pmi\leqq\sigma 4$.

The four gains Krch_ig', Kadp_ig', Krch_ar', Kadp_ar' are set to the values as described above for the same reason as that which has been set forth in the description of the coordinated gain scheduler 80 in the first embodiment.

Next, the aforementioned map value calculation unit 190 will be described. This map value calculation unit 190 calculates two map values Umap_ig', Umap_ar' in a manner described below. These map values Umap_ig', Umap_ar' are both values which correspond to a feed forward term in order to control the shown indicated mean effective pressure Pmi to the filter value Pmi_cmd_f for the target pressure (i.e., in order to control the shown indicated mean effective pressure Pmi to the target pressure Pmi_cmd), and are accordingly used as addition terms in the calculations of the ignition manipulated variable Uig' and intake manipulated variable Uar', as described above.

Figure 36:
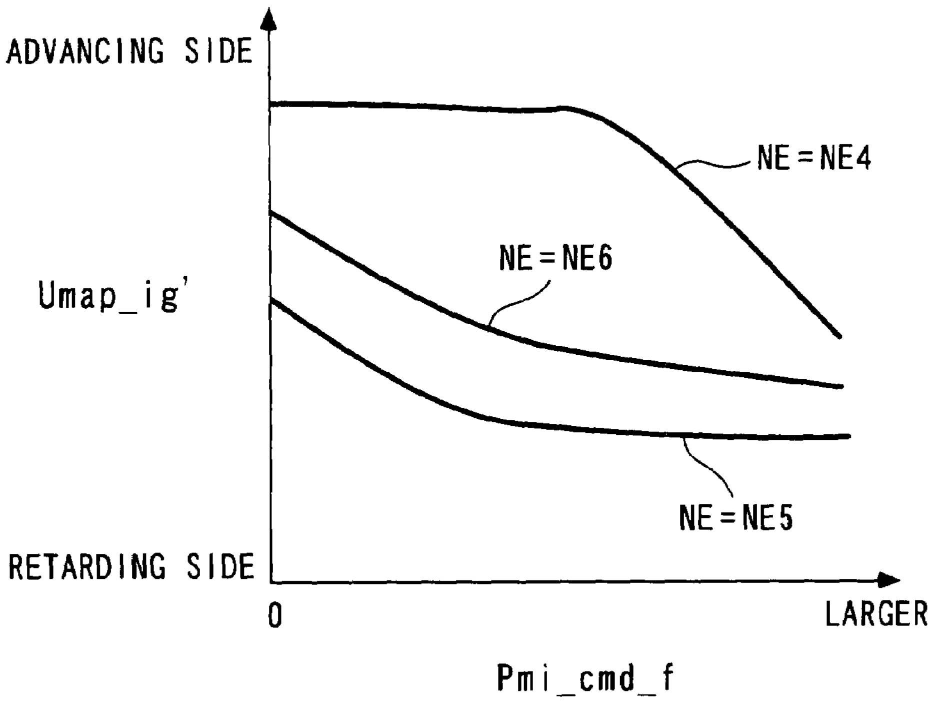
FIG. 36 is a diagram showing an example of a map used to calculate a map value Umap_ig'.

First, the map value Umap_ig' is calculated by searching a map shown in FIG. 36 in accordance with the engine rotational speed NE and the filter value Pmi_cmd_f for the target pressure. NE4-NE6 in FIG. 36 are predetermined values of the engine rotational speed NE which satisfy NE4<NE5<NE6.

As shown in FIG. 36, the map value Umap_ig' is set to a more retarded value as the filter value Pmi_cmd_f for the target pressure is higher in a region in which the filter value Pmi_cmd_f for the target pressure is large. This is intended to restrain knocking. The map value Umap_ig' in turn is set to the most advanced value in a low rotational speed region of the engine rotational speed NE (NE=NE4), as compared with values in other rotational speed ranges. This is because the ignition timing Ig_log can be set to the most advanced value due to a larger knocking margin in the low rotational speed range than the other rotational speed ranges. Further, the map value Umap_ig' is set to the most retarded value in a middle rotational speed region (NE=NE5), and set to a more advanced value in a high rotational speed range (NE=NE6) than in the middle rotational speed range. This is because the knocking margin is reduced most in the middle rotational speed range due to a reduction in combustion speed caused by a low cylinder flow.

Figure 37:
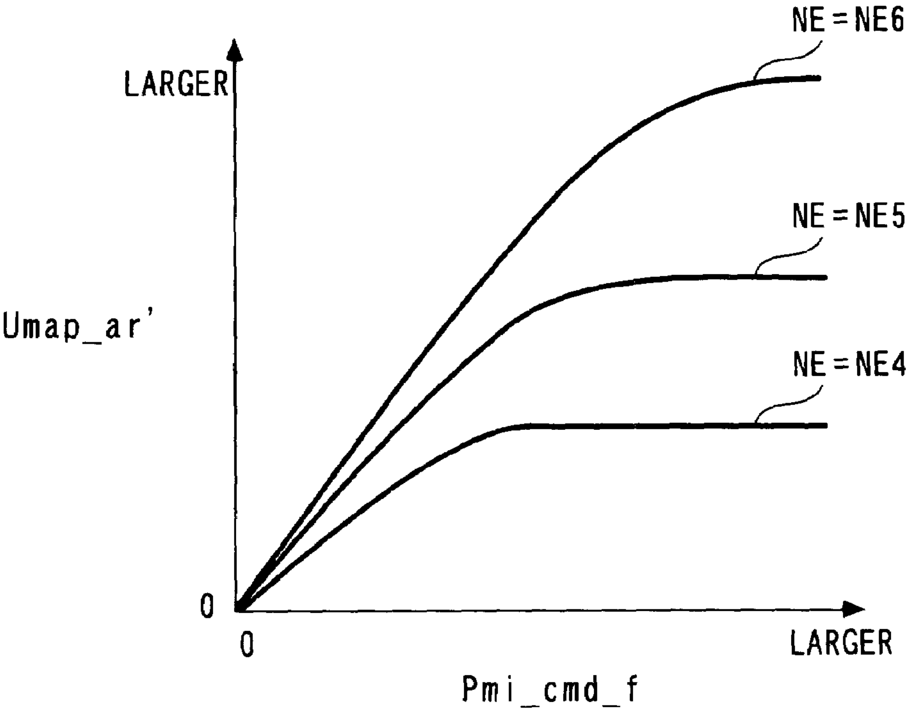
FIG. 37 is a diagram showing an example of a map used to calculate a map value Umap_ar'.

The map value Umap_ar' in turn is calculated by searching a map shown in FIG. 37 in accordance with the engine rotational speed NE and the filter value Pmi_cmd_f for the target pressure. In FIG. 37, the map value Umap_ig' is set to a larger value as the engine rotational speed NE is higher, or as the filter value Pmi_cmd_f for the target pressure is higher. This is intended to increase the intake air amount Gcyl by controlling the intake manipulated variable Uar' to a larger value in order to achieve an increase in the engine torque TRQ required to increase the engine rotational speed NE more as the engine rotational speed NE is higher, or the filter value Pmi_cmd_f for the target pressure is larger.

As described above, according to the control apparatus 1A of the second embodiment, the shown indicated mean effective pressure Pmi can be controlled in a manner similar to the idle rotational speed control by the aforementioned control apparatus 1 of the first embodiment. Specifically, when the combustion mode is switched from the uniform combustion mode to the stratified combustion mode due to a change in the engine rotational speed NE, the ignition manipulated variable Uig', i.e., ignition timing Ig_log is rapidly corrected toward the retarding side by the compensation value Umusic_ig' in synchronism with the switching timing, thus making it possible to cancel out an increase in the engine torque TRQ associated with the switching to the stratified combustion mode, i.e., an unwanted increase in the shown indicated mean effective pressure Pmi.

Also, after the switching to the stratified combustion mode, the increasing side value Pmi_mod_p for the compensation target value is calculated by the forgetting operation processing using the forgetting coefficient $\lambda$p' shown in the equation (33), so that the compensation value Umusic_ig' changes toward the value of zero as the operation processing advances, and the ignition manipulated variable Uig', i.e., ignition timing Ig_log' gradually changes toward the advancing side. In this way, the ignition timing Ig_log is prevented from being held as corrected toward the retarding side by the compensation value Umusic_ig' for a long time, thus making it possible to improve the fuel economy.

Further, as the shown indicated mean effective pressure Pmi is to increase due to a gradual change of the ignition timing Ig_log toward the advancing side, the intake manipulated variable Uar', i.e., target intake valve opening Liftin_cmd is calculated to slowly decrease by the equation (53) of the coordinated feedback controller 150, as described above, so that the intake air amount Gcyl is slowly controlled toward the decreasing side. As a result, an increase in the shown indicated mean effective pressure Pmi associated with a change of the ignition timing Ig_log toward the advancing side can be restrained after the switching to the stratified combustion mode. In other words, the intake air amount Gcyl can be controlled by the intake manipulated variable Uar' so as to cancel out the influence of the compensation value Umusic_ig'.

On the other hand, when the combustion mode is switched from the stratified combustion mode to the uniform combustion mode due to a change in the engine rotational speed NE or the like, the switching to the uniform combustion mode is not performed at a timing at which the request for a decrease is made, but the switching to the uniform combustion mode is executed at a subsequent timing after the absolute value of the compensation value Umusic_ig' has been changed to such a value on the retarding side that torque down can be compensated, and the compensation value Umusic_ig' is also changed rapidly to the value of zero on the advancing side. In this way, the compensation value Umusic_ig' can cancel out a decrease in the engine torque TRQ associated with the switching to the uniform combustion mode, i.e., an unwanted reduction in the shown indicated mean effective pressure Pmi.

Also, when the shown indicated mean effective pressure Pmi tends to become lower due to a change of the compensation value Umusic_ig' toward the retarding side while switching of the combustion mode is being awaited, the intake manipulated variable Uar', i.e., target intake valve opening Liftin_cmd is calculated to slowly increase by the equation (53) of the coordinated feedback controller 150, to slowly control the intake air amount Gcyl toward the increasing side, as described above. This can cancel out a reduction in the shown indicated mean effective pressure Pmi.

Further, since the ignition manipulated variable Uig' and intake manipulated variable Uar' are respectively calculated by the control algorithm which applies the target value filter type two-degree-of-freedom sliding mode control algorithm, while sharing the switching function σpmi and the filter value Pmi_cmd_f for the target pressure, the shown indicated mean effective pressure Pmi can be appropriately converged to the target pressure Pmi_cmd while avoiding these manipulated variables Uig', Uar' from interfering with each other.

While the first and second embodiments have shown examples in which the engine rotational speed NE during idle operation and the shown indicated mean effective pressure Pmi, respectively, are used as controlled variables indicative of the torque generated by the internal combustion engine, the controlled variables of the present invention are not so limited, but any controlled variable can be used as long as it indicates a torque generated by the internal combustion engine. For example, a brake mean effective pressure Pme may be used in place of the shown indicated mean effective pressure Pmi in the second embodiment.

Also, while the first and second embodiments have shown examples in which the control apparatus of the present invention is applied to an internal combustion engine for a vehicle, the control apparatus of the present invention is not so limited, but can be applied to a variety of internal combustion engines such as internal combustion engines for shipping, power generation and the like.

What is claimed is:

1. A control apparatus for an internal combustion engine having a plurality of combustion modes which differ from one another in a controlled variable indicative of a generated torque under the same operating condition and operated with the combustion mode being switched among the plurality of combustion modes when a predetermined switching condition is satisfied, said control apparatus comprising:

first manipulated variable calculating means for calculating a first manipulated variable for controlling the controlled variable to cancel out a change in the controlled variable associated with the switching of the combustion mode when the predetermined switching condition is satisfied; and second manipulated variable calculating means for calculating a second manipulated variable for changing the controlled variable, said second manipulated variable having a smaller width available for a change in the controlled variable in one combustion cycle than the first manipulated variable, to cancel out a change in the controlled variable due to the first manipulated variable when the predetermined switching condition is satisfied.

2. A control apparatus for an internal combustion engine according to claim 1, wherein said first manipulated variable calculating means comprises:

first basic manipulated variable calculating means for calculating a first basic manipulated variable in accordance with a predetermined control algorithm; and correction value calculating means for calculating a correction value for canceling out a change in the controlled variable associated with the switching of the combustion mode while applying predetermined forgetting processing, wherein said first manipulated variable calculating means calculates the first manipulated variable by correcting the first basic manipulated variable by the correction value.

3. A control apparatus for an internal combustion engine according to claim 1, wherein said first manipulated variable calculating means calculates the first manipulated variable using a model which represents the relationship between the plurality of combustion modes and the controlled variable.

4. A control apparatus for an internal combustion engine according to claim 2, wherein said correction value calculating means calculates the correction value based on a dynamic characteristic model which represents the relationship between the correction value and the controlled variable.

5. A control apparatus for an internal combustion engine according to claim 1, further comprising:

target controlled variable calculating means for calculating a target controlled variable which is a target for the controlled variable; and modifying means for modifying the first manipulated variable and the second manipulated variable in accordance with a predetermined feedback control algorithm, such that the controlled variable reaches the target controlled variable.

6. A control method for an internal combustion engine having a plurality of combustion modes which differ from one another in a controlled variable indicative of a generated torque under the same operating condition and operated with the combustion mode being switched among the plurality of combustion modes when a predetermined switching condition is satisfied, said control method comprising the steps of:

calculating a first manipulated variable for controlling the controlled variable to cancel out a change in the controlled variable associated with the switching of the combustion mode when the predetermined switching condition is satisfied; and calculating a second manipulated variable for changing the controlled variable, said second manipulated variable having a smaller width available for a change in the controlled variable in one combustion cycle than the first manipulated variable, to cancel out a change in the controlled variable due to the first manipulated variable when the predetermined switching condition is satisfied.

7. A control method for an internal combustion engine according to claim 6, wherein said step of calculating a first manipulated variable comprises the steps of:

calculating a first basic manipulated variable in accordance with a predetermined control algorithm;

calculating a correction value for canceling out a change in the controlled variable associated with the switching of the combustion mode while applying predetermined forgetting processing; and calculating the first manipulated variable by correcting the first basic manipulated variable by the correction value.

8. A control method for an internal combustion engine according to claim 6, wherein said step of calculating a first manipulated variable includes calculating the first manipulated variable using a model which represents the relationship between the plurality of combustion modes and the controlled variable.

9. A control method for an internal combustion engine according to claim 7, wherein said step of calculating a correction value includes calculating the correction value based on a dynamic characteristic model which represents the relationship between the correction value and the controlled variable.

10. A control method for an internal combustion engine according to claim 6, further comprising the steps of:

calculating a target controlled variable which is a target for the controlled variable; and modifying the first manipulated variable and the second manipulated variable in accordance with a predetermined feedback control algorithm, such that the controlled variable reaches the target controlled variable.

11. An engine control unit including a control program for an internal combustion engine having a plurality of combustion modes which differ from one another in a controlled variable indicative of a generated torque under the same operating condition and operated with the combustion mode being switched among the plurality of combustion modes when a predetermined switching condition is satisfied, said control program causing a computer to calculate a first manipulated variable for controlling the controlled variable to cancel out a change in the controlled variable associated with the switching of the combustion mode when the predetermined switching condition is satisfied; and calculate a second manipulated variable for changing the controlled variable, said second manipulated variable having a smaller width available for a change in the controlled variable in one combustion cycle than the first manipulated variable, to cancel out a change in the controlled variable due to the first manipulated variable when the predetermined switching condition is satisfied.

12. An engine control unit according to claim 11, wherein said control program further causes the computer to calculate a first basic manipulated variable in accordance with a predetermined control algorithm; calculate a correction value for canceling out a change in the controlled variable associated with the switching of the combustion mode while applying predetermined forgetting processing; and calculate the first manipulated variable by correcting the first basic manipulated variable by the correction value.

13. An engine control unit according to claim 11, wherein said control program further causes the computer to calculate the first manipulated variable using a model which represents the relationship between the plurality of combustion modes and the controlled variable.

14. An engine control unit according to claim 12, wherein said control program further causes the computer to calculate the correction value based on a dynamic characteristic model which represents the relationship between the correction value and the controlled variable.

15. An engine control unit according to claim 11, wherein said control program further causes the computer to calculate a target controlled variable which is a target for the controlled variable; and modify the first manipulated variable and the second manipulated variable in accordance with a predetermined feedback control algorithm, such that the controlled variable reaches the target controlled variable.

16. A control apparatus for an internal combustion engine having a plurality of combustion modes which differ from one another in a controlled variable indicative of a generated torque under the same operating condition and operated with the combustion mode being switched among the plurality of combustion modes when a predetermined switching condition is satisfied, said control apparatus comprising:

delaying means for delaying the switching of the combustion mode when a predetermined delay condition is satisfied after the predetermined switching condition has been satisfied;

first manipulated variable calculating means for calculating a first manipulated variable for controlling the controlled variable to change in a direction opposite to a direction in which the first manipulated variable cancels out a change in the controlled variable associated with the switching of the combustion mode during a delay of the switching of the combustion mode, and for calculating the first manipulated variable to change in a direction in which the first manipulated variable cancels out in the controlled variable associated with the switching of the combustion mode when the delay of the switching of the combustion mode is terminated; and second manipulated variable calculating means for calculating a second manipulated variable for changing the controlled variable, said second manipulated variable having a smaller width available for a change in the controlled variable in one combustion cycle than the first manipulated variable, to cancel out a change in the controlled variable due to the first manipulated variable during the delay of the switching of the combustion mode by said delaying means.

17. A control apparatus for an internal combustion engine according to claim 16, wherein said first manipulated variable calculating means comprises:

first basic manipulated variable calculating means for calculating a first basic manipulated variable in accordance with a predetermined control algorithm; and correction value calculating means for calculating a correction value for canceling out a change in the controlled variable associated with the switching of the combustion mode while applying predetermined forgetting processing, wherein said first manipulated variable calculating means calculates the first manipulated variable by correcting the first basic manipulated variable by the correction value, wherein said correction value calculating means calculates the correction value such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and calculates the correction value such that the correcting direction of the first basic manipulated variable by the correction value is the same direction as the direction in which the change in the controlled variable associated with the switching of the combustion mode is canceled out when the delay of the switching of the combustion mode is terminated.

18. A control apparatus for an internal combustion engine according to claim 16, wherein said first manipulated variable calculating means calculates the first manipulated variable using a model which represents the relationship between the plurality of combustion modes and the controlled variable.

19. A control apparatus for an internal combustion engine according to claim 17, wherein said correction value calculating means calculates the correction value based on a dynamic characteristic model which represents the relationship between the correction value and the controlled variable.

20. A control apparatus for an internal combustion engine according to claim 16, further comprising:

target controlled variable calculating means for calculating a target controlled variable which is a target for the controlled variable; and modifying means for modifying the first manipulated variable and the second manipulated variable in accordance with a predetermined feedback control algorithm, such that the controlled variable reaches the target controlled variable.

21. A control method for an internal combustion engine having a plurality of combustion modes which differ from one another in a controlled variable indicative of a generated torque under the same operating condition and operated with the combustion mode being switched among the plurality of combustion modes when a predetermined switching condition is satisfied, said control method comprising the steps of:

delaying the switching of the combustion mode when a predetermined delay condition is satisfied after the predetermined switching condition has been satisfied;

calculating a first manipulated variable for controlling the controlled variable to change in a direction opposite to a direction in which the first manipulated variable cancels out a change in the controlled variable associated with the switching of the combustion mode during a delay of the switching of the combustion mode, and for calculating the first manipulated variable to change in a direction in which the first manipulated variable cancels out in the controlled variable associated with the switching of the combustion mode when the delay of the switching of the combustion mode is terminated; and calculating a second manipulated variable for changing the controlled variable, said second manipulated variable having a smaller width available for a change in the controlled variable in one combustion cycle than the first manipulated variable, to cancel out a change in the controlled variable due to the first manipulated variable during the delay of the switching of the combustion mode.

22. A control method for an internal combustion engine according to claim 21, wherein said step of calculating a first manipulated variable comprises the steps of:

calculating a first basic manipulated variable in accordance with a predetermined control algorithm;

calculating a correction value for canceling out a change in the controlled variable associated with the switching of the combustion mode while applying predetermined forgetting processing; and calculating the first manipulated variable by correcting the first basic manipulated variable by the correction value, wherein said step of calculating the correction value includes calculating the correction value such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and calculating the correction value such that the correcting direction of the first basic manipulated variable by the correction value is the same direction as the direction in which the change in the controlled variable associated with the switching of the combustion mode is canceled out when the delay of the switching of the combustion mode is terminated.

23. A control method for an internal combustion engine according to claim 21, wherein said step of calculating a first manipulated variable includes calculating the first manipulated variable using a model which represents the relationship between the plurality of combustion modes and the controlled variable.

24. A control method for an internal combustion engine according to claim 22, wherein said step of calculating a correction value includes calculating the correction value based on a dynamic characteristic model which represents the relationship between the correction value and the controlled variable.

25. A control method for an internal combustion engine according to claim 21, further comprising the steps of:

calculating a target controlled variable which is a target for the controlled variable; and modifying the first manipulated variable and the second manipulated variable in accordance with a predetermined feedback control algorithm, such that the controlled variable reaches the target controlled variable.

26. An engine control unit including a control program for an internal combustion engine having a plurality of combustion modes which differ from one another in a controlled variable indicative of a generated torque under the same operating condition and operated with the combustion mode being switched among the plurality of combustion modes when a predetermined switching condition is satisfied, said control program causing a computer to delay the switching of the combustion mode when a predetermined delay condition is satisfied after the predetermined switching condition has been satisfied; calculate a first manipulated variable for controlling the controlled variable to change in a direction opposite to a direction in which the first manipulated variable cancels out a change in the controlled variable associated with the switching of the combustion mode during a delay of the switching of the combustion mode, and for calculating the first manipulated variable to change in a direction in which the first manipulated variable cancels out in the controlled variable associated with the switching of the combustion mode when the delay of the switching of the combustion mode is terminated; and calculate a second manipulated variable for changing the controlled variable, said second manipulated variable having a smaller width available for a change in the controlled variable in one combustion cycle than the first manipulated variable, to cancel out a change in the controlled variable due to the first manipulated variable during the delay of the switching of the combustion mode.

27. An engine control unit according to claim 26, wherein said control program further causes the computer to calculate a first basic manipulated variable in accordance with a predetermined control algorithm; calculate a correction value for canceling out a change in the controlled variable associated with the switching of the combustion mode while applying predetermined forgetting processing; calculate the first manipulated variable by correcting the first basic manipulated variable by the correction value; and calculate the correction value such that a correcting direction of the first basic manipulated variable by the correction value is an opposite direction to the direction in which the change in the controlled variable associated with the switching of the combustion mode is canceled out, while applying predetermined response specifying type filtering processing, during the delay of the switching of the combustion mode, and calculate the correction value such that the correcting direction of the first basic manipulated variable by the correction value is the same direction as the direction in which the change in the controlled variable associated with the switching of the combustion mode is canceled out when the delay of the switching of the combustion mode is terminated.

28. An engine control unit according to claim 26, wherein said control program further causes the computer to calculate the first manipulated variable using a model which represents the relationship between the plurality of combustion modes and the controlled variable.

29. An engine control unit according to claim 27, wherein said control program further causes the computer to calculate the correction value based on a dynamic characteristic model which represents the relationship between the correction value and the controlled variable.

30. An engine control unit according to claim 26, wherein said control program further causes the computer to calculate a target controlled variable which is a target for the controlled variable; and modify the first manipulated variable and the second manipulated variable in accordance with a predetermined feedback control algorithm, such that the controlled variable reaches the target controlled variable.

* * * * *